(12) United States Patent
Manes et al.

(10) Patent No.: US 9,799,366 B2
(45) Date of Patent: Oct. 24, 2017

(54) MANAGEMENT OF ROBOTICS ASSEMBLY AND CARTRIDGE ACCESS PORT OF MEDIA ELEMENT STORAGE LIBRARY

(71) Applicant: Oracle International Corporation, Redwood City, CA (US)

(72) Inventors: Joseph Paul Manes, Arvada, CO (US); Daniel James Plutt, Superior, CO (US); Timothy Craig Ostwald, Boulder, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 15/015,580

(22) Filed: Feb. 4, 2016

(65) Prior Publication Data

US 2016/0155462 A1    Jun. 2, 2016

Related U.S. Application Data

(60) Division of application No. 14/681,204, filed on Apr. 8, 2015, now Pat. No. 9,269,391, which is a continuation of application No. 14/517,157, filed on Oct. 17, 2014, now Pat. No. 9,025,275.

(51) Int. Cl.
| | |
|---|---|
| *G11B 15/68* | (2006.01) |
| *G11B 33/02* | (2006.01) |
| *B65G 1/06* | (2006.01) |
| *B65G 1/137* | (2006.01) |

(52) U.S. Cl.
CPC ............ *G11B 15/6845* (2013.01); *B65G 1/06* (2013.01); *B65G 1/137* (2013.01); *G11B 15/68* (2013.01); *G11B 33/027* (2013.01)

(58) Field of Classification Search
CPC .... G11B 15/68; G11B 15/6845; G11B 33/027
USPC ........................................................ 360/92.1
See application file for complete search history.

(56) References Cited

U.S. PATENT DOCUMENTS

| | | | |
|---|---|---|---|
| 6,930,854 B2* | 8/2005 | Taki ..................... | G11B 15/685 360/92.1 |
| 8,988,818 B2* | 3/2015 | Sakuma ............ | G11B 15/6815 360/92.1 |
| 2002/0167754 A1* | 11/2002 | Donkin ................ | G11B 17/225 360/92.1 |

(Continued)

*Primary Examiner* — Allen T Cao
(74) *Attorney, Agent, or Firm* — Marsh Fischmann & Breyfogle LLP; Jonathon A. Szumny

(57) ABSTRACT

Utilities that increase the volume of media elements that can be simultaneously loaded and/or unloaded into or from a storage library, facilitate mounting of media element magazines into a storage library, and limit access to an interior of a storage library by users during operation of robotics assemblies of the storage library. One disclosed utility includes a cartridge access port for use with a storage library that has a storage container that is pivotable (e.g., swingable) between at least first and second positions. In the first position, the storage container is adjacent an opening in the housing of the library for loading and unloading of media elements by a user into or from the container via the opening. After the storage container has swung into the second position, the storage container is spaced from the opening and faces the interior of the library for access by a robotics assembly.

15 Claims, 46 Drawing Sheets

(56) References Cited

U.S. PATENT DOCUMENTS

| | | | | |
|---|---|---|---|---|
| 2003/0063527 A1* | 4/2003 | Ostwald | ............... | G11B 15/685 360/92.1 |
| 2004/0017633 A1* | 1/2004 | Oohara | .............. | G11B 15/6835 360/92.1 |
| 2014/0198408 A1* | 7/2014 | Sakuma | ............. | G11B 15/6885 360/92.1 |

* cited by examiner

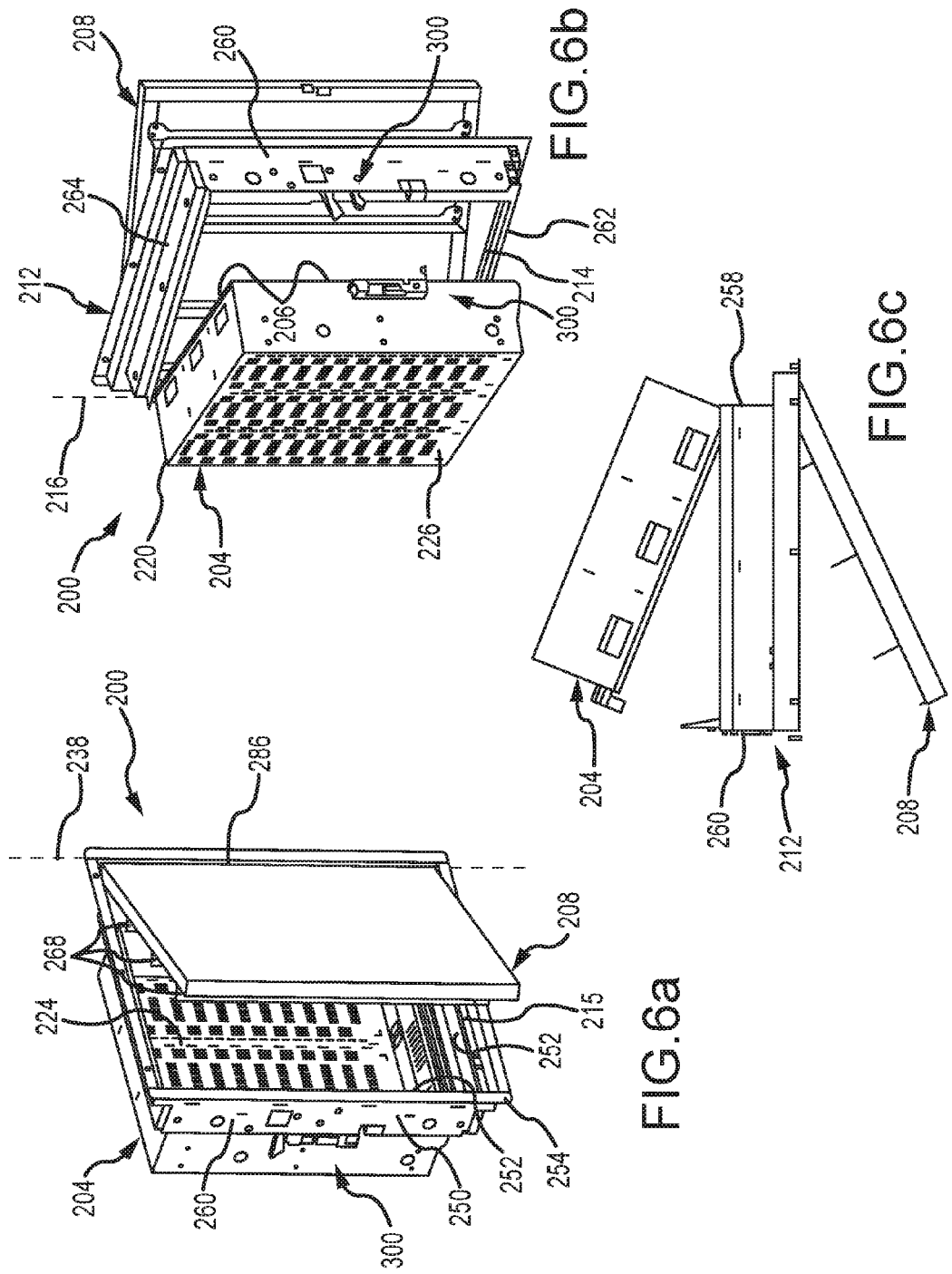

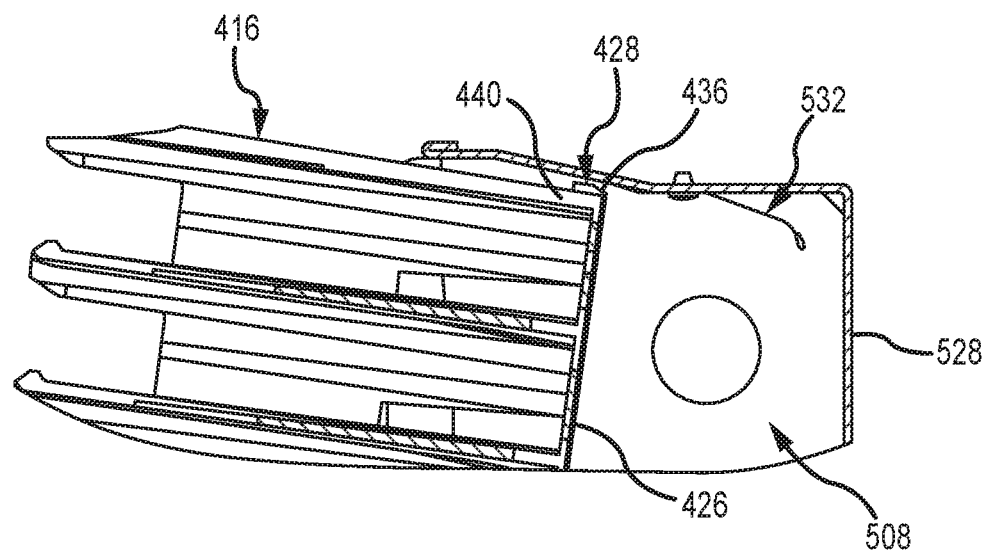
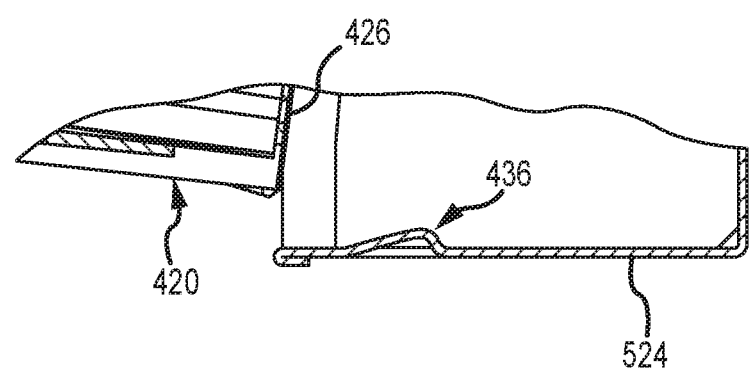
FIG.11a

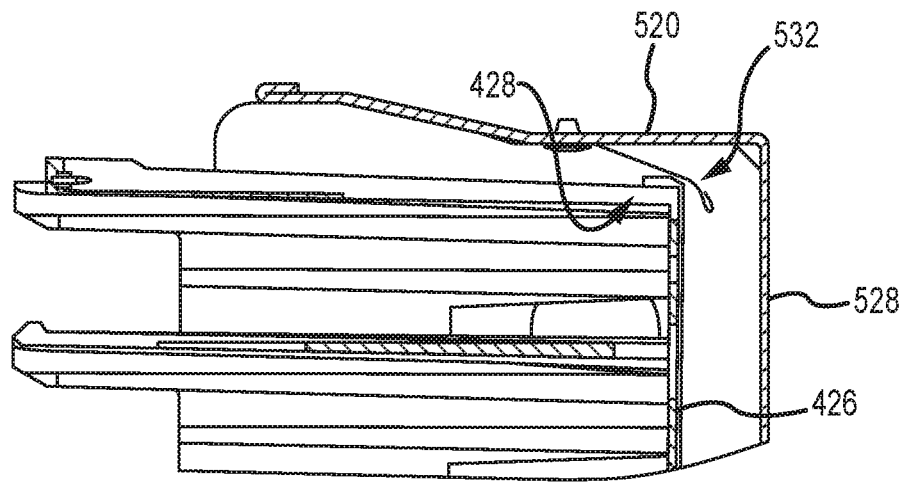
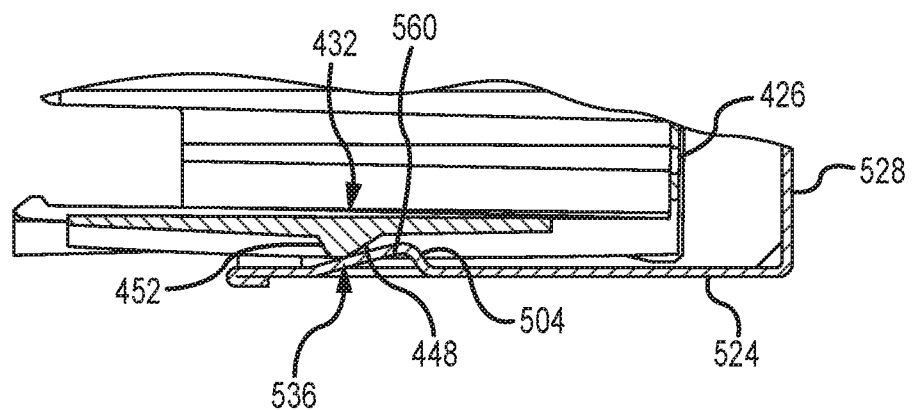
FIG.11c

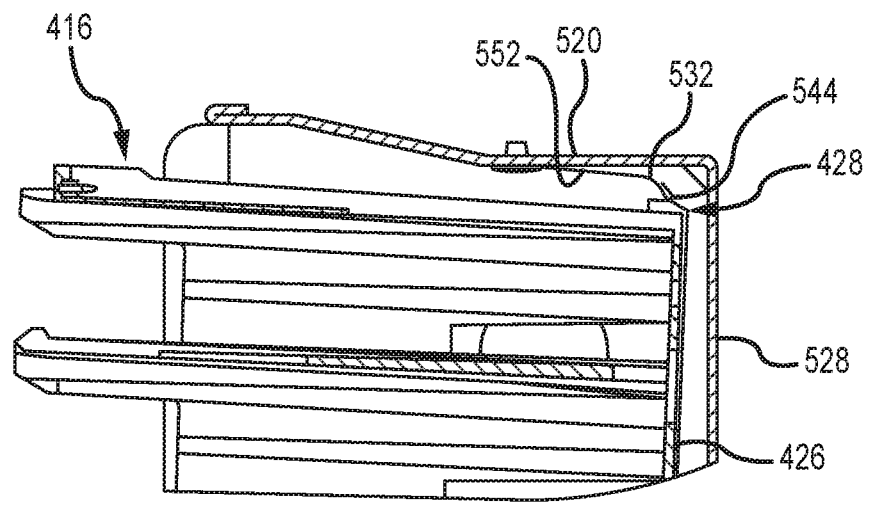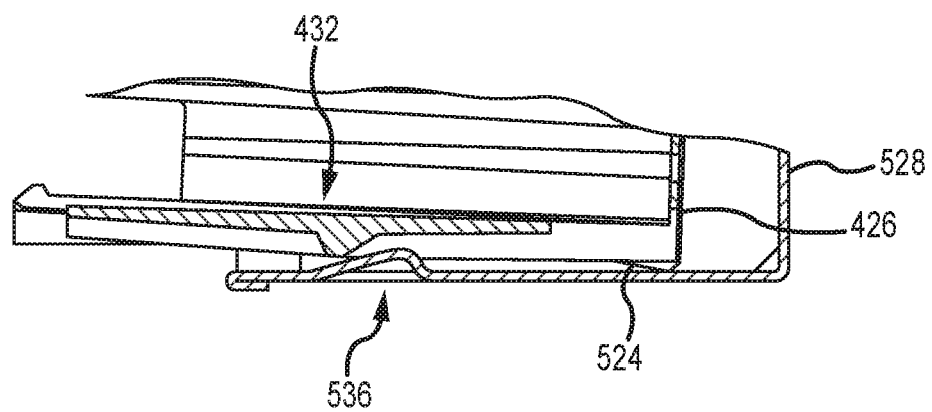
FIG.11d

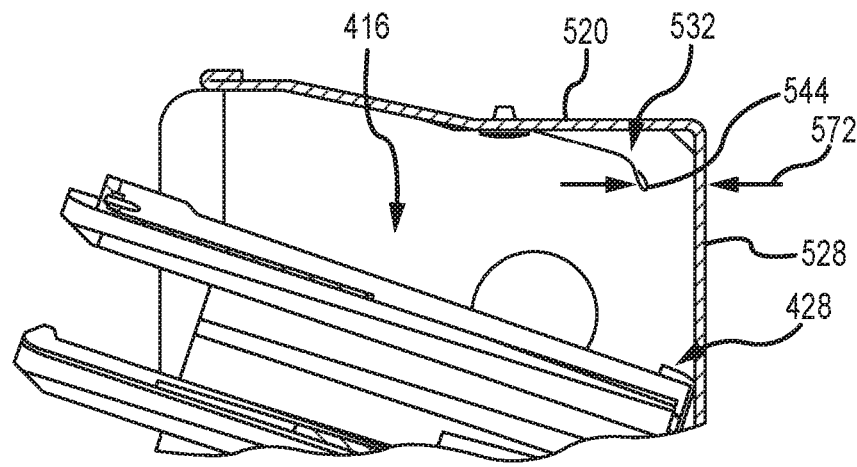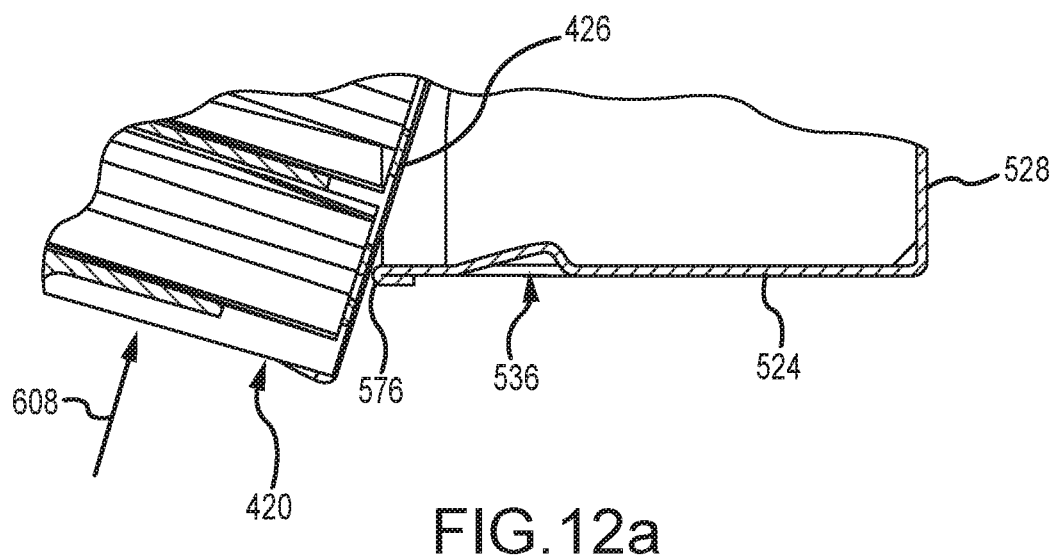
FIG.12a

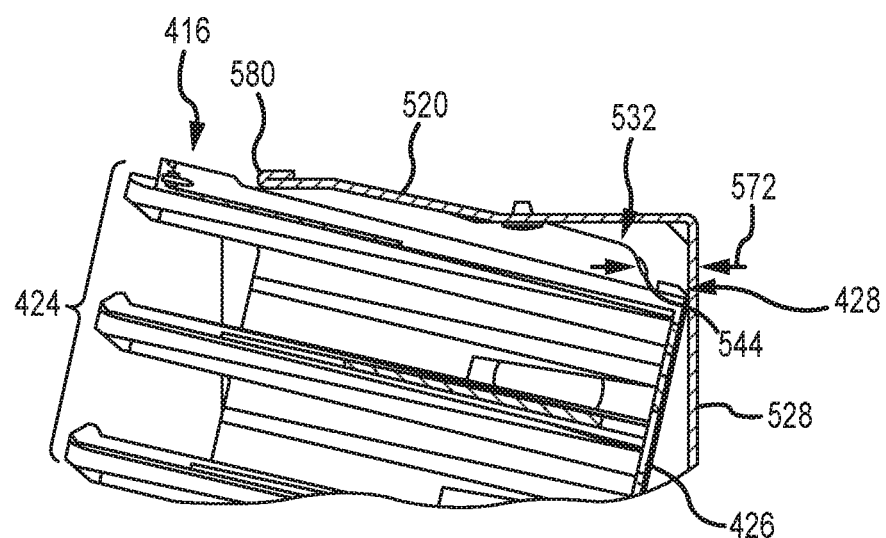
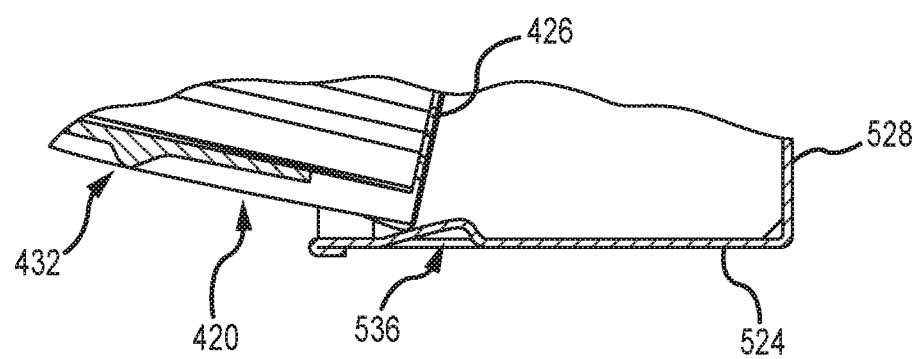
FIG.12b

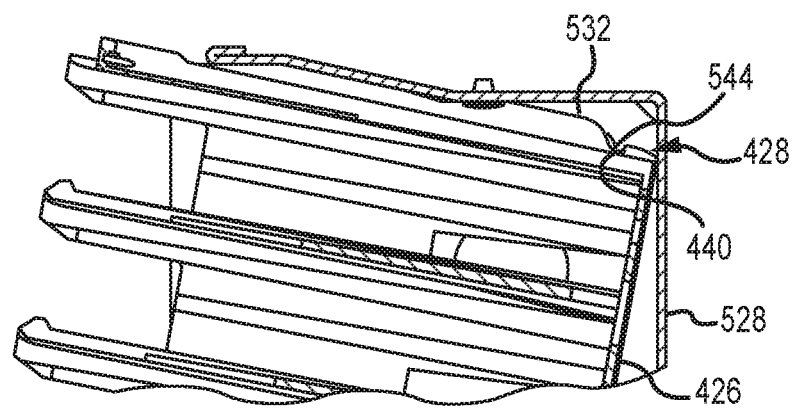
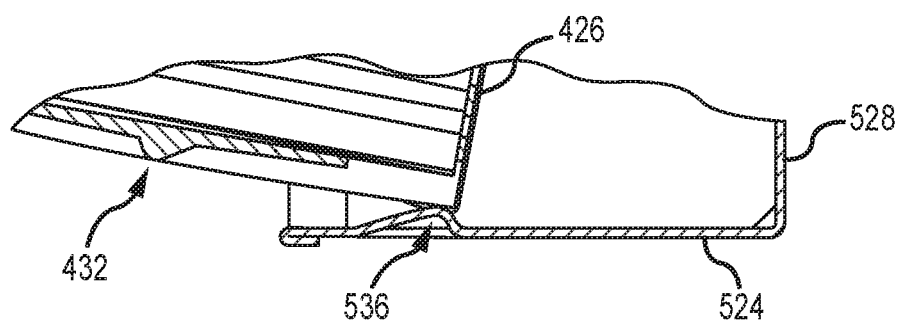
FIG.12c

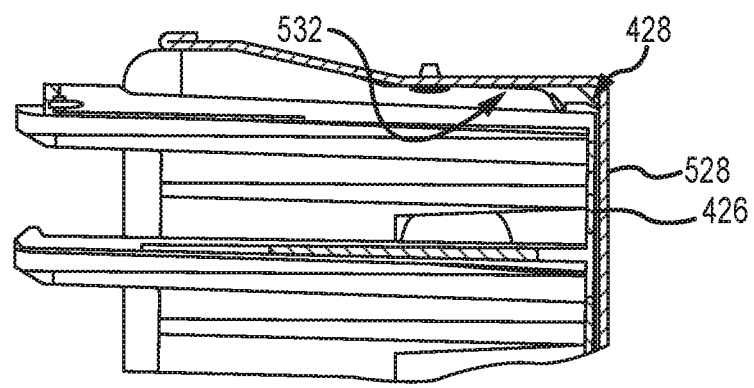
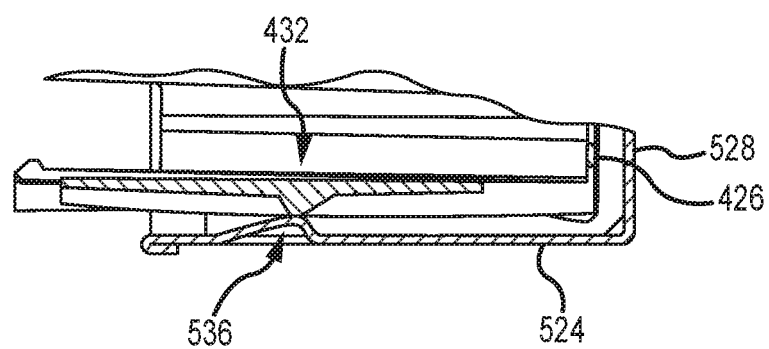
FIG.12d

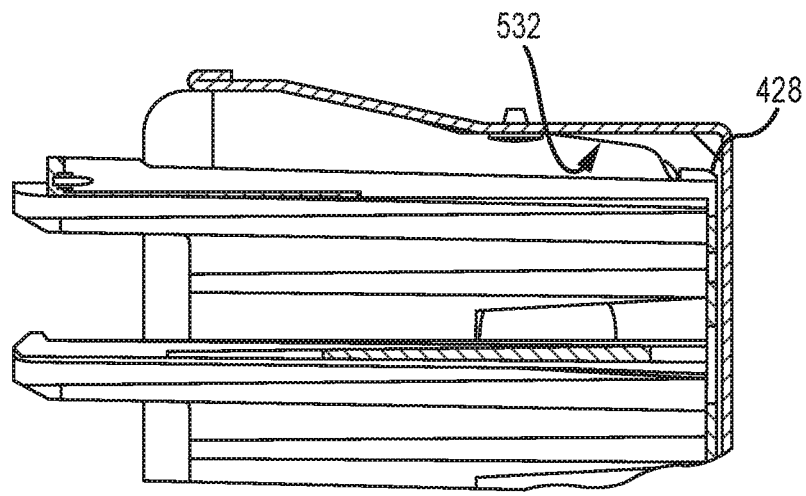
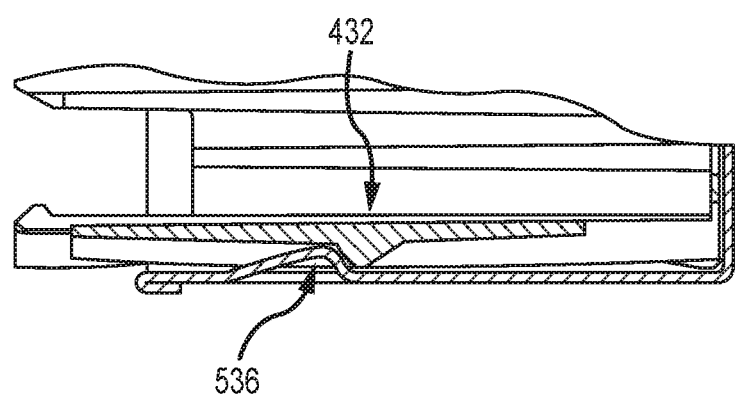
FIG.12e

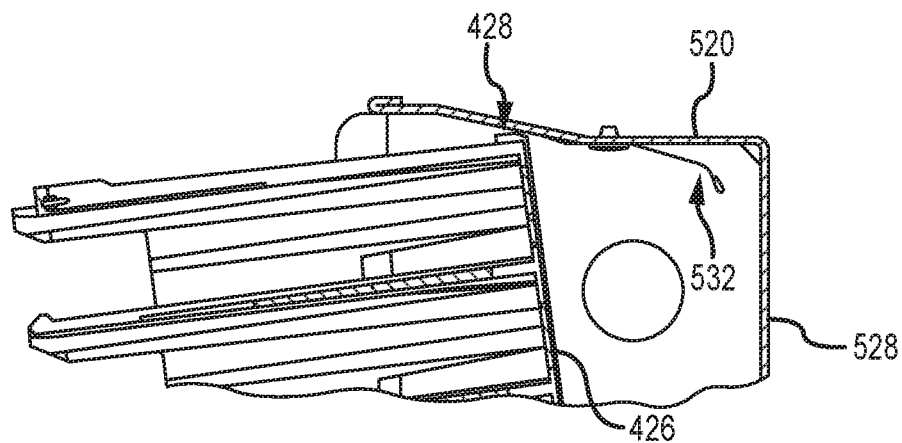
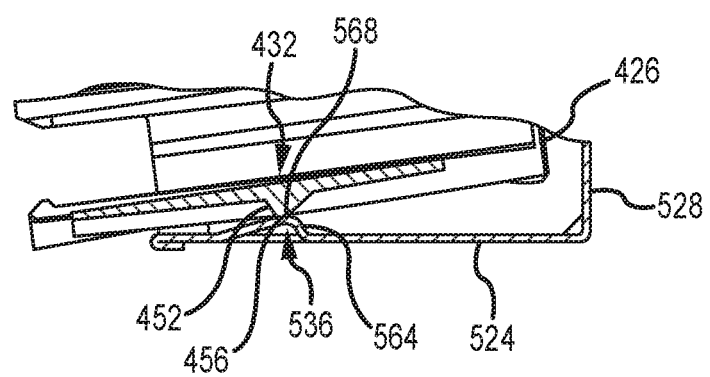
FIG.13c

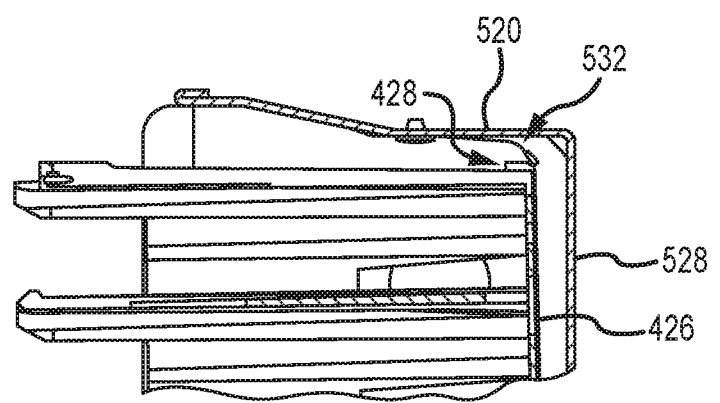
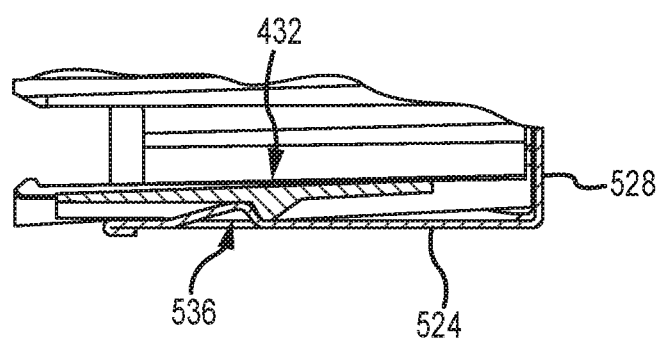
FIG.13d

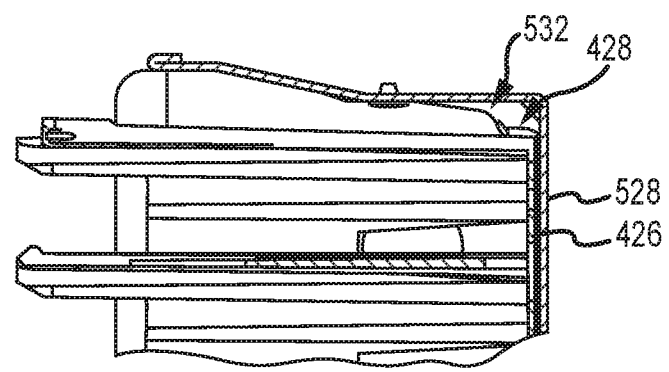
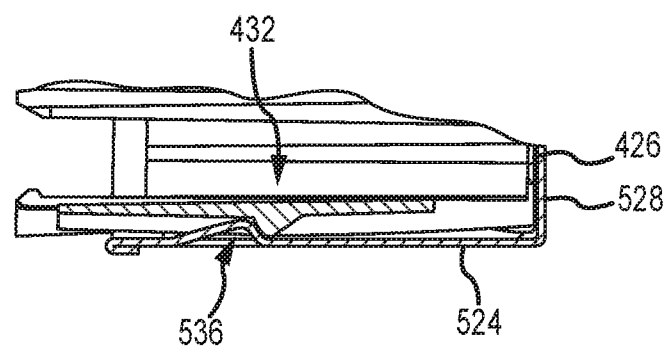
FIG.13e

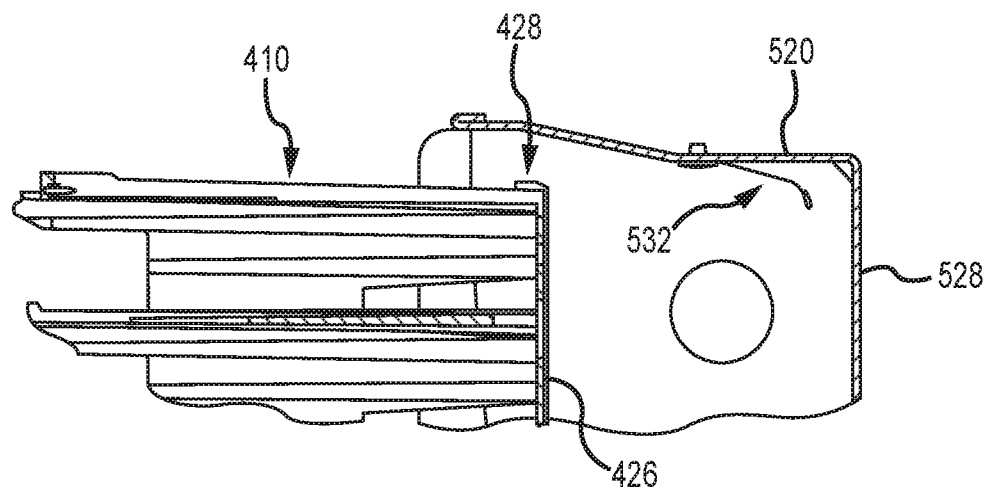
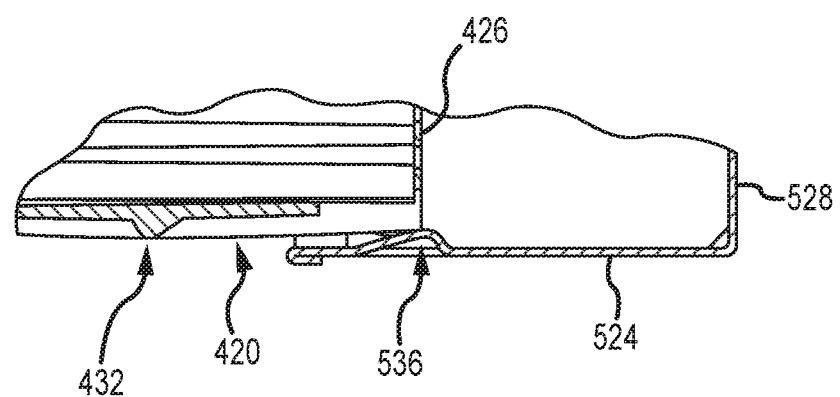
FIG.14a

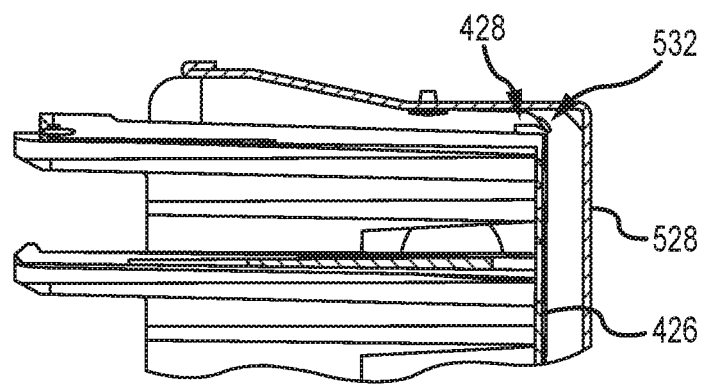
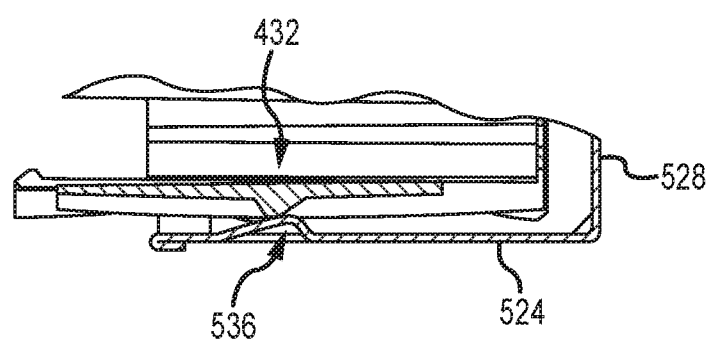
FIG.14b

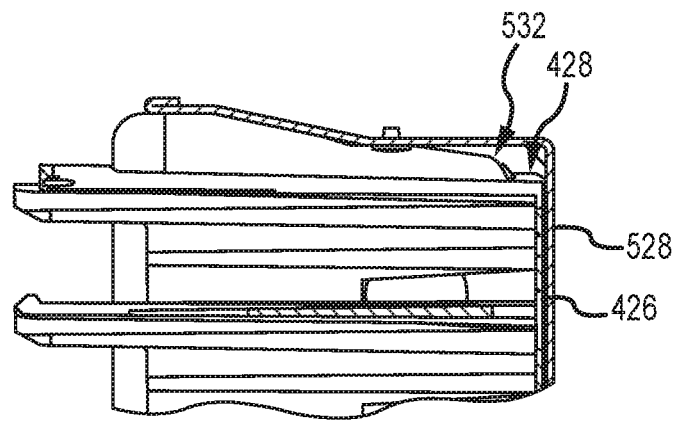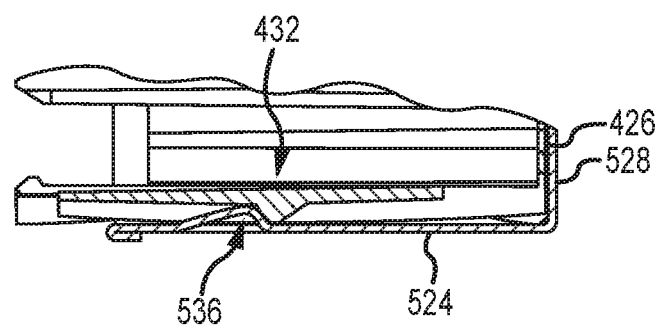
FIG.14c

MANAGEMENT OF ROBOTICS ASSEMBLY AND CARTRIDGE ACCESS PORT OF MEDIA ELEMENT STORAGE LIBRARY

CROSS REFERENCE TO RELATED APPLICATION

This application is a divisional of U.S. patent application Ser. No. 14/681,204, entitled "MANAGEMENT OF ROBOTICS ASSEMBLY AND CARTRIDGE ACCESS PORT OF MEDIA ELEMENT STORAGE LIBRARY," and filed on Apr. 8, 2015, which is a continuation of U.S. patent application Ser. No. 14/517,157, entitled "SYSTEM FOR LIMITING ACCESS TO INTERNAL ENVIRONMENT OF STORAGE LIBRARY VIA CARTRIDGE ACCESS PORT," filed on Oct. 17, 2014, and now U.S. Pat. No. 9,025,275, the entire contents of which are incorporated herein as if set forth in full.

BACKGROUND

1. Field of the Invention

The present invention relates generally to data storage libraries and, more particularly, to systems and methods of loading a plurality of tape cartridges into a tape library through a common access port.

2. Relevant Background

Storage library systems are often used by enterprises and the like to efficiently store and retrieve data from storage media. In the case of some storage libraries, the media may be data cartridges (e.g., tape cartridges) that are typically stored and indexed within a set of magazines that may be removably mounted within ports or slots inside the library. When particular data is requested, for instance, a specialized robotic assembly or mechanism (e.g., robotic module) finds the appropriate cartridge, removes the cartridge from its magazine, and carries the cartridge to a drive that is designed to receive the cartridge and read its contents. Some storage libraries have multiple drives that can operate concurrently to perform input/output (IO) operations on multiple cartridges.

An important component in the use of an automated storage or tape library is one or more cartridge access ports (CAPs). Generally, a CAP is a port or opening for tape cartridges and/or magazines to pass between the inside or interior environment of the tape library and the outside or exterior environment. After tape cartridges have been loaded onto or into respective slots in a magazine, the magazine may then be inserted into the CAP. In the event the tape cartridges are loaded with their front surfaces (e.g., including labels, bar codes, etc.) facing away from the operator (i.e., towards the inside of the tape library), the tape cartridges may be accessed by a robotics assembly within the tape library. When the tape cartridges are loaded with their front surfaces facing the operator, a portion of the CAP may be configured to rotate the magazine by 180° so that the front surfaces of the tape cartridges face the inside of the tape library for access by the robotics assembly.

SUMMARY

Existing CAPs on storage libraries are often limited in the number of available slots for loading and unloading tape cartridges or other media elements. For instance, many existing CAPs include a single opening for receipt of a single magazine having ten or so slots for receipt of corresponding tape cartridges. Even when tape libraries include multiple CAPs, the CAPs are not independently, simultaneously accessible by an operator, one or more robotics assembly, etc. For example, existing tape libraries are not configured to allow an operator to load tape cartridges into a first CAP of a tape library while a robotics mechanism within the tape library simultaneously unloads tape cartridges from a second CAP of the tape library (e.g., or while a plurality of robotics mechanisms within the tape library are simultaneously unloading or loading tape cartridges from or into a plurality of respective CAPs of the tape library). Various resulting tape library functionality inefficiencies include reduced tape cartridge load/unload cycles, longer tape cartridge access times, and the like.

In view of the foregoing, the inventors have determined that systems, apparatuses, methods and the like (e.g., utilities) are needed that increase the volume of media elements that can be simultaneously loaded and/or unloaded into or from a storage library, facilitate mounting of media element magazines into a storage library, and limit access to an interior of a storage library by users during operation of robotics assemblies inside of the storage library. Broadly, disclosed herein is a CAP for use with an automated storage library that includes a media element storage container that is pivotable (e.g., swingable) between at least first and second positions. In the first position, the storage container is adjacent an opening in a wall of a housing of the tape library for loading and unloading of media elements (e.g., tape cartridges) by a user into or from the storage container via the opening in the housing. As used herein, a "wall" of the housing includes vertical panels or surfaces, horizontal panels or surfaces, and/or the like. The storage container may include one or more openings for storage of media elements, where the openings face outward through the opening in the housing towards an exterior of the storage library in the first position for access by a customer. In the second position, the storage container is spaced from the opening in the housing for access to media elements in the storage container by a robotics assembly of the storage library. That is, the one or more openings of the storage container face towards the interior of the storage library in the second position.

The CAP may include any appropriate arrangement of mechanical and/or electromechanical components that are configured to limit access to the interior environment of the storage library when the storage container is in either of the first or second positions. For instance, the CAP may additionally include an access door that is movably (e.g., pivotally, slidably, etc.) attached to the housing between a first position covering the opening in the housing and a second position spaced from the opening in the housing. A latching assembly may be included that automatically locks the access door in its first position over the opening in the housing when the storage container is not in its first position adjacent the opening in the housing and automatically unlocks the access door to allow the access door to be moved into its second position spaced from the opening in the housing when the storage container is locked in its first position adjacent the opening in the housing.

Thus, the access door limits access to the interior of the storage library via the opening in the housing when the storage container is not in its first position (e.g., such as when the storage container is moving into its second position, when the storage container is fully seated in its second position, etc.) and the storage container itself limits access to the interior of the storage library when the storage container is in its first position (so that customers can load or remove media elements into or from the storage container via the opening in the housing). In other words, the latching assembly limits or prevents the storage container and access door from both being in their second positions simultaneously (that may otherwise allow for access to the interior environment of the storage container via the opening in the housing). In one arrangement, the storage container may be in the form of a cabinet (e.g., "bookshelf," box, etc.) having a backwall and a plurality of supports (e.g., shelves) extending away from the backwall towards a front of the cabinet and forming the one or more media element receiving openings. In this regard, the backwall may limit access into the interior of the storage library when the storage container is in its first position.

A particular storage library may have a plurality of the disclosed CAPs, such as where each respective robotics assembly of the storage library is associated with a dedicated CAP. In the case of a storage library having a plurality of rail assemblies along which robotics assemblies can travel or translate (e.g., slide), a respective CAP may be located adjacent each of first and second opposite ends of each rail assembly. In this regard, a particular robotics assembly may be operable to slide along a particular rail assembly to one of the respective CAPs to manipulate media elements therewith, such as to load media elements into the storage container of the CAP or to remove media elements from the storage container of the CAP. Furthermore, multiple different robotics assemblies may be simultaneously loading and/or unloading media elements into or from the storage containers of their respective CAPs based on different commands from a host computer interconnected to the storage library. Still further, users can load or unload media elements into or from a storage container of one or more CAPs while different robotics assemblies are manipulating media elements with respect to storage containers of other CAPs of the storage library.

When a user desires to perform an enter or load operation of a media element into the storage library, the user may initially input the enter operation into the host computer or software in communication with the storage library. For instance, a user may want to add new blocks of information to the storage library or increase the storage capacity of the storage library. As part of processing the enter operation, the host computer may make a number of determinations such as a location of an available slot in the library, a particular robotics assembly configured to manipulate media elements in the slot, the CAP of the particular robotics assembly, and the like. The host computer may then send a command to a library controller of the storage library to move the storage container of the CAP through a loading zone into its first position (e.g., via a drive motor disposed adjacent a pivot axis of the storage container). Before moving the storage container of the CAP into its first position, the host computer may trigger the robotics assembly (e.g., via a library controller) to unload one or more media elements from the storage container to make room for the media element(s) to be loaded by the user and then to move the robotics assembly out of the loading zone to allow the storage container to be moved into the first position.

Movement of the storage container into its first position may automatically lock the storage container in the first position and automatically unlock the access door from its first position to allow the access door to be moved away from the opening in the housing (e.g., via the latching assembly). In one arrangement, the latching assembly may automatically pop open the access door (e.g., move it at least slightly away from its first position towards the second position) whereby a user may grasp the access door and open it the rest of the way. At this point, the one or more openings of the storage container as well as any media elements therein may be viewable and accessible to the user through the opening in the housing of the storage library. In the case of the storage container being in the form of a bookshelf, the entire bookshelf may be directly presented to the user for easy access thereof.

At this point, the user may insert one or more media elements into one or more slots of the storage container (which may require removing one or more media elements from the storage container to make room for the one or more media elements to be added). The user may then move (e.g., push) the access door back into its first position over or adjacent the opening in the housing of the storage library. As the access door is pushed so as to be fully seated in its first position, a portion of the access door may engage a portion of the latching assembly which substantially simultaneously locks the access door in its first position and unlocks the storage container. The storage container may then be moved (e.g., under motor control) through the loading zone back into its second position within the storage library. At this stage, the robotics assembly may, if necessary, be moved (e.g., under control of the library controller via the host system) into the loading zone to manipulate media elements of the storage container.

Eject operations may be performed somewhat similarly to the above-discussed enter operations. For example, the user may input the eject operation into the host computer which may appropriately determine a location of the media element to be ejected and then automatically trigger the appropriate robotics assembly to retrieve the media element and insert the same into the storage container of the respective CAP of the robotics assembly. The storage container may then be pivoted (e.g., under motor control via the library controller and the host computer) into its first position adjacent the corresponding opening in the housing of the storage library and into engagement with the latching assembly to lock the storage container in its first position and substantially simultaneously unlock the access door. The user may then open the access door and remove the one or more media elements from the storage container.

In some arrangements, users may be able to access a particular CAP directly from the storage library rather than having to initiate an access command from a host computer. For instance, a series of buttons or other user manipulable features may be disposed on an outer wall of the housing adjacent each respective CAP of the storage library. Each button may be in electrical communication with the library controller and/or host computer and be configured to convey a different command thereto. In one arrangement, one button may, when manipulated (e.g., depressed), be configured to send a "CAP access" command to the library controller. Upon receipt of the command, the library controller may coordinate with the host computer to move the particular robotics assembly out of the loading zone of the respective CAP and then pivot the storage container of the CAP into its first position so as to lock the storage container in the first position and substantially simultaneously unlock the respective access door so that the one or more openings of the storage container can be accessed via the opening in the housing of the storage library.

In one arrangement, one or more ports at various heights in the storage library may be configured to receive media element magazines from various angles to facilitate insertion and removal of the magazines into and from the ports by users. As an example, upper and lower portions of the magazine may include first and second engagement features (e.g., mounting apparatuses) that are respectively configured to engage with corresponding first and second engagement features (e.g., mounting apparatuses) adjacent upper and lower portions of a respective port of the storage library. The respective engagement features may allow the user to insert either the top or bottom portion or end of the magazine first into the port and then slide the top or bottom portion or end toward the respective top or bottom portion of the port before inserting the other of the top or bottom portion or end of the magazine into the port (adjacent the respective other of the top or bottom portion of the port) to fully seat the magazine in the port. The respective engagement features also allow a user to insert the upper and lower portions of the magazine into the upper and lower portions of the port substantially simultaneously to fully seat the magazine in the port.

As just one example, a user may find it easier to first insert the upper portion of the magazine into a port and slide the upper portion towards the upper portion of the port and then insert the bottom portion of the magazine into the bottom portion of the port when the port is located above waist level or even above head level. To remove the magazine from the port, the user may initially grasp and lift either of the upper or lower portions of the magazine to disengage the second engagement feature adjacent the bottom of the magazine from the second engagement feature adjacent the bottom of the port. Thereafter, the lower portion of the magazine may be pulled away from the port by pivoting the magazine outwardly about the first engagement feature of the port. After the magazine has at least partially pivoted in this manner, the first engagement feature adjacent the upper portion of the magazine may be at least partially slid away from the other first engagement feature of the port and then the entire magazine removed from the port. In one variation, a user may instead push downwardly on either of the upper or lower portions of the magazine to disengage the first engagement feature adjacent the top of the magazine from the first engagement feature adjacent the top of the port and then pivot the magazine about the second engagement feature of the port to facilitate removal of the magazine from the port.

In one arrangement, the ports may be formed in the storage containers of the CAPs disclosed herein. In this regard, a user may be able to insert or remove a magazine from a storage container of a CAP in any of the manners discussed herein. In one arrangement, each storage container of the CAPs may include a plurality of side by side ports, where each port is configured to receive a respective corresponding magazine.

In one aspect disclosed herein, a method of operating a media element storage library includes accessing, by a robotics assembly of the media element storage library, at least one opening in a first position of a storage container that is pivotable through a loading zone of the media element storage library between the first position and a second position in which the at least one opening in the storage container faces an opening in a wall of the media element storage library through which users can access the at least one opening in the storage container.

In another aspect disclosed herein, a method of operating a media element storage library include receiving at least one media element in at least one opening of a storage container through an opening in a wall of the media element storage library; swinging the storage container away from the opening in the wall; and removing, by a robotics assembly, the at least one media element from the at least one opening of the storage container.

In a further aspect disclosed herein, a method of operating a media element storage library includes receiving, at a system controller of the media element storage library, a request for a file stored in the media element storage library; identifying, by the system controller, a media element within the media element storage library on which the file is stored; triggering, in response to the identifying, a robotics assembly within the media element storage library to: retrieve the media element from a slot in the media element storage library and insert the media element into at least one opening in a storage container; and pivoting the storage container into a position adjacent an opening in a wall of the media element storage library so that the media element is accessible through the opening in the wall.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 6a is a front perspective view of a CAP according to an embodiment.

FIG. 6b is a rear perspective view of the CAP of FIG. 6a with a storage container and an access door of the CAP both being in an open position.

FIG. 6c is a plan view of the CAP of FIG. 6a.

FIG. 7b is a close-up perspective view of the latching assembly of FIG. 7a.

FIG. 11a is a sectional view of the magazine and port of FIGS. 9a-9b at one stage of a first manner of installation of the magazine into the port.

FIG. 11c is a sectional view of the magazine and port of FIGS. 9a-9b at another stage of the first manner of installation of the magazine into the port.

FIG. 11d is a sectional view of the magazine and port of FIGS. 9a-9b at another stage of the first manner of installation of the magazine into the port.

FIG. 12a is a sectional view of the magazine and port of FIGS. 9a-9b at one stage of a second manner of installation of the magazine into the port.

FIG. 12b is a sectional view of the magazine and port of FIGS. 9a-9b at another stage of the second manner of installation of the magazine into the port.

FIG. 12c is a sectional view of the magazine and port of FIGS. 9a-9b at another stage of the second manner of installation of the magazine into the port.

FIG. 12d is a sectional view of the magazine and port of FIGS. 9a-9b at another stage of the second manner of installation of the magazine into the port.

FIG. 12e is a sectional view of the magazine and port of FIGS. 9a-9b at another stage of the second manner of installation of the magazine into the port.

FIG. 13c is a sectional view of the magazine and port of FIGS. 9a-9b at another stage of the third manner of installation of the magazine into the port.

FIG. 13d is a sectional view of the magazine and port of FIGS. 9a-9b at another stage of the third manner of installation of the magazine into the port.

FIG. 13e is a sectional view of the magazine and port of FIGS. 9a-9b at another stage of the third manner of installation of the magazine into the port.

FIG. 14a is a sectional view of the magazine and port of FIGS. 9a-9b at one stage of a fourth manner of installation of the magazine into the port.

FIG. 14b is a sectional view of the magazine and port of FIGS. 9a-9b at another stage of the fourth manner of installation of the magazine into the port.

FIG. 14c is a sectional view of the magazine and port of FIGS. 9a-9b at another stage of the fourth manner of installation of the magazine into the port.

DETAILED DESCRIPTION

Disclosed herein are utilities that increase the volume of media elements that can be simultaneously loaded and/or unloaded into or from a storage library, facilitate mounting of media element magazines into a storage library, and limit access to an interior of a storage library by users during operation of robotics assemblies inside of the storage library. One of the disclosed utilities includes a CAP (or media element access port) for use with an automated storage library that has a media element storage container that is pivotable (e.g., swingable) between at least first and second positions. In the first position, the storage container is adjacent an opening in a housing of the tape library for loading and unloading of media elements (e.g., tape cartridges) by a user into or from the storage container via the opening in the housing. After the storage container has swung into the second position, the storage container is spaced from the opening in the housing and faces the interior of the storage library for access by a robotics assembly to media elements in the storage container.

A storage library may include a plurality of the disclosed CAPs for respective access by a respective plurality of robotics assemblies inside the storage library. Each of the CAPs may be independently and simultaneously manipulatable by users and/or by respective robotics assemblies in different manners to increase the efficiency and throughput of the storage library. For instance, a user may be loading media elements into the storage container of one CAP of a storage library at the same time that one or more robotics assemblies are grabbing and removing media elements from (and/or loading media elements into) the storage containers of one or more respective other CAPs of the storage library (e.g., CAPs that are above or below the first CAP, across from the first CAP, etc.).

Figure 1:
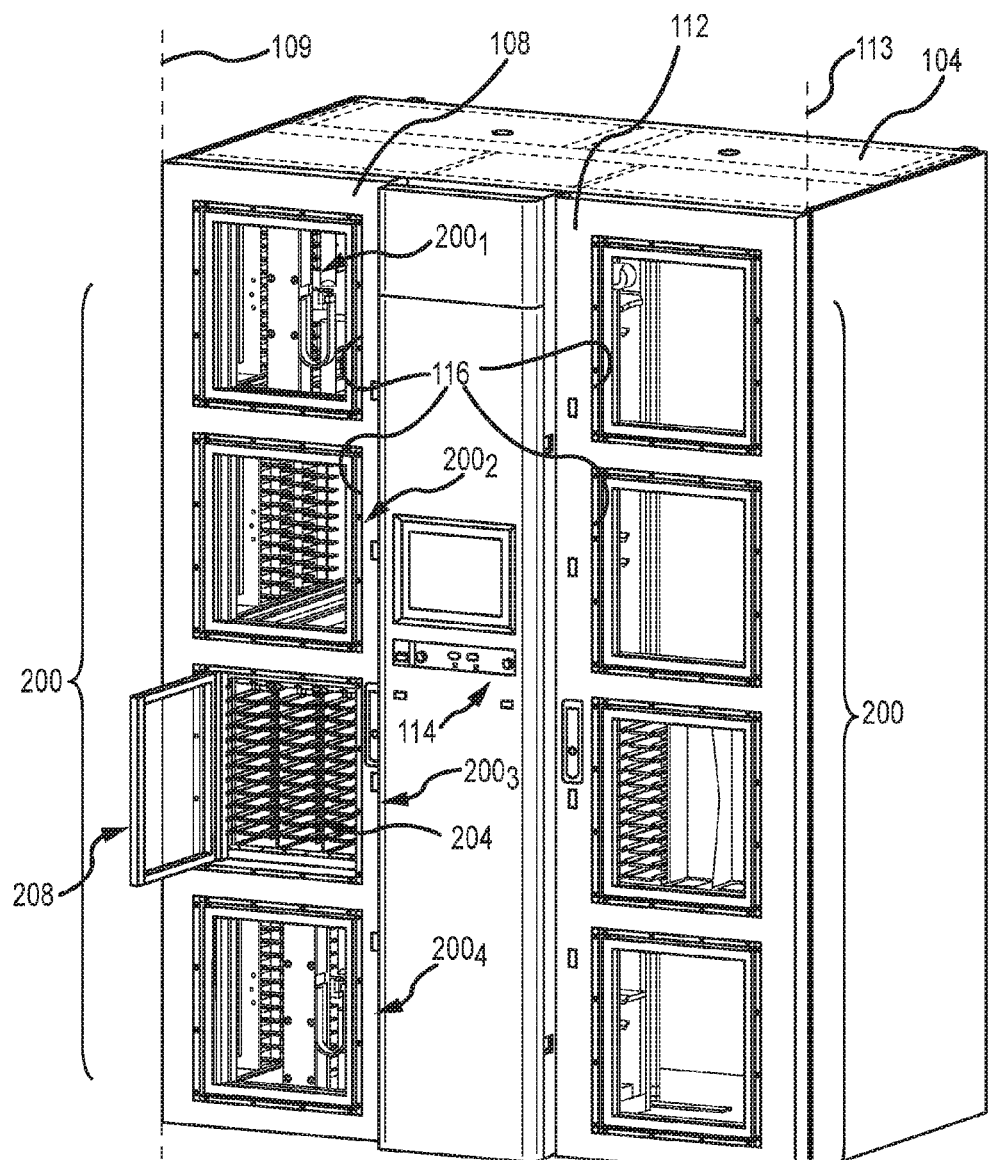
FIG. 1 is a perspective view of an exterior portion of a storage library that includes a plurality of CAPs according to an embodiment.
Figure 2:
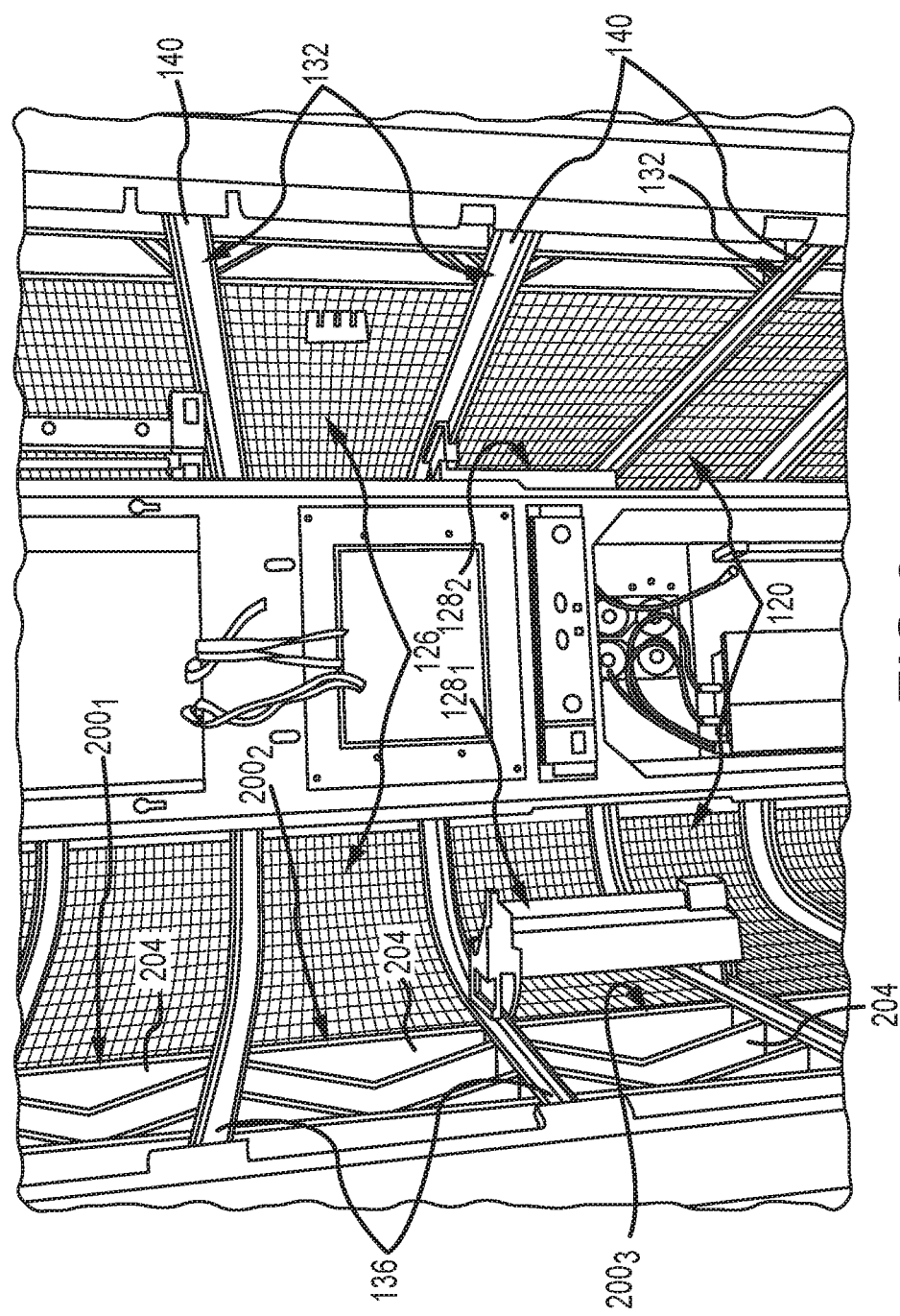
FIG. 2 is a perspective view of an interior portion of the storage library of FIG. 1 with first and second service doors of the storage library being open.

With initial reference to FIGS. 1-5, one embodiment of a storage library 100 is illustrated in which a plurality of CAPs 200 as disclosed herein may be incorporated. Broadly, the storage library 100 may be a data storage and retrieval system for one or more hosts, computers, servers, and/or the like. In this regard, the storage library 100 may be designed for handling and storing a plurality of media elements and for reading and writing to the media elements using media element players. As used herein, a media element denotes any physical substrate suitable for storing data, such as a tape cartridge. A media element player may be a media element reader and/or writer (such as a tape drive) that translates the data stored on a media element into signals readable by a computer and/or server for reading and writing operations on media elements in response to command from a host, computer and/or server. While FIG. 1 illustrates one embodiment of a storage library, it is to be understood that CAPs and other utilities disclosed herein may be utilized in numerous other arrangements and contexts in which it is desired to safely, securely and efficiently load and unload components, objects, devices etc. into or from any appropriate storage arrangement.

Generally, the storage library 100 may include a housing 104 in the form of a framework of vertical or horizontal framing members that are covered by a plurality of vertical and horizontal wall or panel members (not labeled) and that form an interior portion or environment 120 (labeled in FIGS. 2 and 4a-4c) for storing media elements and media players. A plurality of removable media element modules 126 (e.g., magazines, see FIGS. 2 and 4a-4c) of any appropriate form factors may be removably secured to interior walls of the housing 104 inside the interior portion 120 of the housing 104 in any appropriate manner (via latches, thumbscrews, and/or the like). Each media element storage module 126 may include one or more cells or slots (not labeled) for receipt of one or more corresponding media elements and/or media players.

To manipulate one or more of the media elements within the housing 104, the storage library 100 may include a plurality of robotics assemblies 128 that are respectively configured to slide along rail assemblies 132 within the housing 104 under control of a library controller or control unit via commands received from a host computer. As just one example, first and second robotics assemblies $128_1$, $128_2$ (see FIG. 2) may each be configured to slide or translate along one or more of the rails assemblies 132 at a particular level (e.g., height) of the storage library 100 for manipulating media elements at the particular level (e.g., removing media elements from a media element storage module 126 and inserting the same into a media element player or vice versa, reading labels on the media players or media elements, reading labels of media elements, unloading media elements from respective first and second CAPs 200 and loading the media elements into a media element storage module 126 or media player of the storage library 100 as discussed in more detail below, etc.). One or more additional robotics assemblies 128 may be configured to slide along respective rail assemblies 132 at one or more additional levels of the storage library 100 for manipulation of media elements thereof (see FIGS. 4a-4c).

One or more service doors, such as first and second service doors 108, 112 of the housing 104 may be respectively opened (e.g., such as pivoting the first and second service doors 108, 112 about respective axes 109, 113) to provide walk-in access to the interior portion 120 of the storage library 100 (e.g., such as to perform any necessary maintenance or service on components within the interior portion 120 while robotics assemblies 128 within the interior portion 120 are not in service). Each rail assembly 132 may generally include a first end 136 adjacent the first service door 108 and an opposite second end 140 adjacent the second service door 112. In one arrangement, each robotics assembly 128 may be generally configured to slide along a substantial entirety of a particular rail assembly 132 between its first and second ends 136, 140.

In the case where two or more robotics assemblies 128 are engaged with the same rail assemblies 132 on the same level of the storage library 100, each of such robotics assemblies 128 may be configured to slide or otherwise move only along particular sections of the rail assemblies. For instance, first robotics assembly 1281 of FIG. 2 may be configured to generally slide between first end 136 of rail assemblies 132 and a substantial midpoint of the rail assemblies 132 (e.g., in the back of storage library 100, not visible in FIG. 2) while second robotics assembly 1282 of FIG. 2 may be configured to generally slide between second end 136 of rail assemblies 132 and a substantial midpoint of the rail assemblies 132. As another example, each of the first and second robotics assemblies $128_1$, $128_2$ may be configured to slide along a substantial entirety of the rail assemblies 132 between the first and second ends 136, 140 (e.g., but not past the other of the first and second robotics assemblies $128_1$, $128_2$.

While the first and second service doors 108, 112 could be opened to allow users to insert and remove media elements into or from the interior portion of the housing 104, doing so would generally be impractical due to the need to shut or power down one or more of the robotics assemblies 128 and/or other components or equipment within the interior portion 120 of the housing 104 to limit injury to the users and damage to such equipment. In this regard, the storage library 100 includes a plurality of CAPs 200 disposed within respective openings 116 through the housing 104 of the storage library 100 that allow users to insert media elements into and remove media elements from the interior portion 120 of the storage library 100 via the CAPs 200 free of having to open the service doors 108, 112 and/or shut down or take robotics assemblies 128 and other components within the interior portion 120 out of service. Even though each of the openings 116 (and thus the CAPs 200) is shown as being disposed through one of the first or second service doors 108, 112, the openings 116 and CAPs 200 may in other embodiments be disposed through other walls or portions of the housing 104 (e.g., non-movable walls) to facilitate insertion and removal of media elements into and from the interior portion 120 of the housing 104. A plurality of CAPs 200 may be arranged along horizontal and/or vertical axes.

At least one opening 116 and a respective CAP 200 may be disposed at each respective level (e.g., height) of the storage library 100 so as to allow users to access media elements on each level of the storage library 100. As shown, each level of the storage library 100 may have first and second CAPs 200, such as a first CAP 200 in the first service door 108 adjacent the first end 136 of the rail assemblies 128 for robotics assemblies 132 that manipulate media elements on the level and a second CAP 200 in the second service door 112 adjacent the second end 140 of the rail assemblies 128 for robotics assemblies 132 that manipulate media elements on the level. In the case where each level of the storage library 100 includes a single robotics assembly 128, each robotics assembly 128 may be able to access either the first CAP 200 of the first service door 108 or the second CAP 200 of the second service door 112 (e.g., by sliding along the rail assemblies 128 to either the first or second end 136, 140). In the case where each level of the storage library 100 includes first and second robotics assemblies 128, such as first and second robotics assemblies $128_1$, $128_2$ of FIG. 2, the first robotics assembly $128_1$ may be configured to access the first CAP 200 of the first service door 108 and the second robotics assembly $128_2$ may be configured to access the second CAP 200 of the second service door 112.

Figure 3:
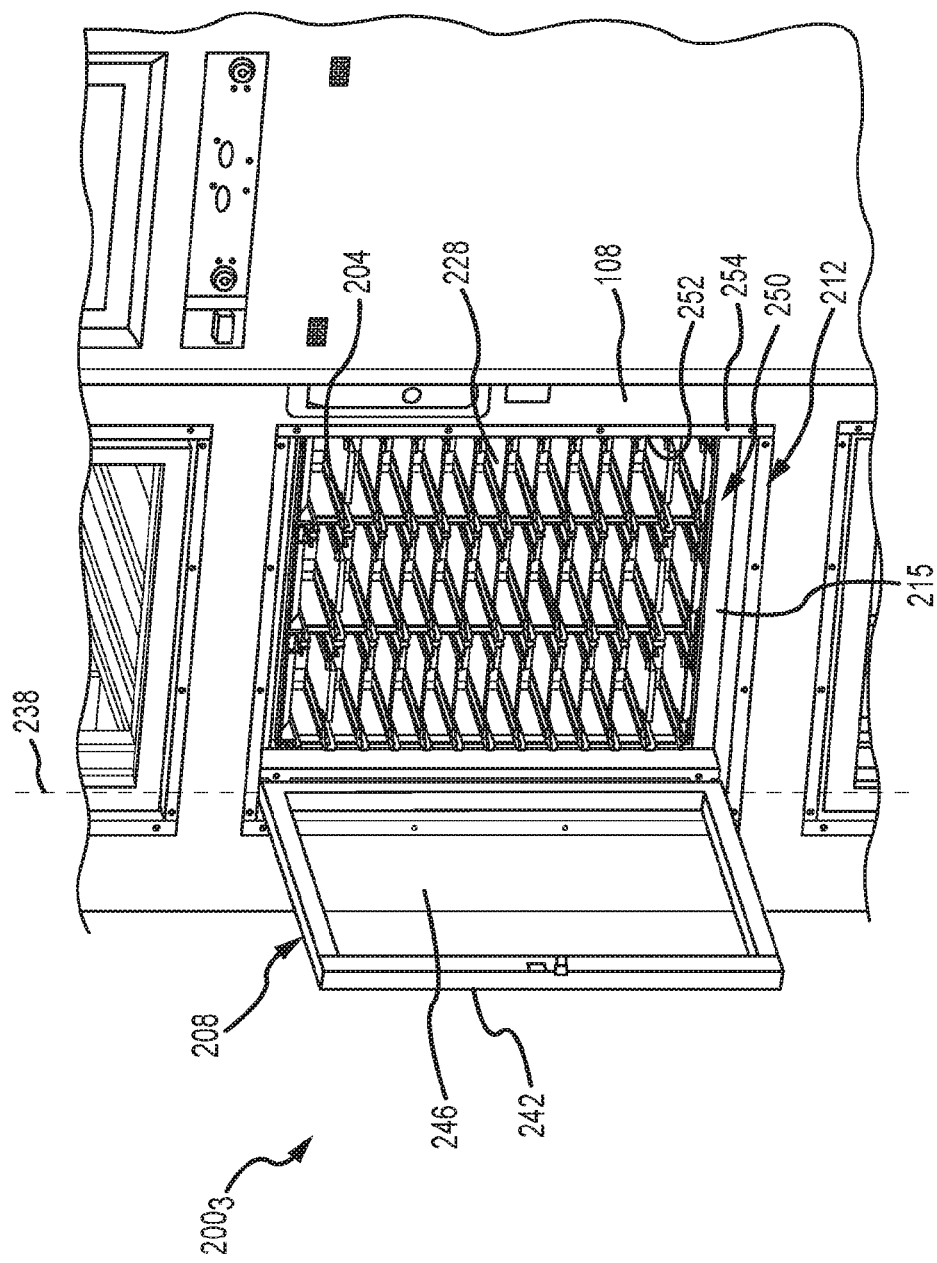
FIG. 3 is an exterior perspective view of one of the CAPs of FIG. 2 with a storage container of the CAP in a first position adjacent an opening through a housing of the storage library and an access door of the CAP in an open second position away from the opening through the housing of the storage library.
Figure 4A:
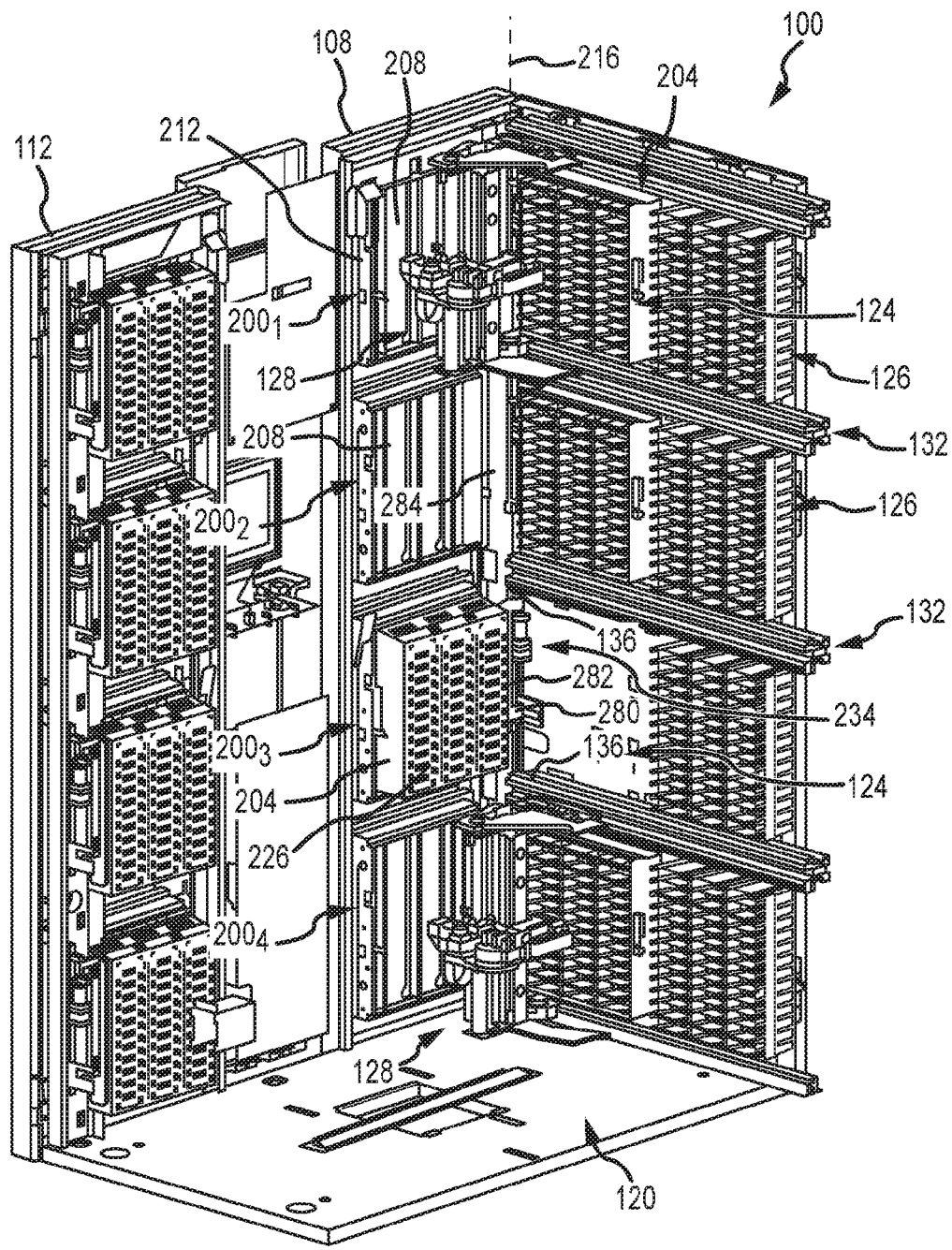
FIG. 4a is an interior perspective view of the storage library of FIG. 1 and showing the storage container of the CAP of FIG. 3 in the first position.
Figure 4B:
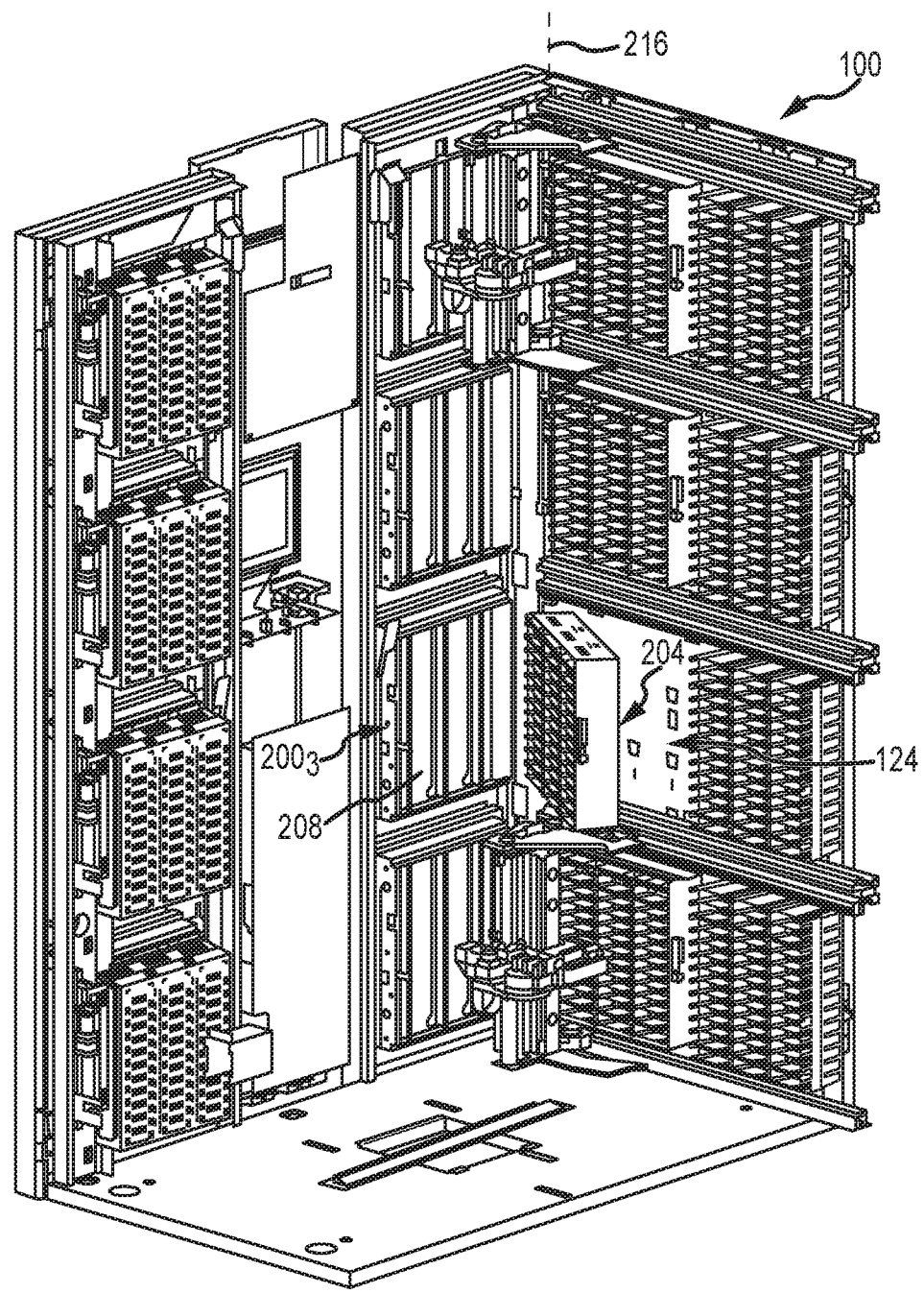
FIG. 4b is an interior perspective view of the storage library similar to FIG. 4a but showing the storage container of the CAP of FIG. 3 in an intermediate position as it moves through a loading zone of the CAP.
Figure 4C:
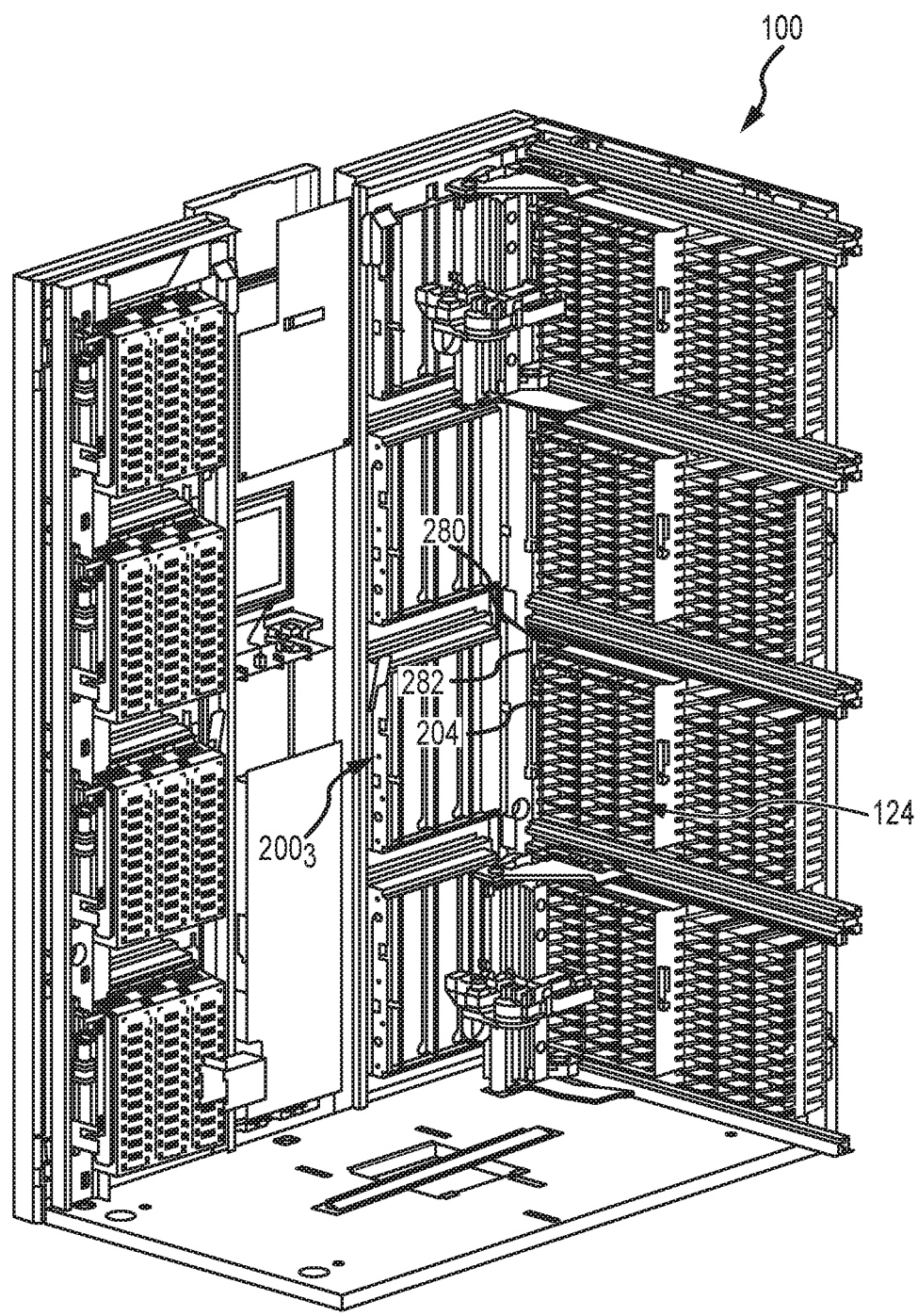
FIG. 4c is an interior perspective view of the storage library similar to FIG. 4b but showing the storage container of the CAP of FIG. 3 in an open second position within the interior portion of the storage library away from the opening in the housing.
Figure 5:
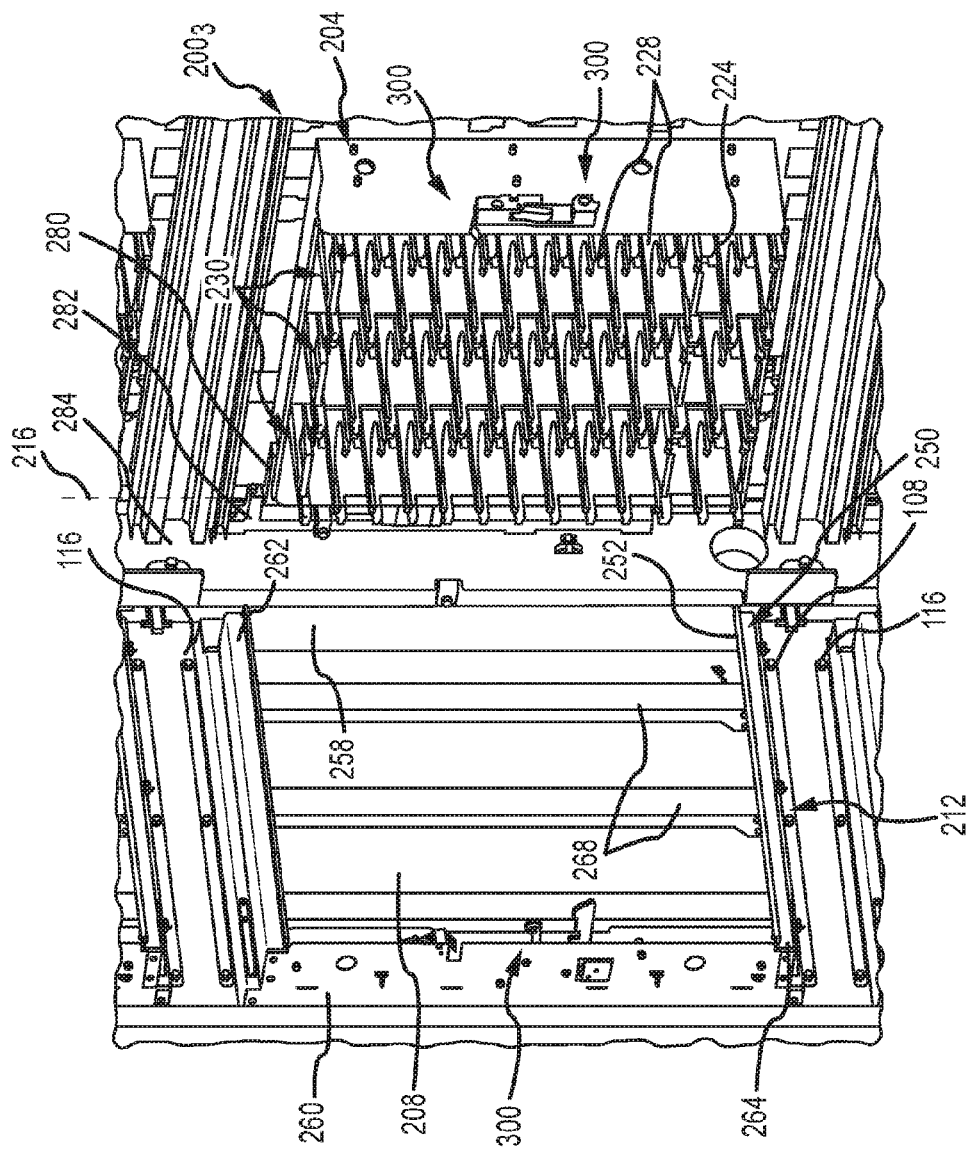
FIG. 5 is an interior perspective view of the CAP of FIG. 3 with the storage container of the CAP in a second position away from the opening through the housing of the storage library and the access door of the CAP in a closed first position adjacent the opening through the housing of the storage library.

Broadly, each CAP 200 includes a storage container 204 that is configured to pivot or swing within the interior portion 120 about a pivot axis 216 from a first position adjacent the respective opening 116 in the housing 104 (see storage container 204 of CAP $200_3$ in FIGS. 1, 3 and 4a) through a respective "loading zone" 124 of the storage library 100 (see storage container 204 of CAP $200_3$ in FIG. 4b) to a second position spaced from the opening 116 (see storage container 204 of CAP $200_3$ in FIGS. 4c and 5). Each storage container 204 may generally include a body or housing 220 of any appropriate shape and form (e.g., in the form of a box, "bookshelf," etc.) that includes at least one opening 224 for receipt of one or more media elements and a back or rear wall 226 (see FIGS. 4a and 5) that prevents or limits media elements and/or other items (e.g., human hands) from passing all the way through the storage container 204. The storage container 204 of each CAP 200 may be pivotally secured to or relative to the housing 104 about the pivot axis 216 in any appropriate manner. For instance, a first bracket member 280 that is rigidly or otherwise non-movably secured to the storage container 204 may be appropriately pivotally secured to a second bracket member or assembly 282 that is rigidly or otherwise non-movably secured to the housing 104. See FIGS. 4a, 4c and 5.

In this regard, the storage container 204 may also be considered a door that, when in its closed first position, prevents or inhibits access into the interior portion 120 of the storage library 100. In one arrangement, the at least one opening 224 may include a plurality of slots or cells 228 (see FIGS. 3 and 5), each of which is sized for receipt of a respective corresponding media element (e.g., such as with a label of the media element facing outward away from the storage container 204). In one variation, the opening 224 of the storage container 204 may be sized for receipt of one or more media element storage modules 230 (e.g., magazines), where each media element storage module includes a plurality of slots 228 therein.

In the first position (e.g., see FIG. 3), the opening 224 (and slots 228) of the storage container 204 faces outwards through the respective opening 116 of the housing 104 towards an exterior environment outside of the storage container 204 so that users may load or unload media elements (e.g., tape cartridges) into or from the slots 228 of the storage container 204 via the respective opening 116 in the housing 104 (e.g., such as after one or more appropriate commands have been sent from a host computer to a library controller of the storage library 100). In the second position (e.g., see storage containers 204 of CAPs $200_1$, $200_2$, $200_4$ in FIGS. 4a-4c and storage containers 204 of CAP $200_3$ FIG. 4c), the opening 224 and slots 228 of the storage container 204 face the interior portion 120 of the housing 104 so that a robotics assembly 128 on the particular level of the storage library 100 can manipulate media elements of the storage container 204.

With reference to FIGS. 4a-4c, for instance, it can be seen how storage containers 204 are disposed against the inside wall(s) of the housing 104 (e.g., where back walls 226 are disposed adjacent the inside walls of the housing 104) in a manner similar to the media element storage modules 126 of the housing 104. More specifically, the storage containers 204 may generally have a similar profile to those of the media element storage modules 126 within the housing 104. In this regard, each robotics assembly 128 may be able to slide along the rail assemblies 132 over a particular storage container 204 and manipulate media elements of the storage container (e.g., inserting or removing media elements) in the same manner as if the robotics assembly 128 was manipulating media element storage modules 126 on the same level in the storage library. The library controller and host computer may communicate to move a robotics assembly 128 out of the loading zone 124 of a particular CAP 200 before the storage container 204 of the CAP 200 swings from the first position to the second position or vice versa (e.g., via a motor 234 configured to pivot the storage container 204 about the pivot axis 216 between the first and second positions, see FIGS. 2b and 5).

With reference to FIGS. 1 and 3-4c, each CAP 200 may also include at least one access door 208 that is movably mounted to or relative the housing 104 between at least a closed, first position that covers an opening 116 in the housing and thereby limits access to the interior portion 120 of the housing (e.g., see access doors 208 of CAPs $200_1$, $200_2$, $200_4$ of FIGS. 1 and 4a-4c) and an open, second position where the access door 208 is spaced from the opening 116 in the housing 104 and allows access to the opening 224 or slots 228 of the storage container 204 of the CAP 200 (e.g., when the storage container 204 is in its first position adjacent the opening 116, see access door 208 of CAP $200_1$ of FIGS. 1 and 3). In one arrangement, the access door 208 may be pivotally secured to or relative to the housing 104 about a pivot axis 238 (see FIG. 3) between the first and second positions. As an example, the access door 208 may be pivotally secured to or relative to one of the first or second service doors 108, 112 of the housing 104. For instance, the access door 208 may be movably secured to a framing assembly 212 that is rigidly or otherwise non-movably secured to one of the first or second service doors 108, 112 within one of the openings 116. When the access door 208 is pivotally secured to one of the first or second service doors 108, 112, the pivot axis 238 may thus be movable relative to the pivot axis 216 about which the storage container 204 pivots or swings (e.g., during pivoting of the one of the first or second service doors 108, 112). In another arrangement (not shown), the access door 208 may be slidably secured to or relative to the housing 104 (e.g., one of the first and second access doors 108, 112) between the first and second positions (e.g., such as where opposite lateral edges of the access door 208 are slidably received in corresponding spaced tracks or grooves on the first or second doors 108, 112 of the housing).

Each access door 208 may generally be in the form of a body or housing that prevents or limits access through the opening 116 in the housing 104 (e.g., and thus into the interior portion 120 of the housing 104) when the access door is in the closed, first position. As just one example, each access door 208 may include an outer frame 242 and a substantially solid panel 246 (e.g., transparent glass, metal, composites) secured thereto or thereacross, where the outer frame 242 and panel 246 are sized for close receipt in and over the opening 116 in the housing 104 (e.g., see FIGS. 1 and 3).

As discussed previously, it is important to prevent or limit user access into the interior portion 120 of the housing 104 of the storage library 100 to correspondingly limit contact between users and components within the interior portion 120 such as moving robotics assemblies 128, electrical connections, and the like. In this regard, each CAP 200 and the library controller of the storage library work in concert to at least substantially ensure that at least one of the access door 208 or the storage container 204 of each CAP 200 is in its first position over and adjacent the opening 116 in the housing 116 at all times.

To further understand how user access into the interior portion 120 of the housing 104 of the storage library 100 through any of the openings 116 is prevented or at least limited, a couple of examples of functionality of the CAPs 200 and storage library 100 will now be provided (although it is to be understood that the functionality encompassed herein is not limited to the ensuing examples). Initially, assume a user loads a plurality of media elements into the slots 228 of the storage container 204 of CAP 200₃ (see FIGS. 1 and 3). For instance, the user may have accessed any appropriate host computer in communication with the library controller of the storage library 100 and inputted any appropriate storage library access operation into the host computer (e.g., an enter or load operation to load media elements into the storage library 100 and/or an eject operation to remove media elements from the storage library 100). In conjunction with processing the enter operation, the host computer and/or library controller may have determined in any appropriate manner that media elements are to be loaded into and/or removed from the storage container 204 of CAP 200₃. For instance, the media player into which one of the media elements is to be inserted is located on the same level of the storage library 100 as CAP 200₃ or there are available media element storage modules 126 on the same level of the storage library 100 as CAP 200₃.

In any case, the storage container 204 of CAP 200₃ may be locked in the first position shown in FIGS. 1, 3 and 4a while the user loads media elements into or removes media elements from the storage container 204 of CAP 200₃ (e.g., where the storage container 204 of the 200₃ prevents or at least limits user access into the interior portion 120 of the storage library 104, such as via the back wall 226 of the storage container 204). More specifically, the CAP 200₃ and/or library controller of the storage library 100 may function to ensure that when the access door 208 has at least partially moved away from its first position adjacent and covering the opening 116 towards the second position (e.g., but not necessarily all the way to the position shown in FIG. 3), the storage container 204 of the CAP 200₃ is automatically locked in the first position adjacent and over the opening 116 (as shown in FIGS. 1 and 3).

The term "locked" (and variations thereof, such as lock, locks, etc.) as used herein means that the storage container 204 is unable to be moved out of or away from the first position absent administrator override or the access door 208 being moved (e.g., pivoted) back into its fully closed, first position over the opening 116 (e.g., like access doors 208 of CAPs 200₁, 200₂, 200₄ of FIGS. 1 and 4a-4c). As will be discussed in more detail below in relation to FIGS. 6a-8i, each CAP 200 may include a mechanical latching assembly 300 that ensures that at least one of the storage container 204 or access door 208 of the CAP 200 is in its closed, first position over the opening 116 in the housing 104 at all times. In the above example, the latching assembly 300 thus disallows movement of the access door 208 of the CAP 200₃ away from its closed, first position (e.g., and into the open, second position shown in FIG. 3) unless the storage container 204 of the CAP 200₃ is in its closed, first position.

Conversely, closure of the access door 208 of the CAP 200₃ into its first position over the opening 116 (e.g., see position of access door 208 of the CAP 200₃ in FIGS. 4b, 4c and 5; also for reference see access doors 208 of CAPs 200₁, 200₂, 200₄ in FIGS. 1 and 4a-4c) unlocks the storage container 204 of the CAP 200₃ and allows the storage container 204 to be moved (e.g., pivoted via motor 234 and library controller) through the loading zone 124 of the CAP 200₃ and into its second position within the interior portion 120 of the housing 104, such as against an interior wall of the housing 104 adjacent one or more media element storage modules 126 within the housing 104. As just one example, the storage container 204 may pivot through no more than about 90° between its first and second positions.

The library controller of the storage library 100 prevents or at least limits any robotics assemblies 128 of the storage library 100 from moving into one or more particular loading zones 124 when storage containers 204 of CAPs 200 of the one or more particular loading zones 124 are moving from their first positions into their second positions or vice versa. For instance, the library controller may, in response to a load or eject request from a host computer, and in conjunction with determining a particular CAP 200 of the storage library 100 to be involved in the load or eject procedure (e.g., in this case, CAP 200₃), move any robotics assemblies 128 out of the loading zone 124 of the particular CAP 200 (e.g., along rail assemblies 132) and also inhibit the robotics assemblies 128 from moving into the loading zone 124 when the storage container 204 of the particular CAP 200 is moving between the first and second positions. In one arrangement, the library controller may inhibit any robotics assemblies 128 from moving into the loading zone 124 of a particular CAP 200 unless the storage container 204 of the particular CAP 200 is in its second position against the inner wall of the housing 104 (e.g., like storage containers 204 of CAPs 200₁, 200₂, 200₄ in FIGS. 4a-4c).

Again with reference to the above example, and once the storage container 204 of the CAP 200₃ has been fully seated and locked in its second position within the interior portion 120 (e.g., via the motor 234 under control of the library controller) so that the slots 228 are facing the interior portion 120 (e.g., see FIG. 4c), a robotics assembly 128 may, under control of the library controller, slide along the rail assemblies 132 into the loading zone 124 of the CAP 200₃ and manipulate media elements in the slots 228 of the storage container 204 of the CAP 200₃ (robotics assembly 128 not shown for CAP 200₃ in FIG. 4c but see robotics assemblies 128 in loading zones 124 of CAPs 200₁ and CAP 200₄ in FIG. 4c). For instance, the robotics assembly 128 may grab and remove one or more media elements from the storage container of the CAP 200₃, slide along rail assemblies 132 to one or more media players, and insert the media elements into the one or more media players. Alternatively, the robotics assembly 128 may insert the one or more media elements into one or more media element storage modules 126 for later use. Still further, the robotics assembly 128 may grab and remove one or more media elements from one or more media players or media element storage modules 126, slide down into the loading zone 124 of the CAP 200₃, and insert or load the same into one or more slots 228 of the storage container 204.

Upon a subsequent request to access the storage container 204 of the CAP 200₃, the library controller may move any robotics assemblies 128 out of the loading zone of the CAP 200₃ and operate the motor 234 of the CAP 200₃ to pivot the storage container 204 about pivot axis 216 into the first position against and adjacent the opening 116 of the housing 104 (e.g., see FIGS. 1, 3 and 4a). Again as will be discussed in more detail below in relation to FIGS. 6a-8i, moving the storage container 204 into the closed position against or adjacent the opening 116 automatically causes the latching assembly 300 of the CAP 200₃ to lock the storage container 204 of the 200₃ in the first position over the opening 116 and substantially simultaneously unlock the access door 208 of the CAP 200₃ to allow the access door 208 to be opened or moved (e.g., under user power) into its open, second position so that media elements may be inserted into and/or removed from the storage container 204.

While an example operation involving CAP 200₃ was discussed, it is to be understood that the various other CAPs 200 and corresponding robotics assemblies 128 may function in a similar regard. Furthermore, each CAP 200 and its corresponding robotics assembly 128 may be operated independently of the various other CAPs 200 and their respective robotics assemblies 128. As just one example, the storage container 204 of the CAP 200₃ may be in the first position (and its access door 208 in its open, second position) for loading of media elements by a user while at the same time the storage containers 204 of CAPs 200₁ and 200₄ are in their second positions (and their access doors 208 in their closed, first positions) for access to media elements of the storage containers 204 by their respective robotics assemblies). This arrangement advantageously increases media element load/unload cycles and reduces media element access times.

Turning now to FIGS. 6a-6c, various views of a CAP 200 according to one embodiment are illustrated (e.g., any of the CAPs 200 of FIGS. 1-5). As shown, the CAP 200 broadly includes a framing assembly 212 that is configured (e.g., sized, dimensioned, etc.) to be received in an opening 116 of the housing 104, where the storage container 204 is pivotally securable adjacent a first side of the framing assembly 212 and the access door 208 is movably (e.g., pivotally) securable adjacent an opposite second side of the framing assembly 212. The framing assembly 212 may include a body 250 that is generally shaped and sized to be received within the opening 116 of the housing. The body 250 defines an opening 252 through which media elements can be inserted into and removed from the at least one opening 224 (e.g., slots 228) of the storage container 204. The body 250 may include first and second spaced vertical members 258, 260 (e.g., jambs) that are appropriately rigidly connected to first and second spaced horizontal members 262, 264 and that collectively define the opening 252 of the body 250.

In one arrangement, the storage container 204 may be pivotally secured to one of the first and second vertical members 258, 260 (e.g., to the first vertical member 258) on a first side of the body 250 to pivot about pivot axis 216. In another arrangement, the storage container 204 may be pivotally secured to a portion of the housing 104 that does not move with first or second service doors 108, 112 (i.e., so that opening of one of the first or second service doors 108, 112 when the storage container 204 is in its open second position within the interior portion 120 does not necessarily move the storage container 204). With reference to FIGS. 4a and 5, for instance, a first bracket member 280 that is rigidly or otherwise non-movably secured to the storage container 204 may be appropriately pivotally secured to a second bracket member or assembly 282 that is rigidly or otherwise non-movably secured to a service door jamb 284 of the housing 104 (e.g., a vertical jamb for first service door 108 that is adjacent or near first vertical member 258 of framing assembly 212, where first service door 108 moves (e.g., pivots) relative to service door jamb 284). In this regard, the storage container 204 may pivot or swing towards and away from the first side of the framing assembly 212 via the first and second bracket members/assemblies 280, 282.

The access door 208 may be pivotally securable (e.g., via hinge assembly 286) to or relative to one of the first and second vertical members 258, 260 (e.g., also relative to the first vertical member 258) on an opposite second side of the body 250 to pivot about pivot axis 238. In one arrangement, the storage container 204 may be considered a "first door" of the CAP 200 and the access door 208 may be considered a "second door" of the CAP 200.

The framing assembly 212 may also include a bezel 254 secured to the body 250 and generally extending about an outer periphery of the body 250, where the bezel 254 has an outer cross-dimension that is greater than an inner cross-dimension of the opening 116 in the housing 104 (e.g., opening 116 in the first or second service door 108, 112) to facilitate mounting of the CAP 200 to the housing 104. For instance, the body 250 of the framing assembly 212 of a particular CAP 200 may be inserted into a particular opening 116 in one of the first or second service doors 108, 112 of the housing 104 from the exterior environment into the interior portion 120 of the housing 104 until the bezel 254 contacts the outer surface of the one of the first or second service doors 108, 112. The body 250 may then be secured in any appropriate manner to the one of the first or second service doors 108, 112 so that the body 250 is rigidly attached to (e.g. non-movable relative to) the one of the first or second service doors 108, 112. For instance, fasteners may be threaded through apertures in the first and second vertical members 258, 260 and/or first and second horizontal members 262, 264 and into opposing inside portions of the one of the first or second service doors 108, 112 surrounding the opening 116. Additionally or alternatively, fasteners may be inserted through apertures in the bezel 254 and into corresponding apertures of the first or second service door 108, 112.

Figure 7A:
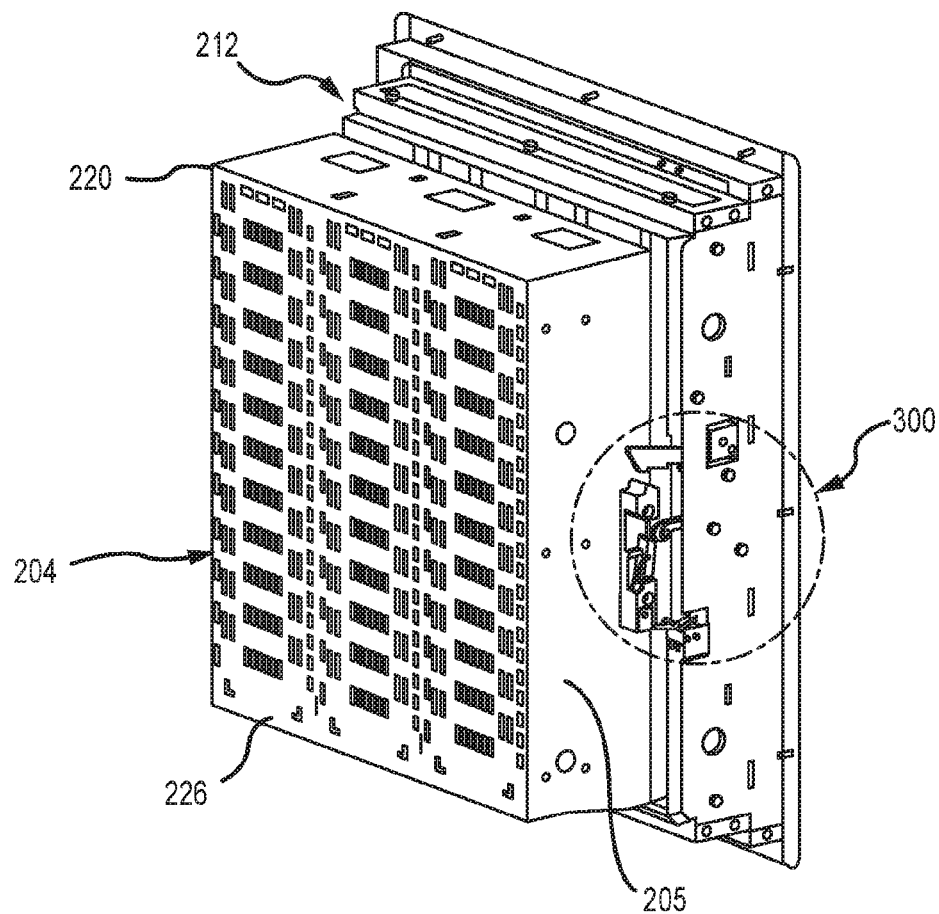
FIG. 7a is a rear perspective view of the CAP similar to that in FIG. 6b but with the storage container and access door both being in an open position and with an outer plate being removed from an outer door jamb of the CAP to expose a latching assembly of the CAP.
Figure 7B:
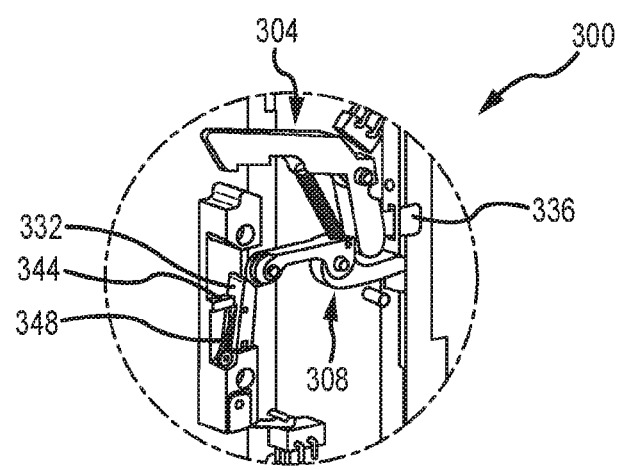
Figure 7C:
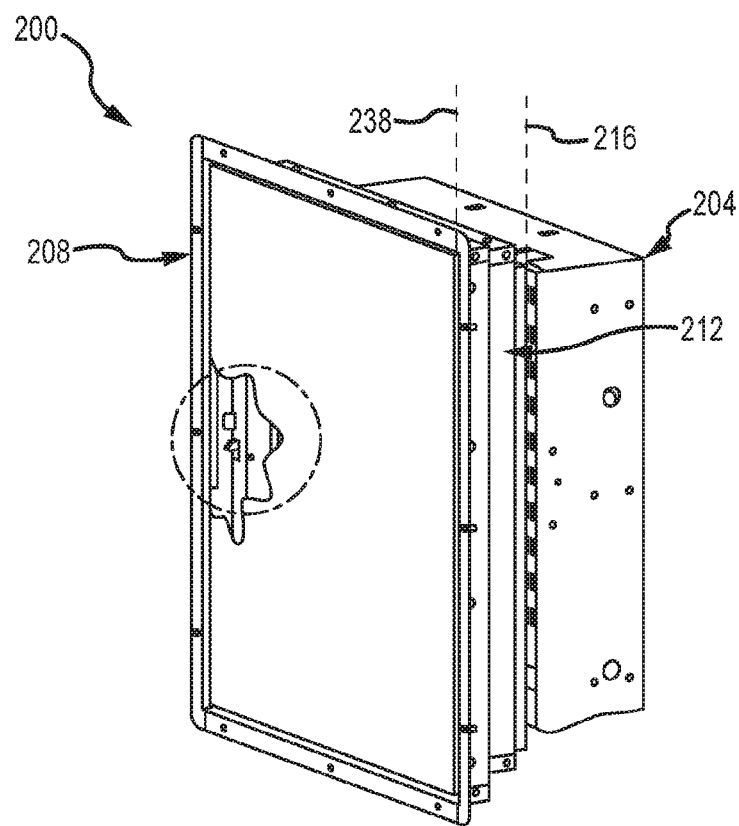
FIG. 7c is a perspective view of the CAP of FIG. 7a and with a portion of the access door broken away to show a portion of the latching assembly.
Figure 7D:
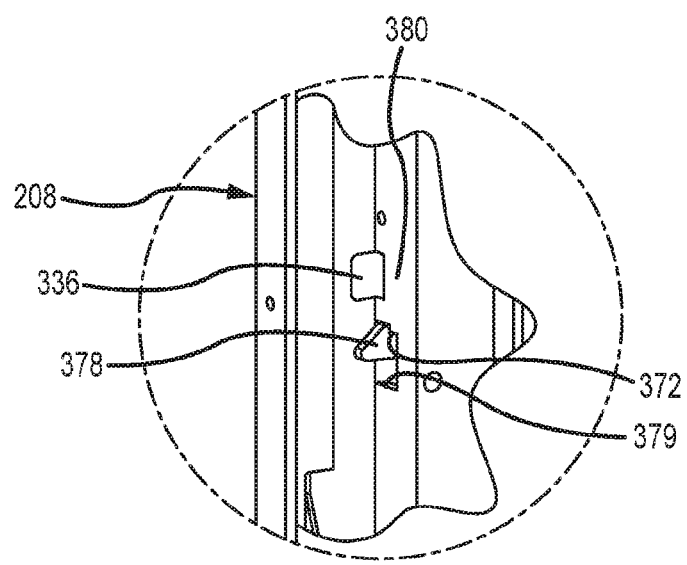
FIG. 7d is a close-up perspective view of the portion of the latching assembly of FIG. 7c.
Figure 8A:
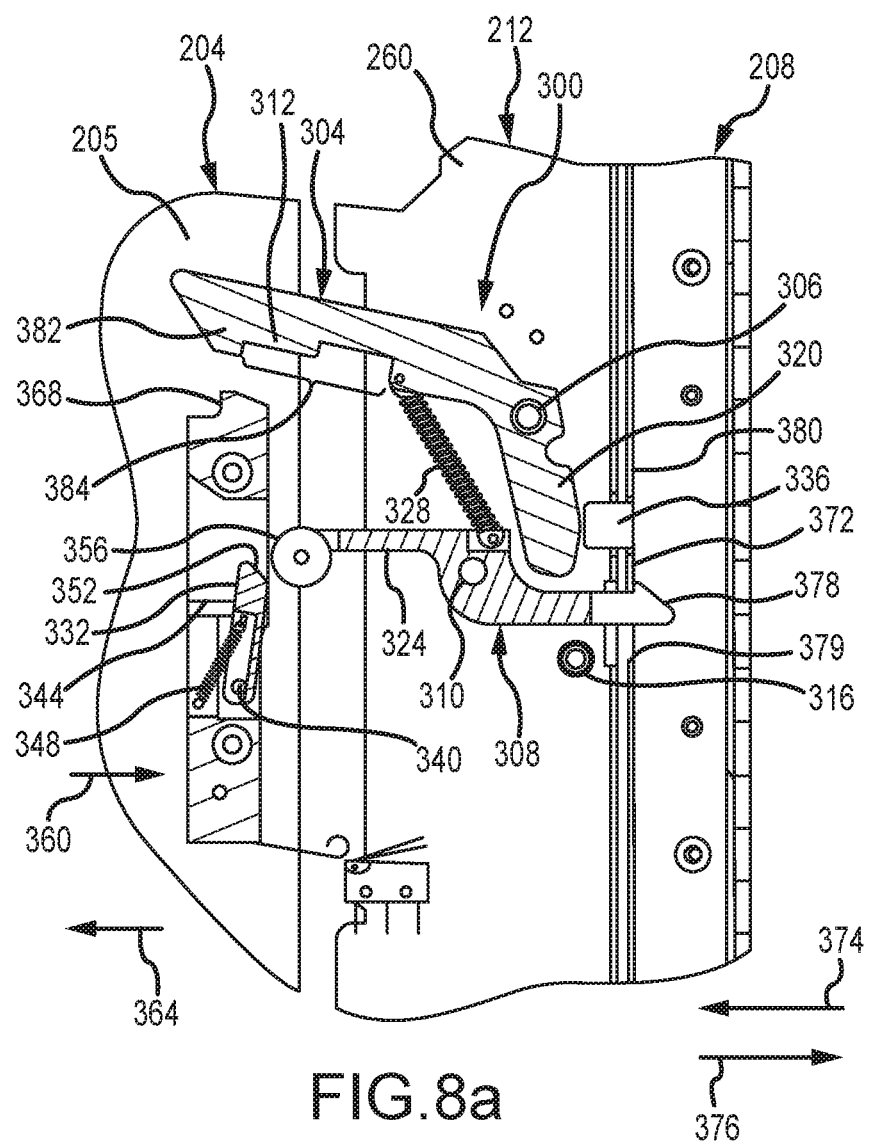
FIG. 8a is a sectional view of the latching assembly of FIG. 7a in one position with the access door being closed and locked position and the storage container being in a closed but unlocked position.

As mentioned above, each CAP 200 includes a mechanical latching assembly 300 that prevents or inhibits customer access to the interior portion 120 of the storage library 100 via the opening 116 in the housing 104 (and the opening 252 in the framing assembly 212) by mechanically disallowing one of the storage container 204 and access door 208 from moving into its open, second position away from the opening in the housing 104 and the opening 252 in the framing assembly 212 unless the other of the storage container 204 and access door 208 is locked in its closed, first position over and adjacent the opening in the housing 104 and the opening 252 in the framing assembly 212. With reference now to FIGS. 7a, 7b and 8a, the latching assembly 300 includes first and second interconnected latch members or levers 304, 308 that are pivotally connected to the second vertical member 260 of the framing assembly 212 at respective spaced, parallel pivot axes 306, 310 (e.g., that are perpendicular to the pivot axes 216, 238), such as via respective pivot pins or the like disposed through the levers and into the second vertical member 260 (note that an outer support plate (not labeled) of the second vertical member 260 of the framing assembly 212 has been removed for clarity in FIGS. 7a-8i as compared to FIGS. 6a-6b). Broadly, the first and second interconnected levers 304, 308 are configured to automatically lock one of the storage container 204 or access door 208 (e.g., prevent or inhibit movement of one of the storage container 204 or access door 208 relative to the framing assembly 212 and the one of the first and second service doors 108, 112 (or other portion of the housing 104) to which the framing assembly 212 is rigidly secured) when the other of the storage container 204 or access door 208 is unlocked (e.g., allowed to move away from the framing assembly 212 or other portion of the housing 104 to which the framing assembly 212 is rigidly secured).

Each of the first and second levers 304, 308 includes a respective locking portion or arm 312, 316 on one side of its respective pivot axis 306, 310 that is configured to mechanically engage with a corresponding portion of one of the storage container 204 and access door 208 to prevent or inhibit movement thereof relative to the framing assembly 212 (and thus the openings 116, 252). Furthermore, each of the first and second levers 304, 308 includes a respective release portion or arm 320, 324 on an opposite side of its respective pivot axis 306, 310 and rigidly (e.g., non-movably) connected to the respective locking portion 312, 316 that, when manipulated by an external force as discussed below, moves (e.g., pivots) its respective locking portion 312, 316 out of locking engagement with the one of the storage container 204 or access door 208. A biasing member 328 (e.g., coil spring or the like) interconnects the first and second levers 304, 308 in a manner to induce rotation of one of the first or second levers 304, 308 about its respective pivot axis 306, 310 in one of a clockwise or counterclockwise direction in response to the other of the first or second latch members 304, 308 being rotated about its respective pivot axis 306, 310 in the other of the clockwise or counterclockwise direction. In this regard, manipulation of one of the release arms 320, 324 in one of a clockwise or counterclockwise direction about its respective pivot axis 306, 310 to release its corresponding locking portion 312, 316 from one of the storage container 204 or access door 208 automatically pulls (via the biasing member 328) the other of the locking portions 312, 316 in the other of the clockwise or counterclockwise direction about its pivot axis 306, 310 into locking engagement with the other of the storage container 204 or access door 208.

With continued reference to FIGS. 7a, 7b and 8a, each of the storage container 204 and access door 208 includes a respective trigger member 332, 336 (e.g., which may be considered part of the latching assembly 300) that is configured to engage the release arm 324, 320 of the second and first levers 308, 304, respectively, when the storage container 204 and access door 208 are moved into their closed, first positions. As an example, the trigger member 336 of the access door 208 may be in the form of a rigid tab (e.g., protrusion, etc.) that is rigidly connected to (non-movable relative to) a portion of the access door 208 so as to align with, contact, and forcibly move and pivot the release arm 320 of the first lever 304 about the pivot axis 306 (e.g., in a clockwise direction) against the spring force of the biasing member 328 upon closure of the access door 208 into its closed, first position. For instance, the trigger member 336 may be secured to a portion of the outer frame 242 of the access door 208 on a side of the outer frame 242 opposite the side through which the pivot axis 238 extends.

The trigger member 332 of the storage container 204 may generally be configured to align with, contact, and forcibly move and pivot the release arm 324 of the second lever 308 about the pivot axis 310 (e.g., in a clockwise direction) against the spring force of the biasing member 328 upon closure of the storage container 204 into its closed, first position in first movement direction 360. In one arrangement, the trigger member 332 may be in the form of a spring-loaded tab that is configured to forcibly urge the release arm 324 about the pivot axis 310 when the storage container 204 is being moved into its closed, first position in the first movement direction 360 and that is configured to be forcibly urged and pivoted about a pivot axis 340 (e.g., in a clockwise direction) when the storage container 204 is being moved out of its closed, first position and towards its open, second position in an opposite second movement direction 364. For instance, the storage container 204 may include a stop member 344 that is rigidly connected to (non-movable relative to) a portion of the storage container 204 and that contacts the trigger member 332 and inhibits the trigger member 332 from furthermore movement in a counterclockwise direction about pivot axis 340 either in response to a biasing force applied by biasing member 348 or a return force applied by release member 324.

As shown, the trigger member 332 may include a cam surface 352 that is configured to convert motion of the trigger member 332 (and thus storage container 204 as a whole) in the first movement direction 360 into a rotational or pivoting movement of the release arm 324 about pivot axis 310 (e.g., upwards in a clockwise direction) upon contact of the cam surface 352 with the release arm 324. To reduce friction and facilitate the camming action of the cam surface 352, the end of the release arm 324 may include a wheel 356 (e.g., or roller) pivotally attached thereto against which the cam surface 352 is configured to contact during movement of the storage container 204 in the first direction 360. While the wheel 356 is illustrated as being pivotally attached to the release arm 324, the reverse arrangement is also encompassed herein whereby the wheel 356 is disposed on the trigger member 332 and the cam surface 352 is disposed on the end of the release arm 324.

Each of the storage container 204 and access door 208 includes a securement member 368, 372 that is configured to engage with the locking portions 312, 316 of the first and second levers 304, 308, respectively, to inhibit movement of the storage container 204 and access door 208 away from their closed, first positions. The securement member 368 may be rigidly attached or connected to (non-movable relative to) the housing 220 of the storage container 204 while the securement member 372 may be rigidly attached or connected to (non-movable relative to) the outer frame 242 or other portion of the access door 208.

In one arrangement, the securement member 372 of the access door 208 may be an edge of a wall 380 of the access door 208 against which a tooth 378 (e.g. projection) of the locking portion 316 is configured to engage. For instance, the tooth 378 (e.g., projection) of the locking portion 316 may be configured to enter an aperture 379 through the wall 380 as the access door 208 is being moved in a first direction 374 into its closed, first position and then snap past and engage the edge of the wall 380 so as to inhibit movement of the access door 208 in an opposite second direction 376 towards its open, second position. While not labeled, the tooth 378 may include a cam surface that is configured to engage the edge of wall 380 and facilitate snapping of the tooth 378 past the edge of the wall 380 and subsequent engagement therewith.

The securement member 368 of the storage container 204 may be in the form of protrusion or projection past which a tooth 382 of the locking portion 312 of the first lever 304 is configured to snap and engage with the storage container 204 moving in the first direction 360 to inhibit subsequent movement of the storage container 204 in the opposite second direction 364. In one arrangement, the locking portion 312 may include a series of notches 384 (e.g., stepped portions) to allow for increasing degrees of locking engagement between the locking portion 312 and the securement member 368 (and thus increasing degrees of locking of the storage container 204 against the framing assembly 212 and the opening 116 in the housing 104). In one variation and as shown in FIG. 7b, the trigger member 332 and securement member 368 may be embodied in a single member or component that may be secured to an outer side surface 205 of the storage container 204 in any appropriate manner.

To facilitate the reader's understanding of how the various components of the latching assembly 300 interact to maintain one of the storage container 204 or access door 208 in its first, closed position at substantially all times, reference will now be made to FIGS. 8a-8i which illustrate various operational stages of the latching assembly 300. Not all reference numerals are included on each of FIGS. 8a-8i in the interest of clarity.

As seen in FIG. 8a, the access door 208 is locked in its closed, first position against the framing assembly 212 of the CAP 200 by way of locking engagement between the locking portion 316 of the second lever and the securement member 372 of the access door 208 (where the access door 208 is generally unable to be moved away from the framing assembly 212 towards its open, second position. In its closed, first position as discussed previously, the access door 208 inhibits user access into the interior portion 120 of the storage library 100 via the opening 116 through the housing 104 (e.g., through one of the first and second service doors 108, 112). See access doors 208 of CAPs 200$_1$, 200$_2$, 200$_4$ in FIGS. 1 and 4a-4c. As also seen in FIG. 8a, the storage container 204 is unlocked and at least partially moved away or spaced from its closed, first position against the framing assembly 212 (and over the opening 116 in the housing and the opening 252 in the framing assembly 212). In this position, the storage container 204 is movable in the second direction 364 towards its open, second position within the interior portion 120 of the storage library 100 (e.g., about pivot axis 216 via motor 234 of FIG. 4a).

Figure 8B:
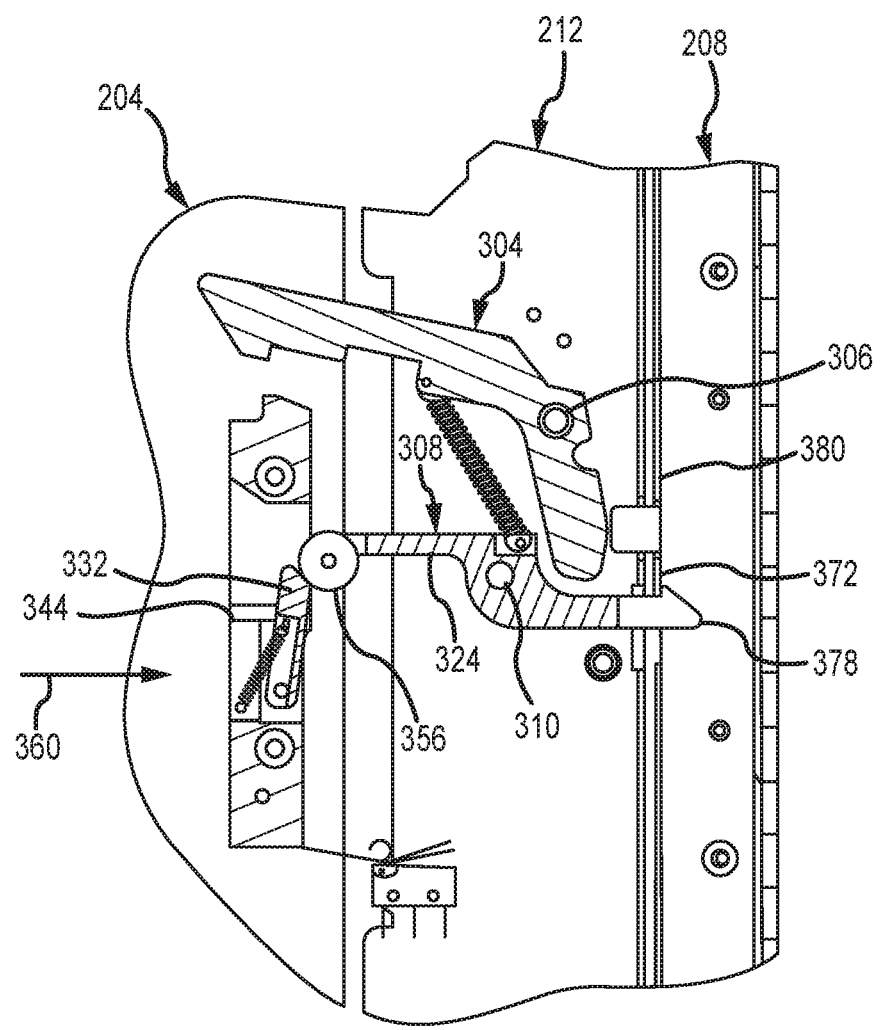
FIG. 8b is another sectional view of the latching assembly of FIG. 7a in another position with the access door being closed and locked position and the storage container being in a closed but unlocked position.
Figure 8C:
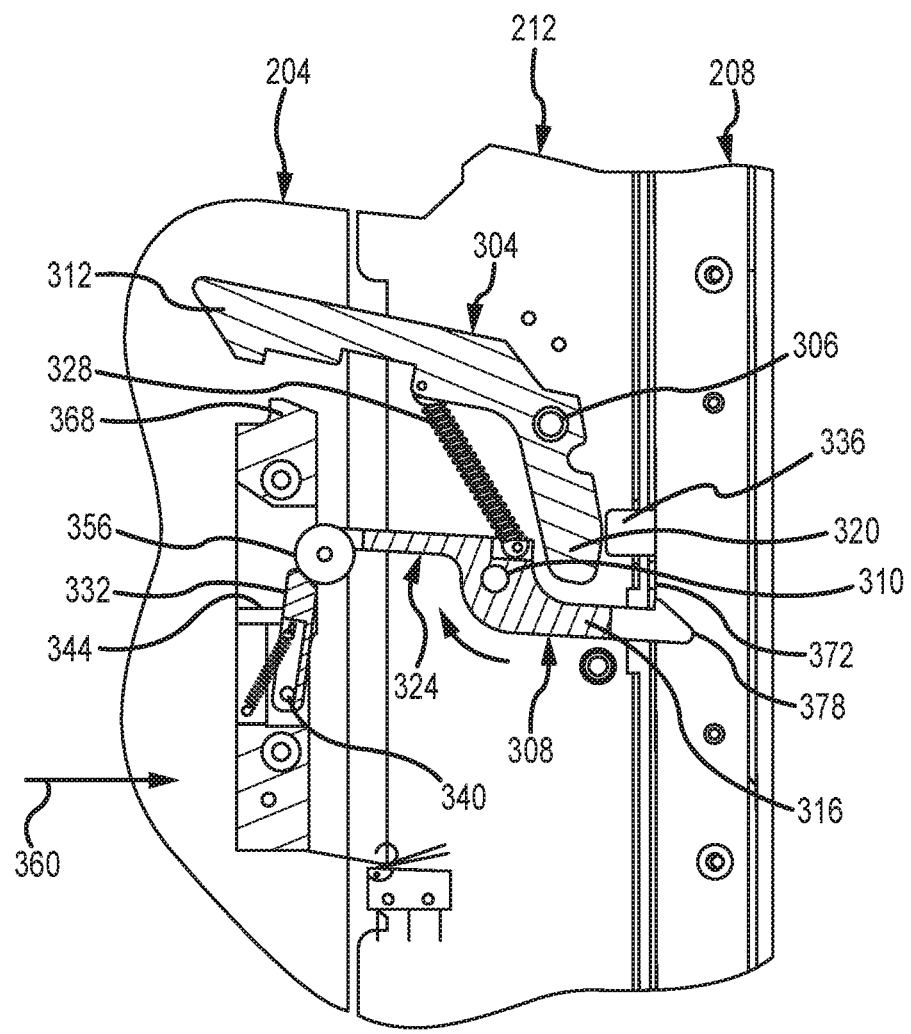
FIG. 8c is another sectional view of the latching assembly of FIG. 7a in another position with the access door being in a closed but partially unlocked position and the storage container being in a closed but unlocked position.

FIG. 8b illustrates the locking assembly 300 after the storage container 204 has been moved from its position in FIG. 8a towards (but not yet to) the framing assembly 212 in first direction 360 (e.g., via motor 234 of FIG. 4a under control of the library controller in response to a load or eject operation request from a host computer). As seen, the trigger member 332 of storage container 204 makes an initial contact with wheel 356 (or other appropriate portion) of release arm 324. Continued movement of the storage container 204 in the first direction 260 then forces the release arm 324 of the second lever 308 to pivot or rotate upwardly in a clockwise direction about pivot axis 310 (e.g., via the cam surface 352 of the trigger member 332 engaging the wheel 256 and the stop member 344 inhibiting pivoting of the trigger member 332 about pivot axis 340). See FIG. 8c.

As mentioned previously, the release arm 324 and locking portion 316 of the second lever 308 are non-movably connected to each other on opposite sides of pivot axis 310. In this regard, the upward clockwise movement of the release arm 324 about pivot axis 310 induced by the trigger member 332 induces a corresponding downward, clockwise movement of the locking portion 316 about pivot axis 310 which pulls the tooth 378 of the locking portion 316 out of engagement with the securement member 372 of the access door 208 (and thus unlocks the access door 208). Note how the tooth 378 has moved downward in FIG. 8c from its position in FIG. 8b.

Furthermore, the clockwise movement of the release member 324 (and thus the second lever 308 as a whole) about the pivot axis 310 at least slightly stretches or loads the biasing member 328 interconnected between the first and second levers 304, 308 which substantially instantaneously induces a corresponding counterclockwise movement of the first lever 304 about pivot axis 306 upon the biasing member 328 recoiling or otherwise moving back towards a relaxed or less stretched position. Specifically, it can be seen how first and second opposite ends of the biasing member 328 are attached to the first and second levers 304, 308 on opposite outside portions of the pivot axes 306, 310. In this regard, clockwise movement of the second lever 308 about pivot axis 310 induces a corresponding counterclockwise movement of the first lever 304 about pivot axis 306 while clockwise movement of the first lever 304 about pivot axis 306 induces a corresponding counterclockwise movement of the second lever 308 about pivot axis 310.

Figure 8D:
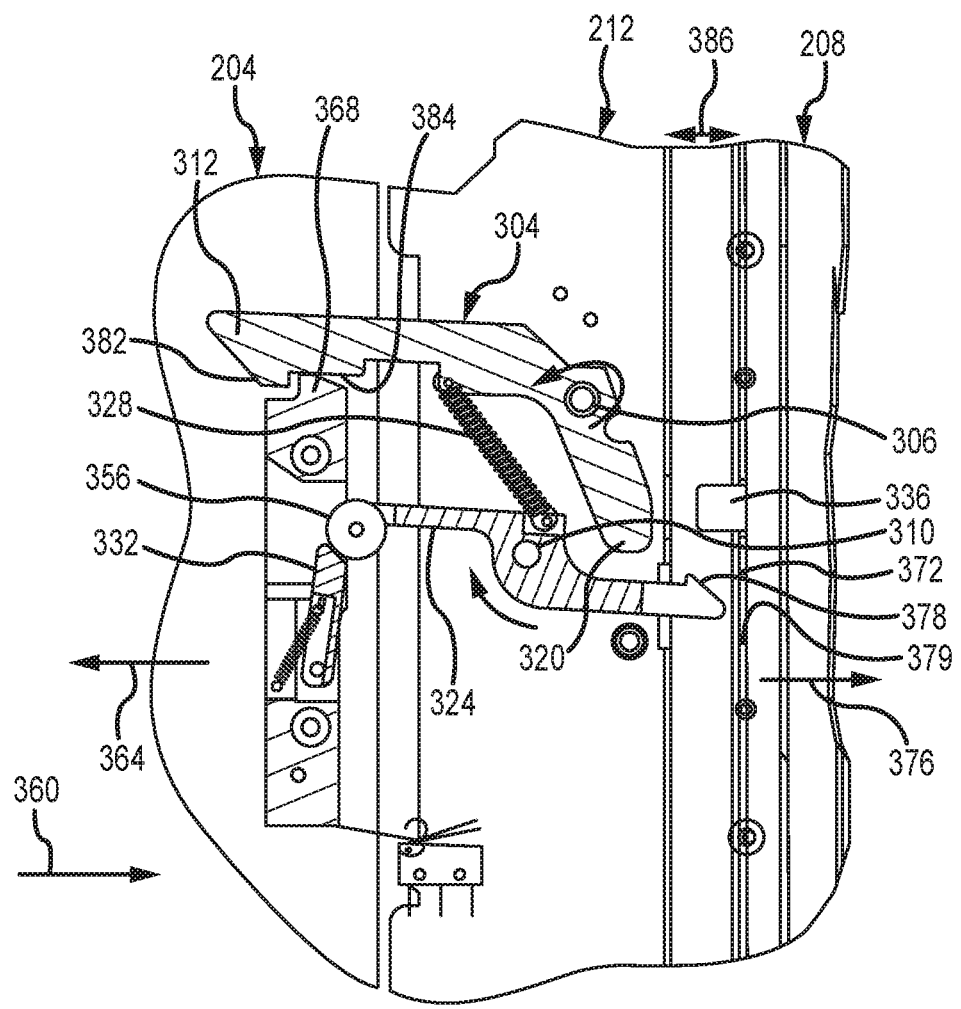
FIG. 8d is another sectional view of the latching assembly of FIG. 7a in another position with the access door being in a closed and unlocked position and the storage container being in a closed and partially locked position.

With additional reference now to FIG. 8d, the counterclockwise movement of the first lever 304 about the pivot axis 306 (induced by the trigger member 332 via the biasing member 328) forcibly urges the release arm 320 of the first lever 304 against the trigger member 336 of the access door 208 to force the access door 208 in the second direction 376 towards its second, open position. See gap 386 between access door 208 and framing assembly 212 in FIG. 8d. In other words, the counterclockwise movement of the first lever 304 forces the release arm 320 against the trigger member 336 to at least partially "pop open" the access door 208. Substantially simultaneous with the release arm 320 popping open the access door 208, the locking portion 312 of the first lever 304 moves downward into locking engagement with the securement member 368 of the storage container 204. As shown in FIG. 8d, the tooth 382 of the locking portion 312 has been moved in front of the securement member 368 and the securement member 368 is seated in one of the notches 384 of the locking portion 312. At this point, the storage container 204 is locked against any attempted movement in the second direction 364 by virtue of the tooth 382 blocking such movement of the securement member 368; this may represent a closed, locked position of the storage container 204.

Figure 8E:
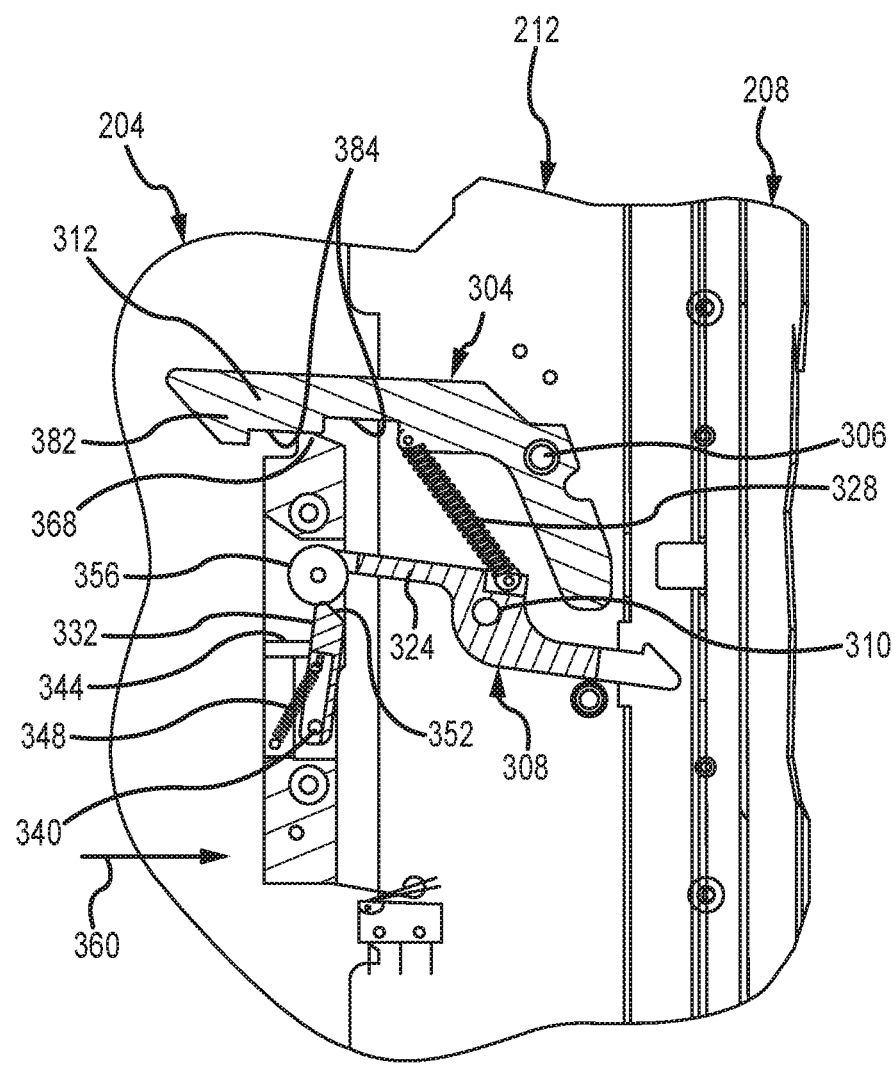
FIG. 8e is another sectional view of the latching assembly of FIG. 7a in another position with the access door being in a closed and unlocked position and the storage container being in a closed and partially locked position.
Figure 8F:
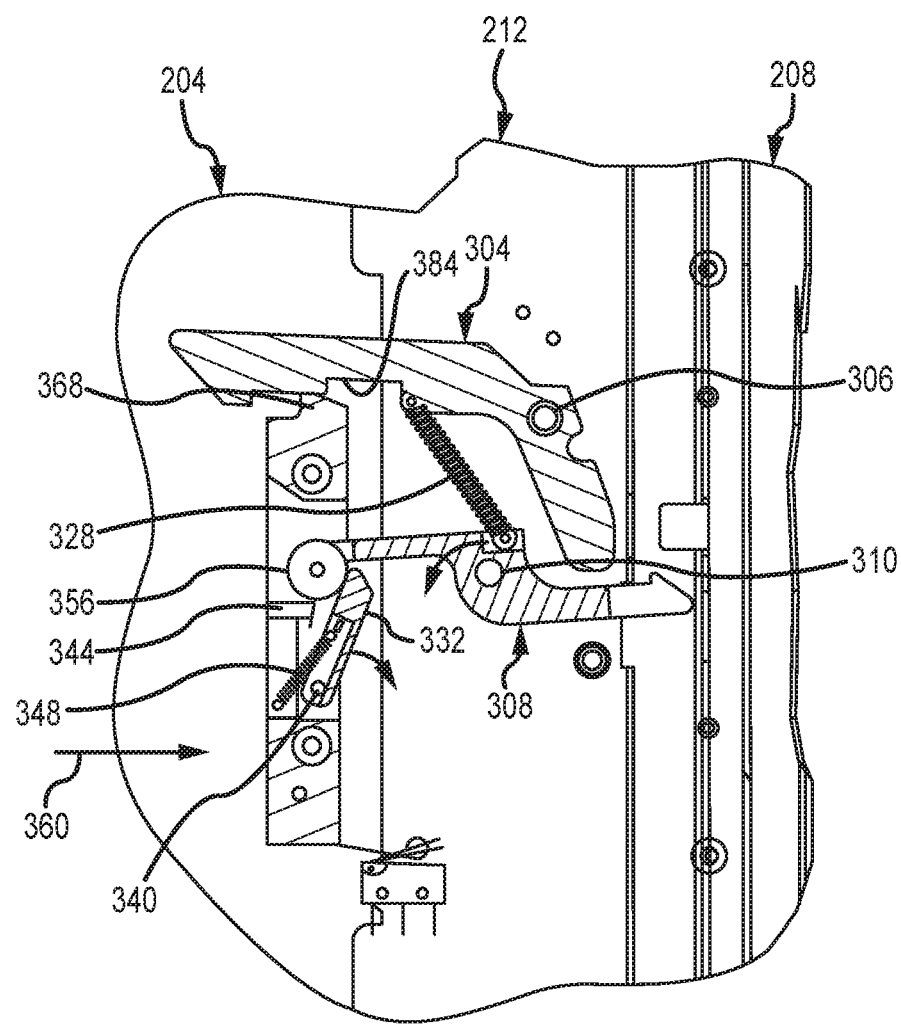
FIG. 8f is another sectional view of the latching assembly of FIG. 7a in another position with the access door being in a closed and unlocked position and the storage container being in a closed and partially locked position.
Figure 8G:
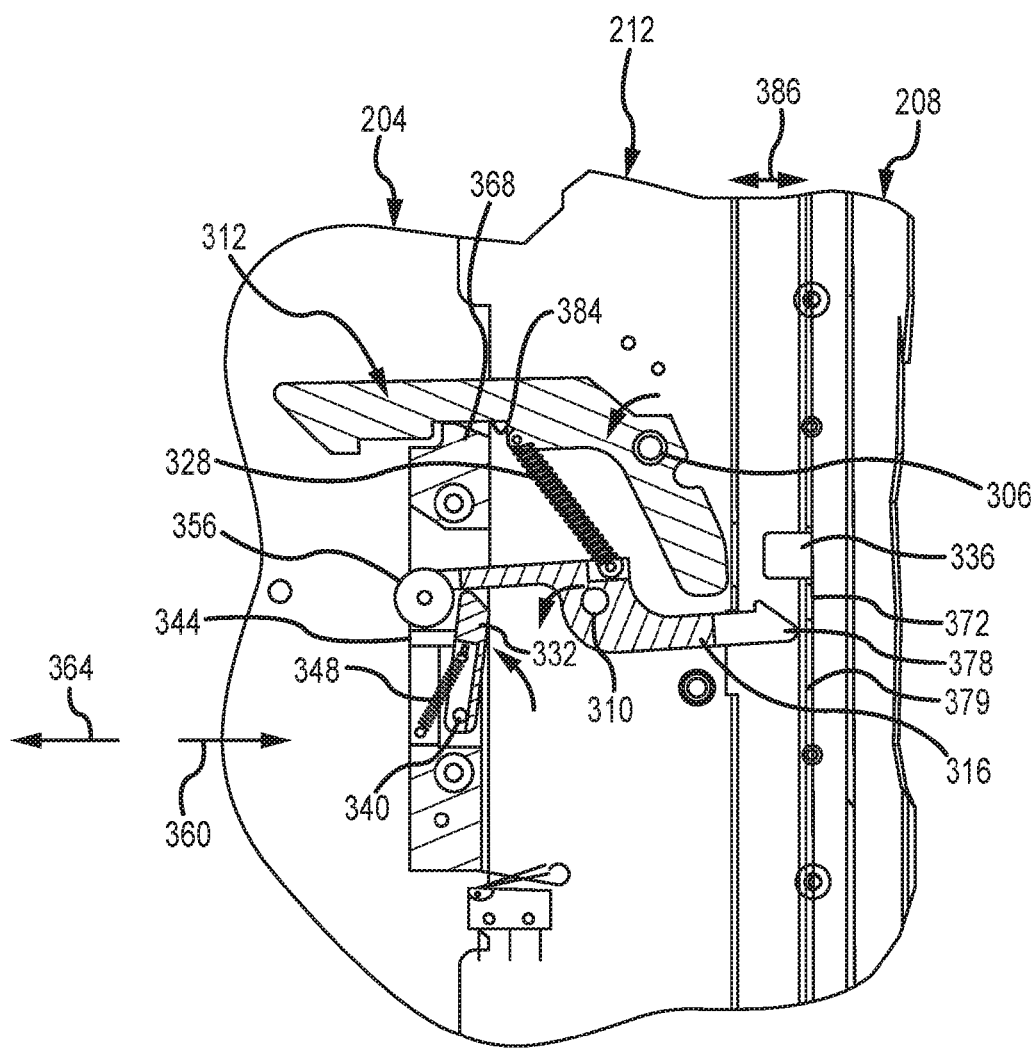
FIG. 8g is another sectional view of the latching assembly of FIG. 7a in another position with the access door being in a closed and unlocked position and the storage container being in a closed and fully locked position.

In one arrangement, continued movement of the storage container 204 in the first direction 360 towards the framing assembly 212 can result in increasing degrees of locking of the storage container 204 to the framing assembly 212 (e.g., over the aperture 252 in the framing assembly 212 and the aperture 116 in the housing 103). For instance, FIG. 8e illustrates the locking assembly 300 after the storage container 204 has been further moved in the first direction 360 towards the framing assembly 212. One observation is that the continued forcing of the trigger member 332 against the release member 324 results in the wheel 356 rolling up the cam surface 352 of the trigger member and thus the second lever 308 pivoting about the pivot axis 310 in a clockwise direction. Another observation is that the securement portion 368 has slid partially along the first notch 384 towards an adjacent second notch 384 of the locking portion 312 of the first lever 304. A further note (while maybe not readily observable from the figures) is that the clockwise movement of the second lever 308 has at least partially loaded (stretched) the biasing member 328.

In FIG. 8e, the wheel 356 of the release portion 324 is at or near a substantial upper or top portion of the trigger member 332. In this regard, continued movement of the storage container 204 in the first direction 360 pushes the trigger member 332 past the wheel 356 and allows the wheel 356 to drop over the top of the trigger member 332 onto an opposite side of the trigger member 332 and the second lever 308 to pivot about the pivot axis 310 in a counterclockwise direction. See FIG. 8f As shown, movement of the wheel 356 past the trigger member 332 has caused the trigger member 332 to pivot about pivot axis 340 in a direction away from the stop member 344 (e.g., clockwise as shown in the figures). More specifically, the spring force exerted by the loaded biasing member 328 on the second lever 308 upon return to a less stretched state facilitates the pivoting or rotation of the second lever 308 about the pivot axis 310 and exerts a force against the trigger member 332 that is greater than a spring force of the biasing member 348 previously holding the trigger member 332 against the stop member 344 to pivot the trigger member 332 in the clockwise direction about pivot axis 340 away from the stop member 344.

As the storage container 204 is moved further in the first direction 360, a portion of the storage container 204 eventually makes contact with a portion of the framing assembly 212 at which point the storage container 204 is unable to be moved any further in the first direction 360. See FIG. 8g. For instance, an outer peripheral portion 206 (e.g., outer edge) of the storage container 204 (labeled in FIG. 6b) may make abutting contact with a corresponding inside peripheral edge or ledge 214 (labeled in FIG. 6b) that at least partially surrounds the aperture 252 of the framing assembly 212. At substantially the same time that the outer peripheral portion 206 of the storage container 204 abuts the inner peripheral ledge 214 of the framing assembly 212, the securement portion 368 slides into a second notch 384 of the locking portion 312 of the first lever 304 and the biasing member 328 pivots the first lever 304 about pivot axis 306 to tightly hold the second notch 384 over the securement portion 368. At this point, the storage container 204 is further locked against any attempted movement in the second direction 364 (e.g., towards an open position away from the framing assembly 212) by virtue of inside walls of the second notch 384 blocking such movement of the securement member 368; this may represent another, further (e.g., fully) closed and locked position of the storage container 204. It is also noted how the biasing member 348 may return the trigger member 332 to its position against stop member 344.

A customer may now grasp and open the access door 208 to its second open position and load and/or remove media elements into or from the storage container 204 via the opening 116 in the housing and the opening 252 of the framing assembly 212 of the CAP 200. For instance, see CAP 200₃ in FIGS. 1 and 3. However, the customer is unable to access or reach into the interior portion 120 of the storage library 100 as the storage container 204 is in its closed and locked first position over the opening 116 in the housing 104 with the backwall 226 of the storage container 204 blocking any such access.

When the customer has completed the loading or removal of media elements into or from the storage container 204, the access door 208 may be closed by the customer or in other appropriate manners (e.g., motor control). More specifically, the access door 208 may be pivoted about pivot axis 238 from its second open position into its first closed position over the opening 116 in the housing 104 (e.g., in one of the first or second service doors 108, 112) against the framing assembly 212 of the CAP 200. For instance, the access door 208 may be pushed until an outer periphery (not labeled) of the access door 208 abuts an inside peripheral edge or ledge 215 of the framing assembly 212 (ledge 215 labeled in FIGS. 3 and 6a), where the peripheral ledges 214, 215 are generally on opposite sides of the framing assembly 212. See access doors 208 of CAPs 200₁, 200₂, 200₄ of FIGS. 1 and 4a-4c.

Figure 8H:
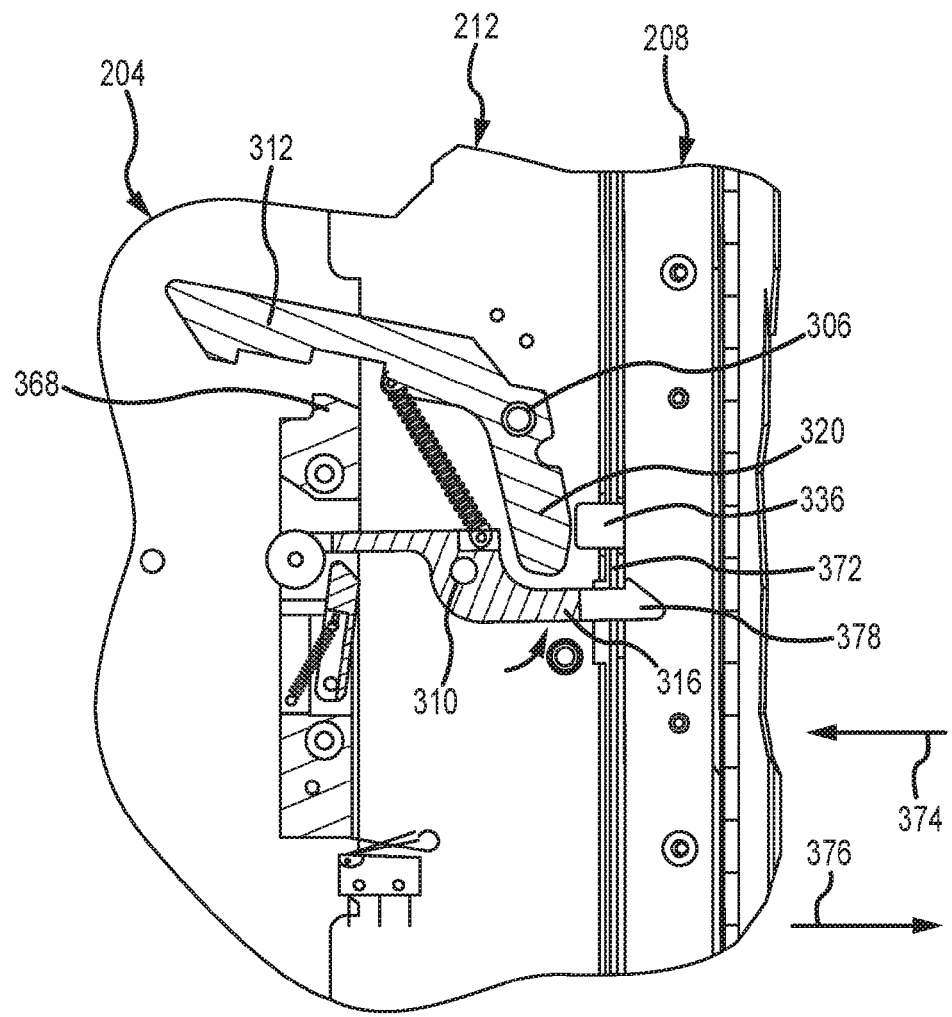
FIG. 8h is another sectional view of the latching assembly of FIG. 7a in another position with the access door being in a closed and locked position and the storage container being in a closed and unlocked position.

Turning now to FIG. 8h, a view of the latching assembly 300 and CAP 200 are shown after the access door 208 has been moved in the first direction 374 into its first closed position. Note removal of gap 386 between FIGS. 8g and 8h. One observation is that movement of the access door 208 in the first direction 274 into its first closed position causes the securement member 372 of the access door 208 to make contact with and force the tooth 378 of the locking portion 316 of the second lever 308 downward (and thereby pivot the second lever 308 in a clockwise direction about pivot axis 310) to allow the tooth to move past the securement member 372 and then snap back into place on an opposite side of the securement member 372. At this point, the access door 208 is locked in its first closed position against movement of the access door 208 in the second direction 376 away from the framing assembly 212 (and thus away from the opening 116 in the housing 104).

Substantially simultaneous with aforementioned locking engagement between the locking portion 316 of the second lever 304 and the securement member 372 of the access door, the trigger member 336 of the access door makes contact with and forces the release arm 320 of the first lever in a clockwise direction about the pivot axis 306. The clockwise movement of the first lever induced by closing of the access door 208 moves the locking portion 312 of the first lever 304 away from the securement member 368 of the storage container 204 and thereby unlocks the storage container 204 from the framing assembly 212. See FIG. 8h. At this point, the storage container 204 can be moved in the second direction 364 (e.g., via motor 234 of FIG. 2b) away from the framing assembly 212 (e.g., pivoted about the pivot axis 216) into its second open position within the interior portion 120 of the storage library 100 whereby a robotics assembly 128 can slide in front of the opening 224 (e.g., slots 228) of the storage container 204 to insert and/or remove media elements thereinto or therefrom. See FIGS. 2b and 8i.

Figure 8I:
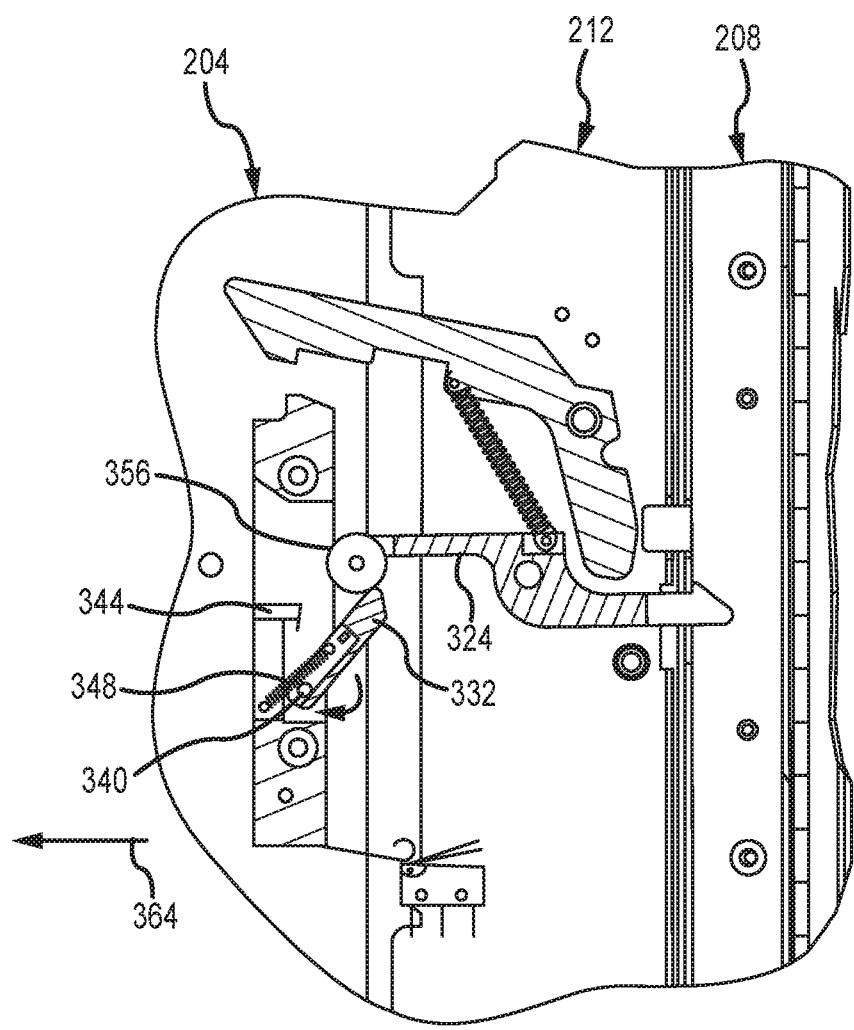
FIG. 8i is another sectional view of the latching assembly of FIG. 7a in another position with the access door being in a closed and locked position and the storage container being in an unlocked position and opened slightly from the position of FIG. 8f.

FIG. 8i illustrates how movement of the storage container 204 in the second direction 364 away from the framing assembly 212 causes the wheel 356 of the release arm 324 to exert a force against the trigger member 332 and thereby pivot the trigger member about pivot axis 340 in a clockwise direction against a return force being applied by biasing member 348. After the wheel 356 has cleared the trigger member 332, the biasing member 348 returns the trigger member 332 to its position against stop member 344 in preparation for a subsequent closing and locking of the storage container 204 to the framing assembly 212. See FIG. 8a.

As discussed previously, one manner of storing media elements in the storage library 100 (e.g., in the storage container 204 of a CAP 200, within the interior portion 120 of the storage library 100 against a wall of the housing 104, etc.) is to load the media elements into a media element storage module or magazine (e.g., media element storage module 126 of FIGS. 4a-4c, media element storage module 230 of FIG. 5, etc.) which may be appropriately mounted into the storage library 100 (e.g., into the storage container 204, against a wall of the housing 104 inside the interior portion 120, etc.). Existing media element storage modules or magazines are often hung from a rod or the like inside a CAP or a port of the storage library. Other existing media element magazine loading arrangements require aligning and mounting componentry on the magazine (e.g., pins or slots) with corresponding mounting componentry on the inside of the CAP or port (e.g., the other of the pins or slots). However, these existing mounting arrangements can make the act of mounting media element magazines into a CAP or port of a storage library difficult or burdensome when the CAP or port is not at eye or chest level or otherwise not at an ergonomically comfortable position.

Figure 9A:
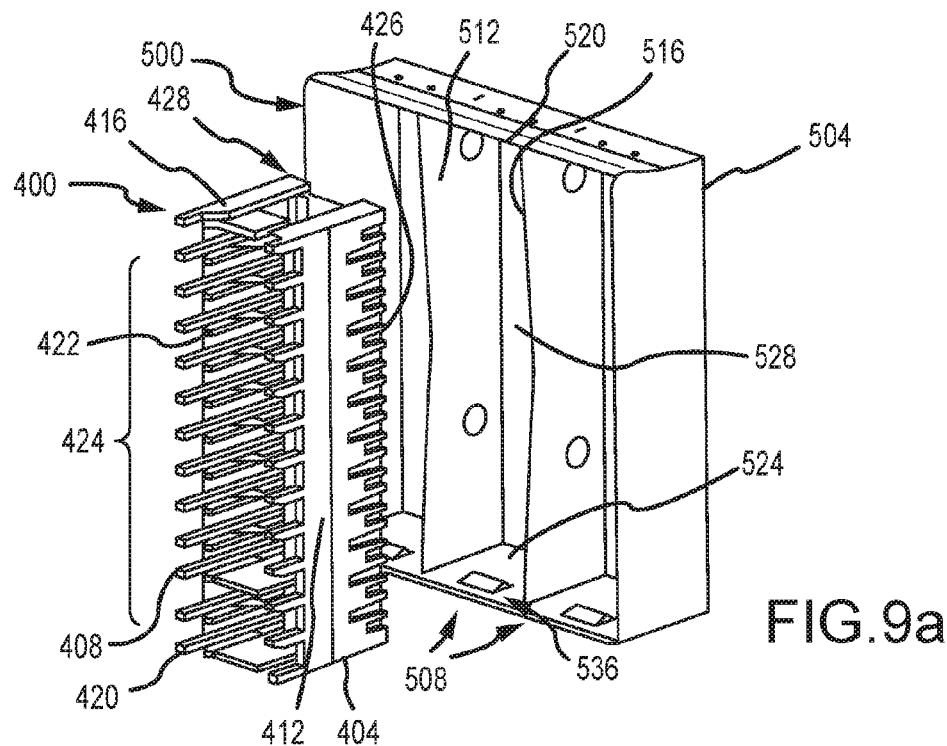
FIG. 9a is a first exploded perspective view of a media element magazine configured for receipt in a port of a storage library according to an embodiment.
Figure 9B:
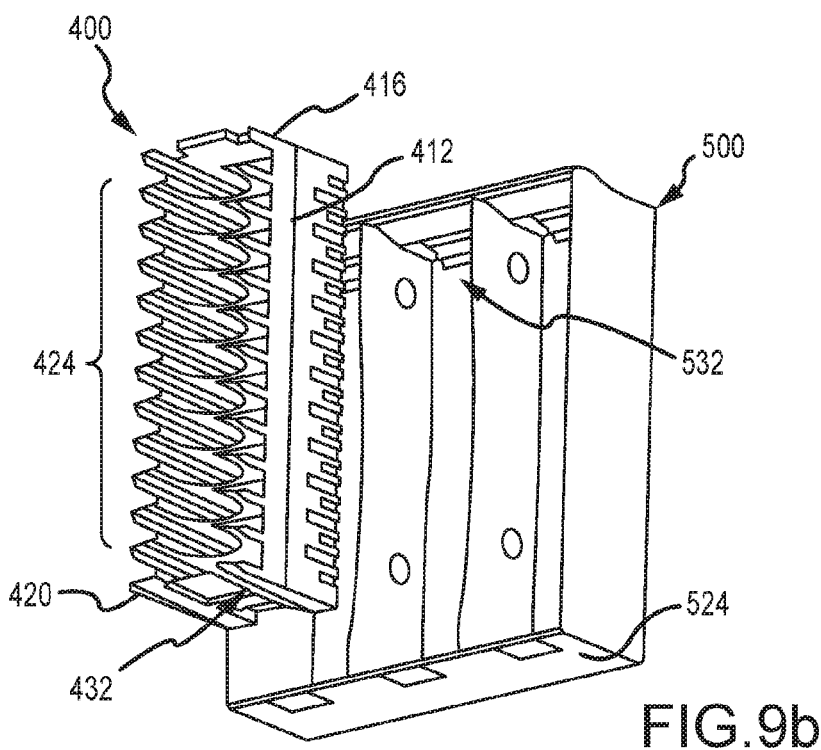
FIG. 9b is a second exploded perspective view of the media element magazine of FIG. 9a configured for receipt in a port of a storage library according to an embodiment.

Turning now to FIGS. 9a-9b, first and second exploded perspective views of a media element storage module or magazine 400 (e.g., media element storage module 230 of FIG. 5, media element storage module 126 of FIGS. 4a-4c) and a storage container 500 (e.g., storage container 204 of CAP 200) having a housing or body 504 and a plurality of ports 508 within the housing 504 are shown. As will be discussed, the magazine 400 and ports 508 have respective interengageable mounting or engagement components that facilitate mounting (insertion) of the magazine 400 into a port 508 and removal of the magazine 400 from the port 508 at various different heights and angles within a storage library (e.g., storage library 100 of FIGS. 1-5). While the port(s) 508 will be discussed in the content of a storage container 500 (e.g., storage container 204 of CAP 200), it is to be understood that the one or more ports 508 may also be embodied in other contexts within a storage library, such as adjacent an inner wall of the housing 104 inside the interior portion 120 (i.e., not necessarily in the swinging storage container 204 of CAP 200). For instance, one or more ports 508 may be appropriately disposed on the inside wall of the housing 104 for receipt of one or more of the media element storage modules 126 of FIGS. 4a-4c.

Broadly, the media element magazine 400 includes a housing 404 (e.g., body, frame, etc.) generally defined by opposite first and second side portions or side walls 408, 412, opposite upper and lower portions 416, 420, and opposite front and rear portions 422, 426. The housing 404 also defines a plurality of vertically spaced, parallel slots 424 (e.g., compartments, bays) for receipt of a corresponding plurality of media elements (e.g., tape cartridges). For instance, the plurality of slots 424 may be formed by a plurality of shelves, grooves, ledges, and/or the like (not labeled) formed between the first and second side walls 408, 412 along the height of the magazine 400 between the upper and lower portions 416, 420. The width, height, and depth of each of the slots 424 may be selected to accommodate any appropriate media element form factors.

The storage container 500 broadly includes a housing 504 that defines one or more ports 508 for receipt of one or more magazines 400 as discussed in more detailed below. For instance, each port 508 includes or is defined by first and second side portions or side walls 512, 516, opposite upper and lower portions or walls 520, 524, a back or rear wall 528 (e.g., back wall 226 of FIG. 4a). The width, height, and depth of each of the slots ports 508 may generally be selected to accommodate any appropriate form factors of the magazines 400.

With reference now to FIGS. 9a-9b and 10a-10g the magazine 400 includes first and second mounting apparatuses 428, 432 that are respectively connected to or formed on (or at least adjacent) the upper and lower portions 416, 420 of the housing 404 and each port 508 includes first and second mounting apparatuses 532, 536 that are respectively connected to or formed on (or at least adjacent) the upper and lower portions or walls 520, 524 of the port 508. The first mounting apparatus 428 of the magazine 400 is configured to engage with the first mounting apparatus 532 of the port 508 and the second mounting apparatus 432 of the magazine 400 is configured to engage with the second mounting apparatus 536 of the port 508. As will be discussed below, the first and second mounting apparatuses 428, 432 of the magazine 400 and corresponding first and second mounting apparatuses 532, 536 of the port 508 advantageously allow the magazine 400 to be inserted into the port 508 with the upper portion 416 first, the lower portion 420 first, or with the upper and lower portions 416, 420 substantially simultaneously which facilitates mounting of the magazine 400 into the port 508 at various heights and at various angles.

As shown in FIGS. 9b, 10a, 10b and 10c, the first mounting apparatus 532 of the port 508 may be in the form of a biasing member (e.g., leaf spring) having a first portion 540 (e.g., first end) rigidly (e.g., non-movably) secured or connected to or adjacent the upper wall 520 (e.g., via fastener(s) extending through the first portion 540 and the upper wall 520). The first mounting apparatus 532 also includes an opposite second portion 544 (e.g., free end) disposed between the first portion 540 and the back wall 528, where the second portion 544 spaced from the upper wall 520 and back wall 528 in a relaxed (non-deflected) position of the first mounting apparatus 532. A body portion 548 interconnects the first and second portions 540, 544 and effectively cantilevers the second portion 544 from the upper wall 520. More specifically, the body portion 548 slopes away from the first portion 540 and upper wall 520 in a direction towards the back wall 528 in the relaxed position of the first mounting apparatus 532.

In one arrangement, the body portion 548 may include a first portion 552 disposed at a first angle of inclination cu with respect to the upper wall 520 and a second portion 556 connected to the first portion 552 that is disposed at a second angle of inclination $\alpha_2$ with respect to the upper wall 520 that is greater than the first angle of inclination cu (e.g., in the relaxed state of the first mounting apparatus 532). This arrangement allows the second portion 544 of the first mounting apparatus 532 to exert a downward force against the upper portion 416 of the magazine 400 upon insertion of the magazine 400 into the port 508 greater than the downward force that would be generated when the body portion 548 is of a single inclination between the first and second portions 540, 544 or when the second angle of inclination $\alpha_2$ is less than the first angle of inclination $\alpha_1$.

As shown in FIGS. 9a, 10a, 10d and 10e, the second mounting apparatus 536 of the port 508 may be in the form of a protrusion or projection generally extending upwardly away from the lower wall 524 toward the upper wall 520. For instance, the second mounting apparatus 536 may include a ramp having a first, leading ramp or cam surface 560 and a second, trailing ramp or cam surface 564 between the first surface 560 and the back wall 528. In one arrangement, the first surface 560 may be disposed at a first angle of inclination $\theta_1$ relative to the lower wall 524 and the second surface 564 may be disposed at a second angle of inclination $\theta_2$ relative to the lower wall 524 that is greater than the first angle of inclination $\theta_1$. Each of the first and second surfaces 560, 564 may be directly attached to the lower wall 524 and may be connected to each other at an apex 568. In one arrangement, the second mounting apparatus 536 may be a portion of the bottom wall 524 that is punched out of the bottom wall 524 in a direction towards the upper wall 520. In another arrangement, the second mounting apparatus 536 may be a separate piece that is appropriately mounted to the bottom wall 524 (e.g., with fasteners, via welding, etc.). For instance, the second mounting apparatus 536 may be in the form of a biasing member (e.g., leaf spring or the like) that functions in a manner similar to the first mounting apparatus 532 (e.g., to allow extraction of the magazine 400 by pulling outward on the bottom portion 420 of the magazine 400).

Figure 10A:
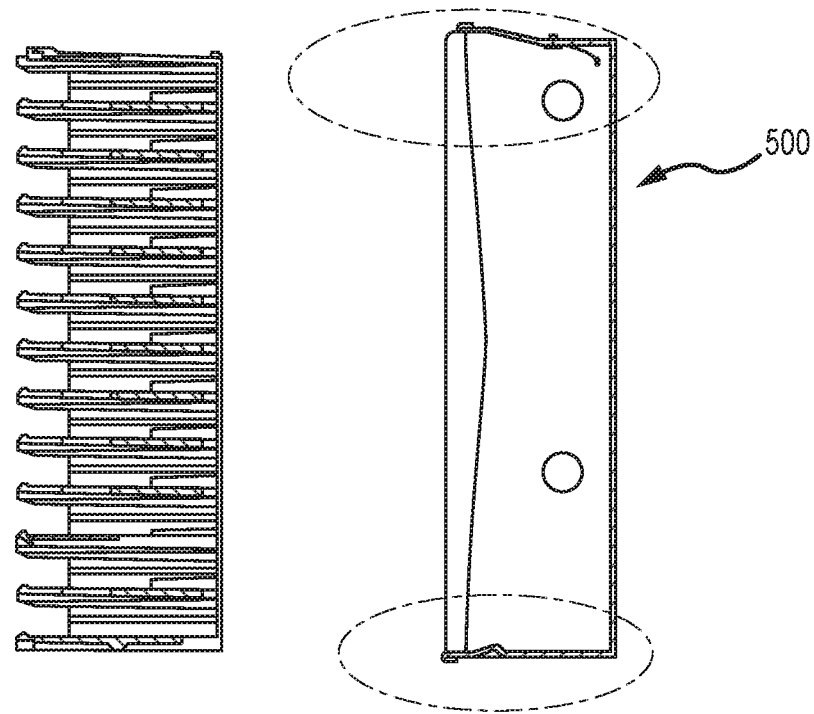
FIG. 10a is a side view of FIGS. 9a-9b.
Figure 10B:
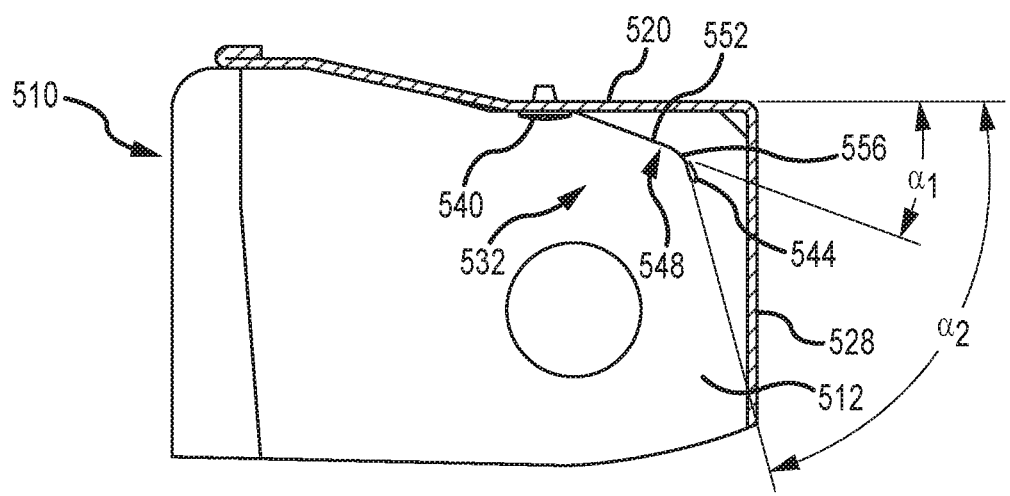
FIG. 10b is a close-up side view of a top portion of the port of FIGS. 9a-9b.
Figure 10C:
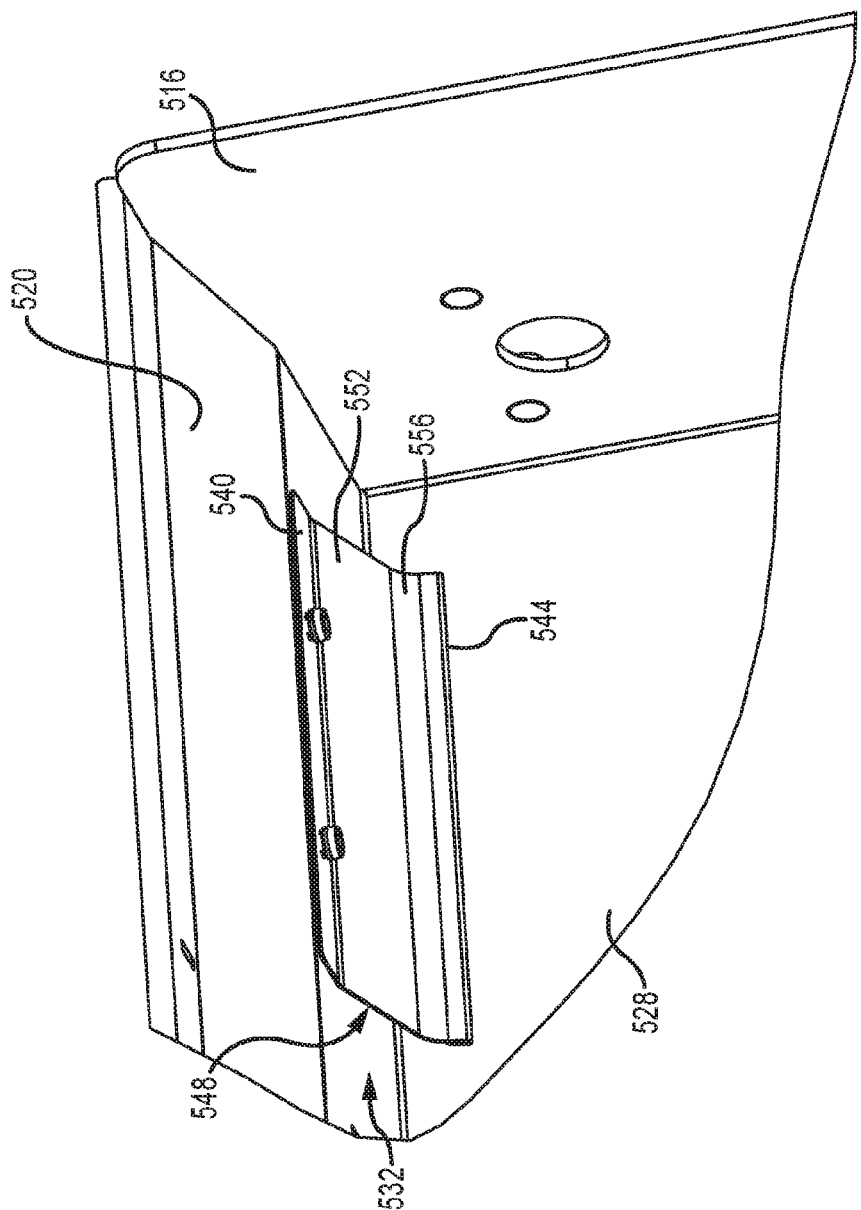
FIG. 10c is a close-up perspective view of the top portion of the port of FIGS. 9a-9b.
Figure 10D:
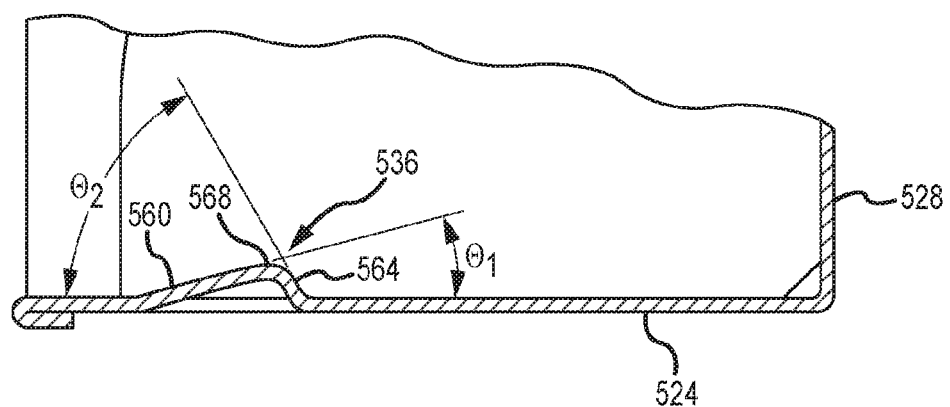
FIG. 10d is a close-up side view of a bottom portion of the port of FIGS. 9a-9b.
Figure 10E:
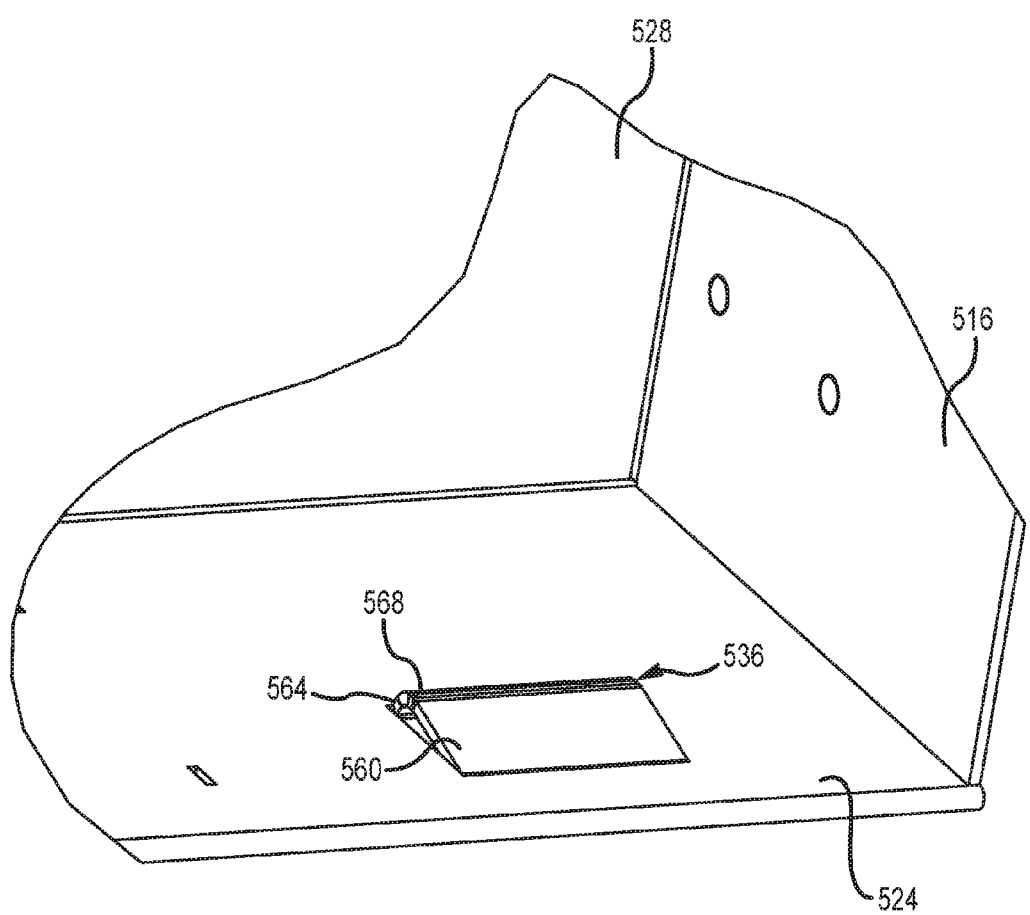
FIG. 10e is a close-up perspective view of the bottom portion of the port of FIGS. 9a-9b.
Figure 10F:
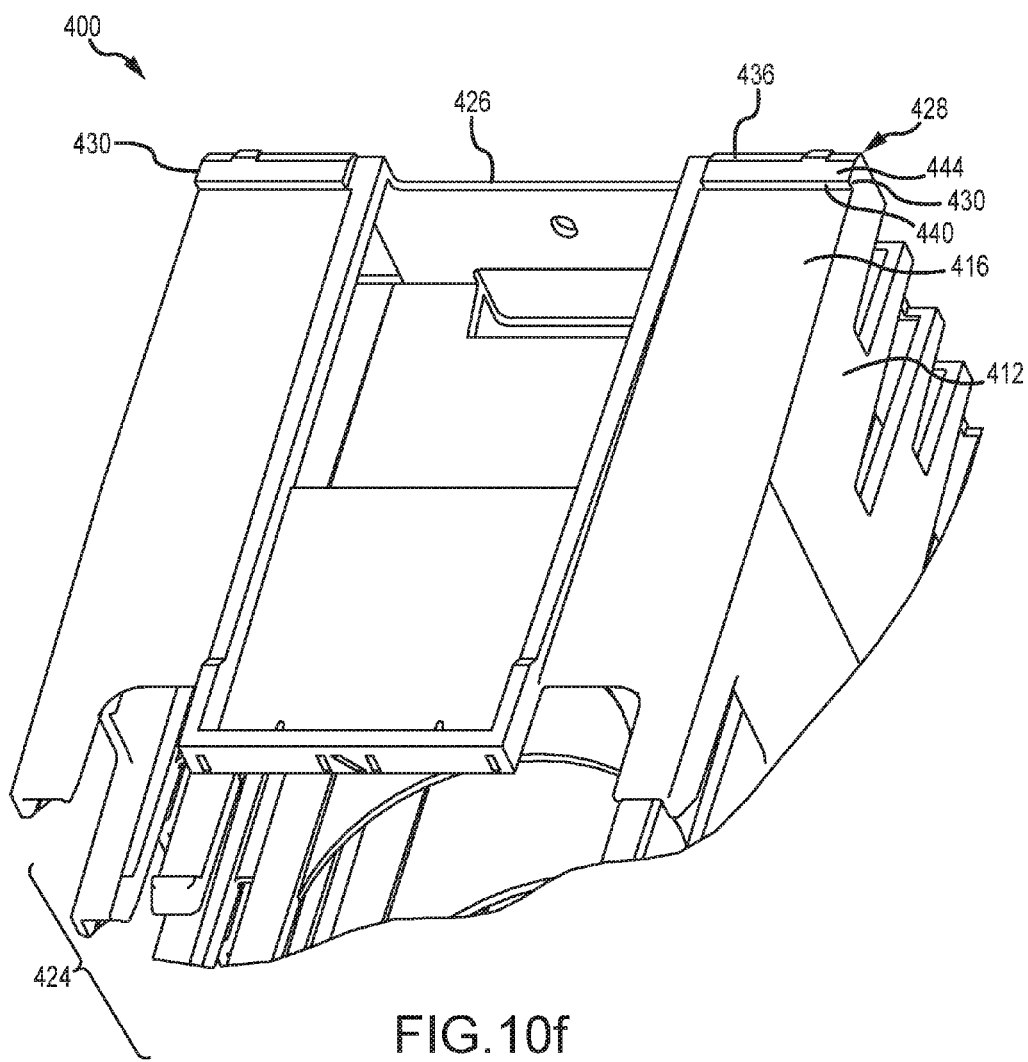
FIG. 10f is a close-up perspective view of the top portion of the magazine of FIGS. 9a-9b.

As mentioned above, the first mounting apparatus 428 of the magazine 400 is configured to engage with the first mounting apparatus 532 of the port 508 during the loading and unloading of the magazine 400 into the port 508. Turning now to FIGS. 9a and 10f, the first mounting apparatus 428 may be in the form of at least one protrusion or projection extending away from the upper portion 416 of the magazine 400, such as adjacent the rear portion 426 of the magazine 400. For instance, the first mounting apparatus 428 may include a body 430 having a rear surface 436, an opposite front surface 440, and an upper surface 444 between the front and rear surfaces 436, 440. The rear surface 436 tapers or slopes away from the upper surface 444 downwardly towards the rear portion 426 of the magazine 400. In contrast, the front surface 440 protrudes sharply from the upper portion 416 of the magazine 400 towards the upper surface 444.

As will be discussed in more detail below, the second portion 544 of the first mounting apparatus 532 of the port 508 is configured to ride along the rear surface 436 and then seat between the front surface 440 of the first mounting apparatus 428 of the magazine and the upper portion 416 of the magazine during one manner of insertion of the magazine 400 into the port 508. While the first mounting apparatus 428 is shown as having first and second bodies 430 in FIGS. 9a and 10f, other embodiments envision that the first mounting apparatus 428 includes only a single body 430 disposed along a substantial entirety of a width of the magazine 400 between the first and second side walls 408, 412, or along less than an entirety of the width of the magazine (e.g., over a central portion of the magazine 400).

Figure 10G:
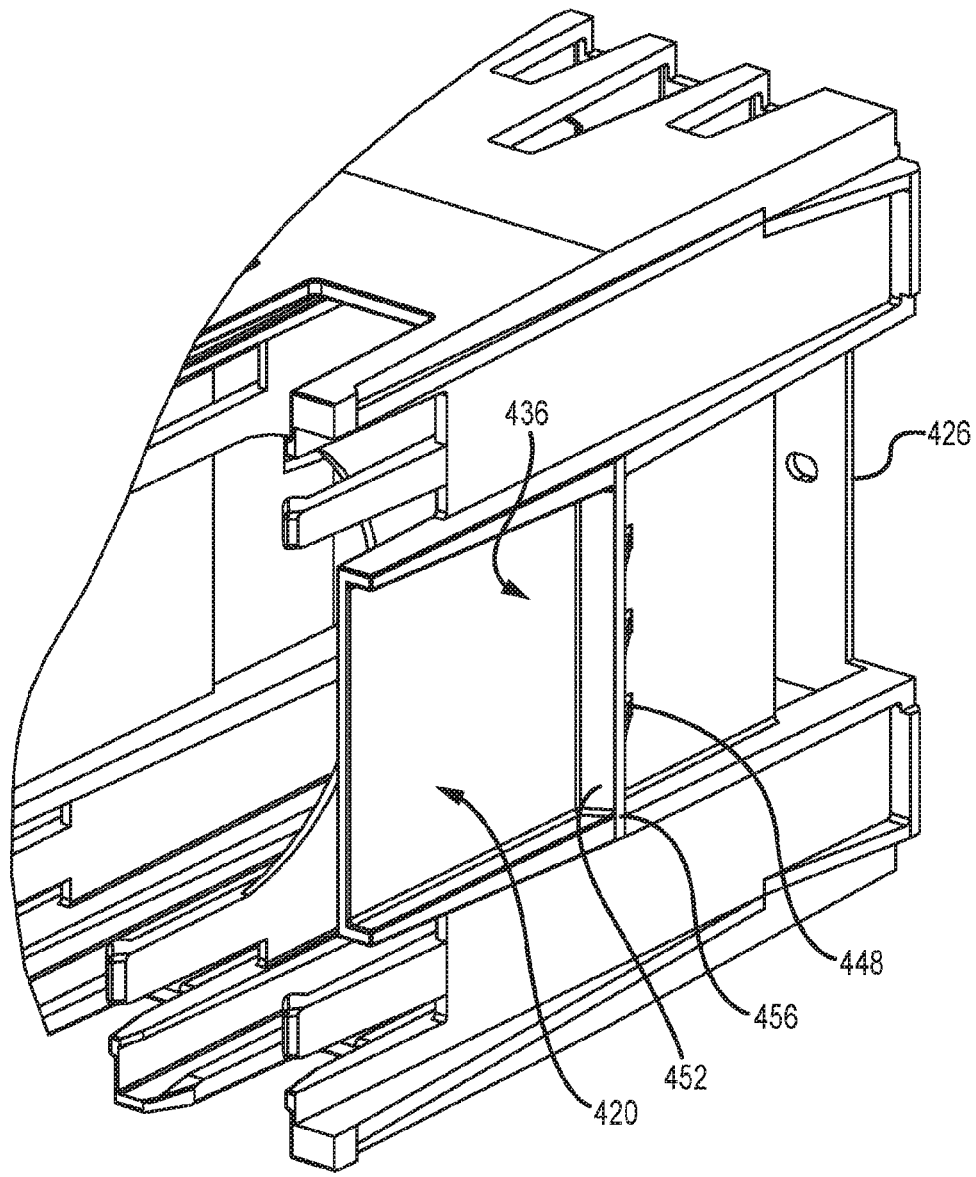
FIG. 10g is a close-up perspective view of the bottom portion of the magazine of FIGS. 9a-9b.
Figure 11B:
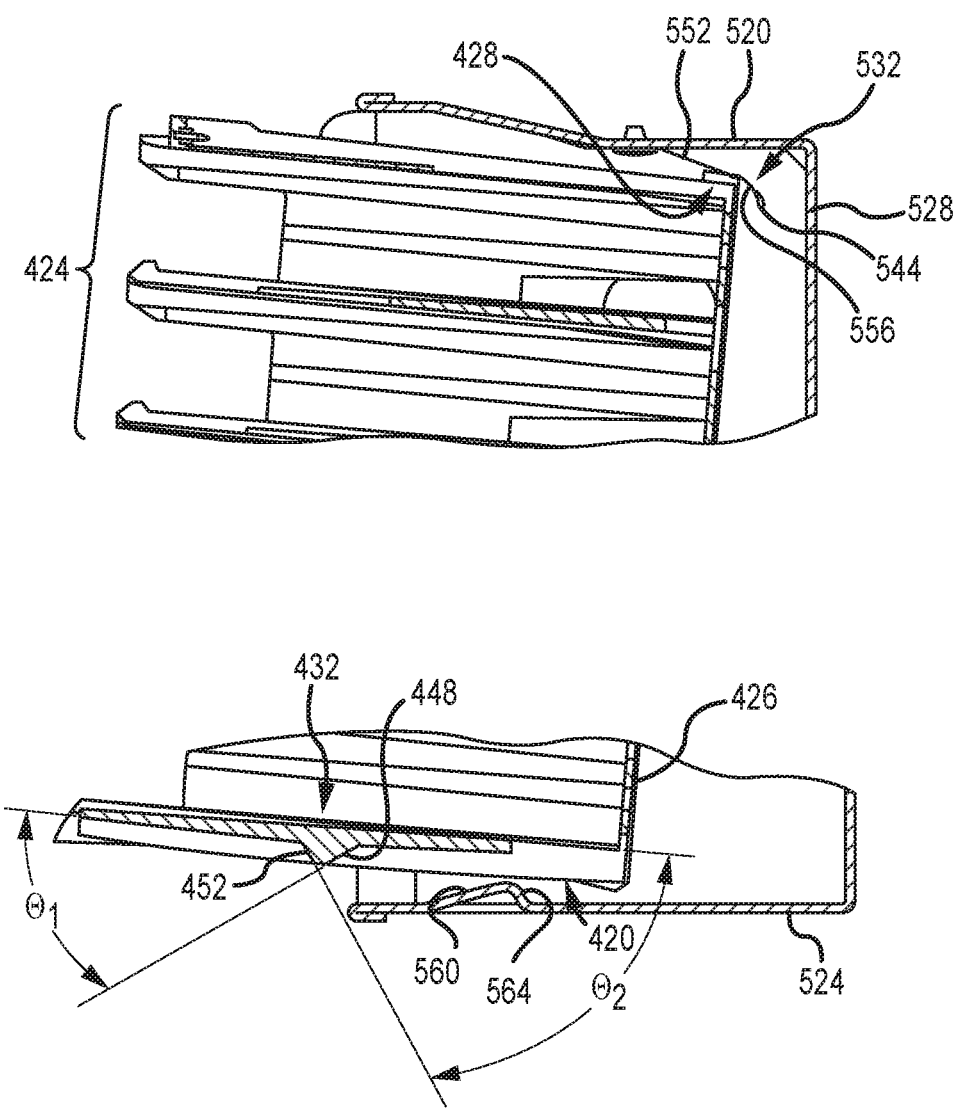
FIG. 11b is a sectional view of the magazine and port of FIGS. 9a-9b at another stage of the first manner of installation of the magazine into the port.

Furthermore, the second mounting apparatus 432 of the magazine 400 is configured to engage with the second mounting apparatus 536 of the port 508 during the loading and unloading of the magazine 400 into the port 508. Turning now to FIGS. 9b, 10g and 11b, the second mounting apparatus 432 may be in the form of a protrusion or projection generally extending downwardly away from the lower portion 420 in a direction opposite the upper portion 416. For instance, the second mounting apparatus 432 may include a ramp having a first, leading ramp or cam surface 448 and a second, trailing ramp or cam surface 452, where the first surface 448 is positioned between the second ramp surface 452 and the rear portion 426. In one arrangement, the first surface 448 may be disposed at a first angle of inclination $\Theta_1$ relative to the lower portion 420 of the magazine 400 and the second surface 452 may be disposed at a second angle of inclination $\Theta_2$ relative to the lower portion 420 that is greater than the first angle of inclination $\Theta_1$. Each of the first and second surfaces 448, 452 may be directly attached to the lower portion 426 and may be connected to each other at an apex 456. In one arrangement, the second mounting apparatus 432 may be an integral portion of the magazine 400 that is appropriately molded with the rest of the magazine 400. In another arrangement, the second mounting apparatus may be a separate piece that is appropriately mounted to the bottom portion 420 (e.g., with fasteners, via welding, etc.).

To facilitate the reader's understanding of how the above-discussed mounting apparatuses engage to facilitate mounting and dismounting of the magazine 400 into and from the port 508 in numerous different manners (e.g., depending upon port height, user height, etc.), reference will now be made to FIGS. 11a-14c which illustrate various successions of sectional views of the magazine 400 and port 508 as the magazine 400 is being inserted into the port 508. With initial reference to FIGS. 11a-11b, the upper portion 416 of the magazine 400 is shown as being inserted into the port 508 (with the rear portion 426 of the magazine generally facing the rear wall 528 of the port 508) and the first mounting apparatus 428 of the magazine 400 making contact with the first mounting apparatus 532 of the port 508 before the second mounting apparatus 432 of the magazine 400 makes contact with the second mounting apparatus 536 of the port 508.

More specifically, the rear surface 436 of the first mounting apparatus 428 may contact the first portion 552 of the body 548 of the first mounting apparatus 532 and slide therealong towards the second body portion 556. After the rear surface 436 has contacted and slid along the first body portion 552, the lower portion 420 of the magazine 420 may then be inserted into the port 508 adjacent the lower wall 524 of the port 508 until the leading ramp surface 448 of the second mounting apparatus 432 of the magazine 400 contacts or is at least closely adjacent the leading ramp surface 560 of the second mounting apparatus 536 of the port 508. See FIG. 11c. With reference to FIGS. 11b-11c, it can be seen how the user may effectively pivot the magazine 400 about a pivot point formed by the first mounting apparatuses 428, 532 as the second mounting apparatus 432 moves from its position in FIG. 11b to that in FIG. 11c.

Turning now to FIG. 11d, continued urging of the top portion 416 of the magazine 400 (e.g., against the front portion 422) in a direction towards the back wall 528 of the port 508 re-establishes or maintains contacts between the rear surface 436 of the first mounting apparatus 428 and the first body portion 552 and then deflects the first mounting apparatus 532 upwardly towards the upper wall 520 as the rear surface 436 and upper surface 444 of the first mounting apparatus 428 contact the second body portion 556. In this regard, the second body portion 556 functions as a camming surface that translates or converts the substantially linear motion of the first mounting apparatus 428 along a first axis or plane (as the upper portion 416 is being urged into the port 508) into an upward pivoting motion of the first mounting apparatus 532 towards the upper wall 520 about the first portion 540 of the first mounting apparatus 532. As the rear surface 436 of the first mounting apparatus 428 reaches the second (e.g., free) end 544 of the first mounting apparatus 532 (again, during continued urging of the upper portion 416 of the magazine 400 into the port 508), the second end 544 slides up the rear surface 436 resulting in further deflection of the first mounting apparatus 532 towards the upper wall 520 (thus making the rear surface 436 a camming surface) and over the upper surface 444 (see FIG. 11d) before settling against the front surface 440 of the first mounting apparatus 428 (see FIG. 11e).

Figure 11E:
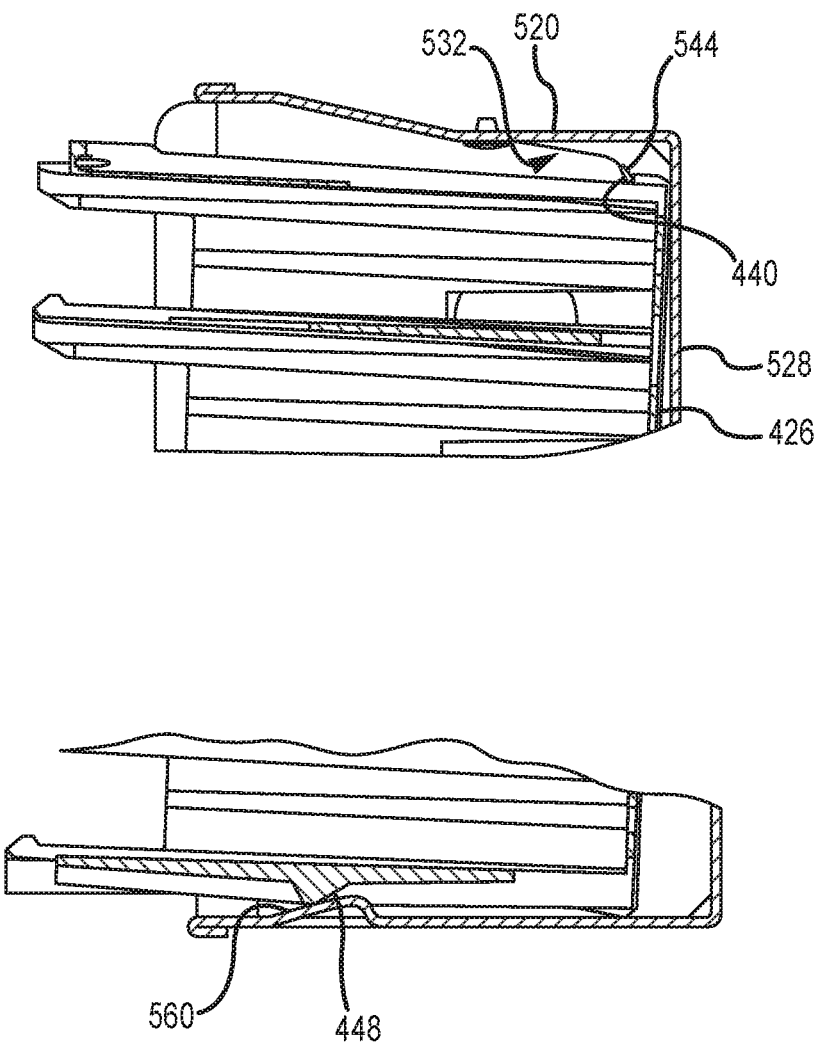
FIG. 11e is a sectional view of the magazine and port of FIGS. 9a-9b at another stage of the first manner of installation of the magazine into the port.

With reference to FIGS. 11d-11e, settling of the second end 544 of the first mounting apparatus 532 against the front surface 440 allows the first mounting apparatus 532 to return slightly towards its relaxed, non-deflected position. Furthermore, the second end 544 exerts a downward and rearward force against the front surface 440 and upper portion 416 of magazine (e.g., the rearward force being towards rear wall 528 of port 508) which captures or pins the first mounting apparatus 428 of the magazine 400 between the first mounting apparatus 532 of the port 508 and the rear wall 528 of the port 508 and thus holds the upper portion 416 of the magazine 400 against removal from the port 508 in a direction away from or opposite the rear surface 528. Still further, an upper portion of the rear portion 426 of the magazine 400 is now in contact with or closely adjacent the rear wall 528 of the port 508.

Figure 11F:
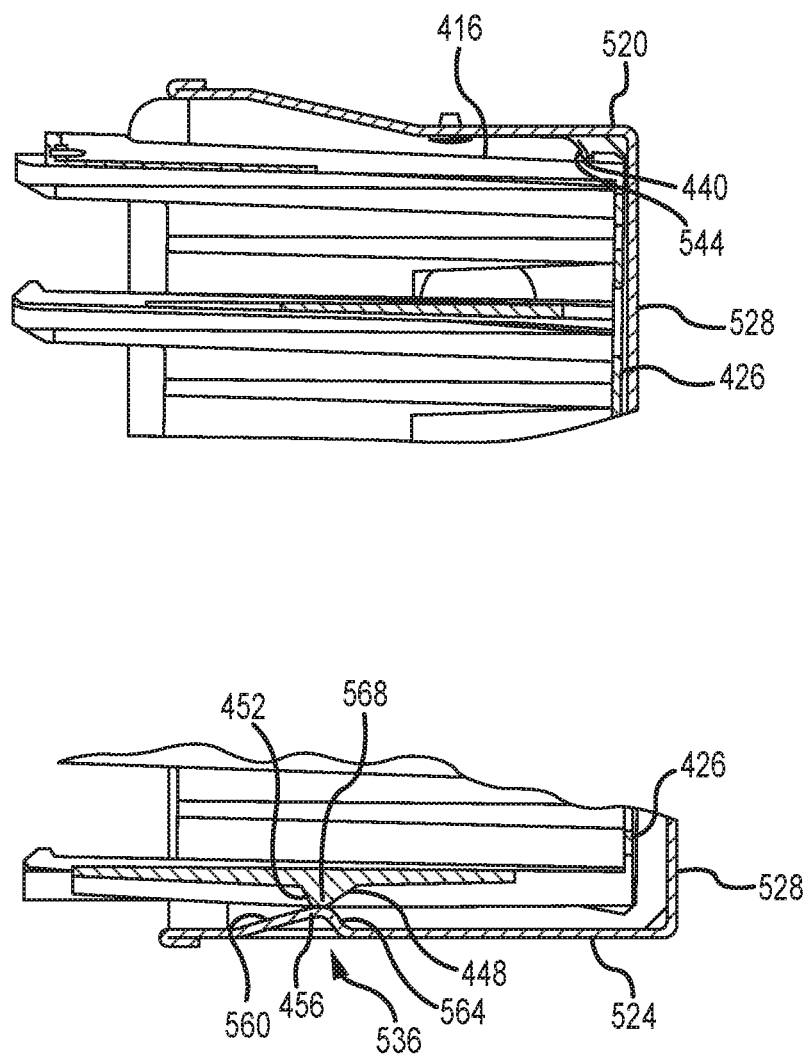
FIG. 11f is a sectional view of the magazine and port of FIGS. 9a-9b at another stage of the first manner of installation of the magazine into the port.
Figure 11G:
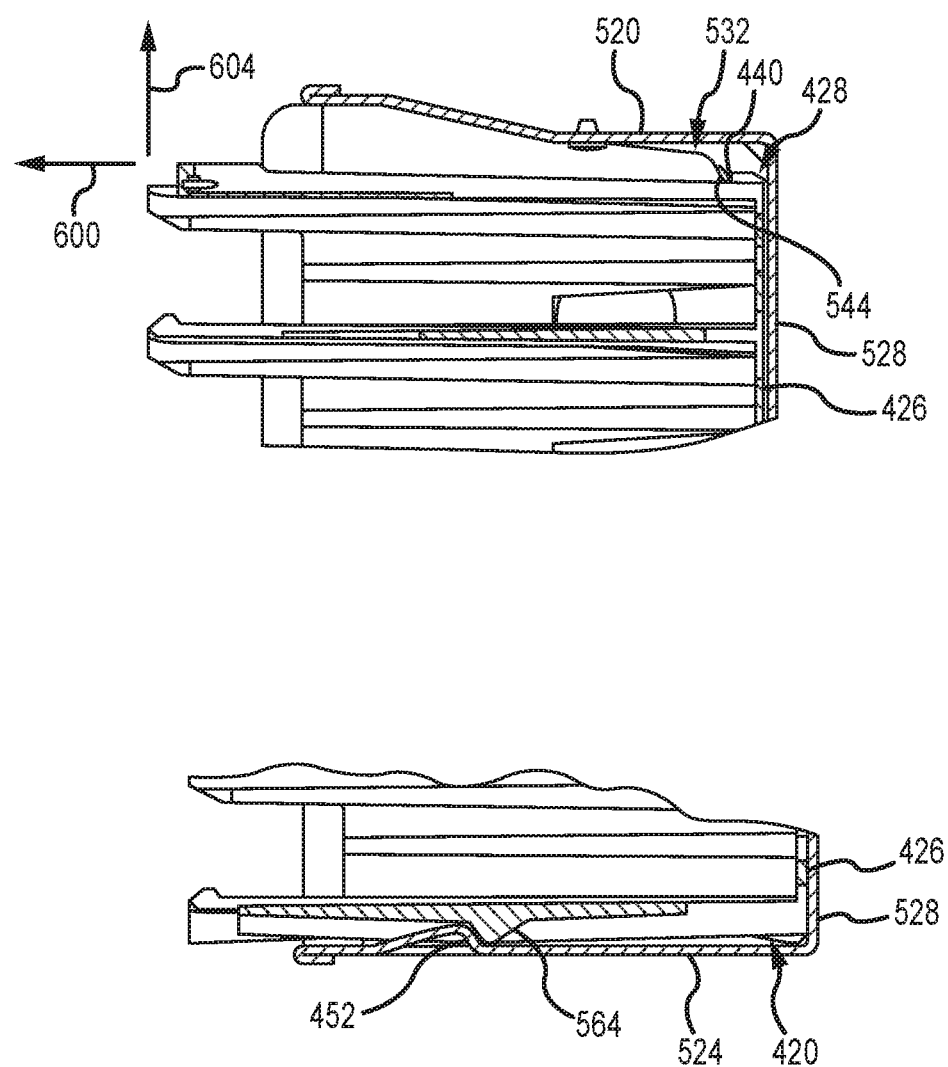
FIG. 11g is a sectional view of the magazine and port of FIGS. 9a-9b at another stage of the first manner of installation of the magazine into the port.

As shown now in FIGS. 11f-11g, the lower portion 420 of the magazine 400 can now be urged towards the rear wall 528 of the port 508. More specifically, the pinning of the first mounting apparatus 428 between the second portion 544 of the first mounting apparatus 532 and the rear wall 528 of the port 508 allows the magazine 400 to pivot (e.g., in a counterclockwise direction) about the second portion 544 as the lower portion 420 is being urged into the port 508. As the magazine 400 pivots, the leading ramp surface 448 of the second mounting apparatus 432 slides or rides up and along the leading ramp surface 560 of the second mounting apparatus 536 resulting in the entire magazine 400 moving upwards towards the upper wall 520 of the port 508 and the first mounting apparatus 532 being deflected again towards the upper wall 520. See FIG. 11f.

With continued urging of the lower portion 420 of the magazine 400, the apex 456 of the second mounting apparatus 432 contacts the apex 568 of the second mounting apparatus 536 before the trailing ramping surface 452 makes contact with and slides or rides along the trailing ramp surface 564. As the trailing ramp surface 452 slides along the trailing ramp surface 564, a camming action between the two surfaces further pushes the lower portion 420 of the magazine 400 towards the rear surface 528 of the port 508 as the lower portion 420 settles against the lower wall 524 of the port 508. Furthermore, the first mounting apparatus 532 slightly returns towards its relaxed position (note how first mounting apparatus 532 has slightly moved away from the upper wall 520 in FIG. 11g as compared to in FIG. 11f). Stated differently, the first mounting apparatus 532 may move from a first deflected position in FIG. 11f to a second deflected position in FIG. 11g, where the second deflected position is a lower state of deflection of the first mounting apparatus 532 than is the first deflected position.

At this point, the magazine 400 is now located and secured within the port 508 for manipulation by users or robotics assemblies of a storage library. As discussed above, any attempt to pull the magazine 400 out of the port 508 in a first direction 600 away from the rear wall 528 of the port 508 (e.g., in a direction substantially perpendicular to the rear wall 528 of the port 508) would be resisted by the second portion 544 of the first mounting apparatus 532 applying a resistive force against the front surface 440 of the first mounting apparatus 428. Furthermore, camming engagement between the trailing ramp surfaces 452, 564 would move the magazine 400 in a slightly upward direction towards the upper surface 520 further deflecting the first mounting apparatus 532 against the upper surface 520 and thus further urging the second end 544 of the first mounting apparatus 532 against the front surface 440 of the first mounting apparatus 428.

To remove the magazine 400 from the port 508, the magazine 400 may be lifted or pushed in a second (e.g., upward) direction 604 (e.g., perpendicular to the first direction 600 and parallel to the rear wall 528), such as from the top portion 416 or bottom portion 420 of the magazine 400. Stated differently, the magazine 400 may be moved in the second direction 604 in a manner so that the rear portion 426 of the magazine 400 slides along or moves substantially parallel to the rear wall 528 of the port 508 (and so that the trailing ramp surface 452 separates from the trailing ramp surface 564). This movement of the magazine 400 results in the first mounting apparatus 428 moving upwardly towards the upper wall 520 through the space between the second portion 544 of the first mounting apparatus 532 and the rear wall 528 and the first mounting apparatus 532 being deflected towards the upper wall 520.

The amount of deflection of the first mounting apparatus 532 allowed may be selected so that the apex 456 of the second mounting apparatus 432 can be at least just lifted or pushed over the apex 568 of the second mounting apparatus 536 and the magazine 400 pivoted (e.g., in a clockwise direction) about the second portion 544 of the first mounting apparatus 532 in a direction opposite than when the lower portion 420 was being pushed into the port 508. For instance, compare FIGS. 11f and 11e. Continued pivoting of the magazine 400 about the second portion 544 of the first mounting apparatus 532 (e.g., via pulling on the magazine 400 near the lower portion 420) eventually releases the first mounting apparatus 428 from the first mounting apparatus 532 and eventually allows the magazine 400 to be fully removed from the port 508.

FIGS. 12a-12e present another succession of sectional views of the magazine 400 and port 508 as the magazine 400 is being inserted into the port 508 in another manner of mounting. In FIG. 12a, the upper portion 416 of the magazine 400 may be inserted into the port 508 (with the rear portion 426 of the magazine 400 generally facing the rear wall 528 of the port 508) so that the first mounting apparatus 428 of the magazine 400 makes contact with the rear wall 528 of the port 508 (instead of the first mounting apparatus 428 making contact with the first body portion of the first mounting apparatus 532 is discussed in relation to FIGS. 11a-11b). The magazine 400 may then be urged along a direction 608 (e.g., non-perpendicular and non-parallel to each of directions 600, 604 of FIG. 11g) so that the first mounting apparatus 428 slides upwardly along the rear wall 528 into a gap 572 between the second portion 544 of the first mounting apparatus 532 and the rear wall 528. See FIGS. 12b-12c.

In one arrangement, a front edge 576 of the lower wall 524 of the port may slidingly support the rear portion 426 of the magazine 400 as the magazine 400 is being urged in the direction 608 to facilitate smooth insertion of the magazine 400 into the port 508. See FIG. 12a. Additionally, the upper portion 416 of the magazine 400 may eventually contact a front edge 580 of the upper wall 520 of the port 508 to facilitate insertion of the lower portion 420 of the magazine 400 into the port 508. See FIGS. 12b-12c. More specifically, the magazine 400 may be initially pivoted about the front edge 580 of the port 508 (e.g., in a counterclockwise direction) so that the lower portion 420 of the magazine 400 clears the lower wall 524 of the port 508 and begins moving towards the rear wall 528 of the port 508. Once the front surface 440 of the first mounting apparatus 428 engages the second portion 544 of the first mounting apparatus 532 and the second portion 544 begins applying a resistive force against the front surface 440, the upper portion 416 of the magazine 400 may separate from the front edge 580 of the port 508 and the magazine may continuing pivoting in the same direction (e.g., in the counterclockwise direction) about the second portion 544 of the first mounting apparatus 532. A user may now complete the insertion of the magazine 400 into the port 508 as discussed previously in relation to FIGS. 11f-11g. See FIGS. 12d-12e.

Figure 13A:
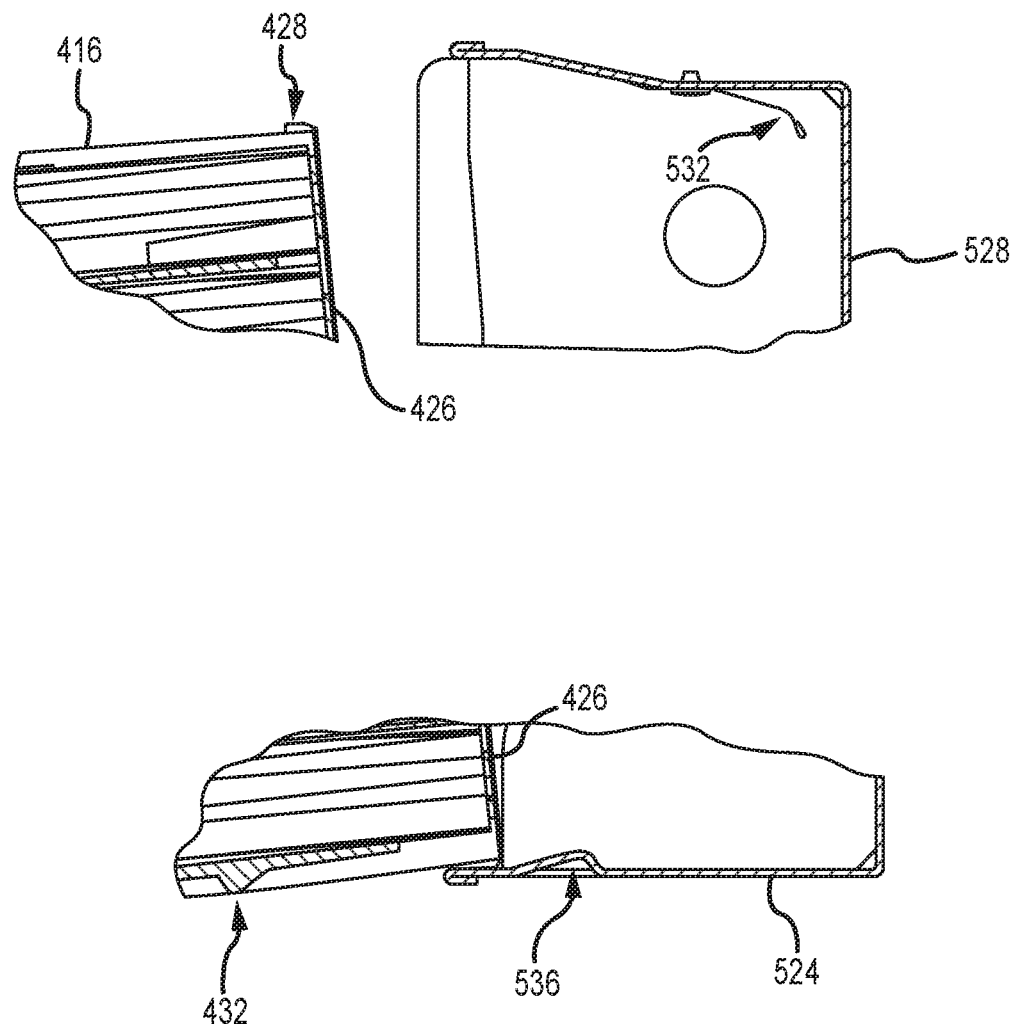
FIG. 13a is a sectional view of the magazine and port of FIGS. 9a-9b at one stage of a third manner of installation of the magazine into the port.
Figure 13B:
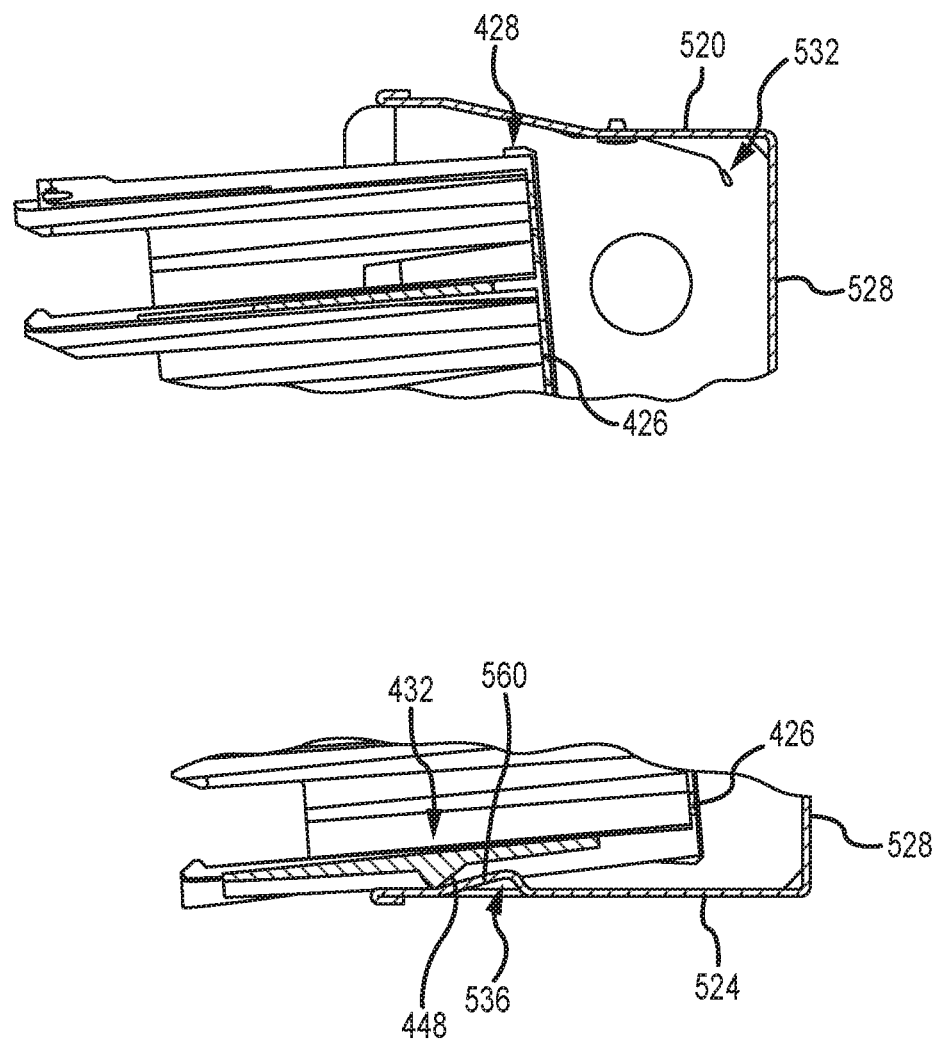
FIG. 13b is a sectional view of the magazine and port of FIGS. 9a-9b at another stage of the third manner of installation of the magazine into the port.

FIGS. 13a-13e present another succession of sectional views of the magazine 400 and port 508 as the magazine 400 is being inserted into the port 508 in another manner of mounting. In FIG. 13a, the lower portion 420 of the magazine 400 may be inserted into the port 508 (with the rear portion 426 of the magazine 400 generally facing the rear wall 528 of the port 508) so that the leading ramp surface 448 of the second mounting apparatus 432 contacts and slides along the leading ramp surface 560 of the second mounting apparatus 536. See FIGS. 13b-13c. After the apex 456 of the second mounting apparatus 432 contacts the apex 568 of the leading ramp surface 560 (see FIG. 13c), the trailing ramping surface 452 makes contact with and slides along the trailing ramp surface 564 creating a camming action that pushes the lower portion 420 of the magazine 400 towards the rear surface 528 of the port 508 before the apex 456 settles against the lower wall 524 of the port 508 (see FIG. 13d).

The upper portion 416 of the magazine 400 can then be urged or forced towards the rear wall 528 of the port 508 and the magazine 400 pivoted about trailing ramp surface 564 of the second mounting apparatus 536 so that the first mounting apparatus 428 of the magazine 400 contacts and slides along the first mounting apparatus 532 of the port 508. Continued urging of the upper portion 416 of the magazine 400 causes the first mounting apparatus 432 to deflect the first mounting apparatus 532 towards the upper wall and the second portion 544 of the first mounting apparatus 532 to slide over the first mounting apparatus 428 until it is seated against the front surface 440 of the first mounting apparatus 432. At this point, the magazine 400 is located and secured within the port 508 for manipulation by users or robotics assemblies of a storage library.

FIGS. 14a-14c present another succession of sectional views of the magazine 400 and port 508 as the magazine 400 is being inserted into the port 508 in another manner of mounting. As shown in FIG. 14a, the upper and lower portions 416, 420 of the magazine 400 may be inserted into the port 508 adjacent the upper and lower walls 520, 524 of the port 508 substantially simultaneously (e.g. in a direction substantially perpendicular to the rear wall 528). For instance, continued urging of the upper and lower portions 416, 420 of the magazine 400 may result in the first mounting apparatus 428 contacting the first mounting apparatus 532 and the second mounting apparatus 432 contacting the second mounting apparatus 536 substantially simultaneously and the first and second mounting apparatuses 428, 432 eventually seating behind the first and second mounting apparatuses 532, 536 to locate and secure the magazine 400 within the port 508.

It will be readily appreciated that many additions and/or deviations may be made from the specific embodiments disclosed in the specification without departing from the spirit and scope of the invention. As an example, various sensors may be appropriately located throughout the storage library 100 to detect one or more events or occurrences and signal the library controller or host computer regarding the same. For instance, sensors may be appropriately located throughout the storage library 100 to detect when a storage container 204 of a particular CAP 200 is in its first position against an opening 116 in the housing 104 (e.g., like storage container 204 of CAP $200_3$ in FIG. 4a), when a storage container 204 of a particular CAP 200 is in its second position within the interior portion 120 (e.g., like storage container 204 of CAP $200_4$ in FIG. 4a), when a particular robotics assembly 128 is in the loading zone 124 of a particular CAP 200 (e.g., like robotics assembly 128 of CAP $200_1$ in FIG. 4a), etc. The library controller may process the received signals to move robotics assemblies 128 into and out of loading zones 124, allow storage containers 204 to be moved through their respective loading zones 124 into either their first or second positions, and/or the like in a manner that limits unintended movements and/or damage among or between various components of the storage library 100.

In one arrangement, an inside surface of the access door 208 (e.g., the surface configured to face the opening 116 in the housing 104 and the opening 252 in the framing assembly 212, not labeled) may include one or more features or components configured to contact any media elements protruding from the opening 224/slots 228 of the storage container 204 and urge any such media elements into a fully (or substantially fully) seated position within the opening 224/slots 228 as the access door 208 is being moved into its closed, first position. For instance, one or more ribs or splines 268 may be appropriately connected or attached to the inside surface of the access door 208 so as to protrude from the inside surface along a height dimension of the access door. See FIGS. 5 and 6a. Upon loading of media elements into slots 228 of the opening 224 (slots not shown in FIG. 6a, but see slots 228 in FIG. 3), closure of the access door 208 into its closed first position over the opening 116 in the housing 104 and the opening 252 in the framing assembly 212 induces contact between the splines 268 and the media elements to push any protruding media elements fully into the slots 228. With the media elements are substantially fully seated in the storage container 204, the storage container 204 may then be moved (pivoted) into its second position within the interior portion 120 of the storage library 100. See storage container 204 of CAP $200_3$ in FIGS. 4b-4c.

In another arrangement, each CAP 200 may include more than one access door 208 configured to selectively cover the opening 116 through the housing or allow access therethrough. As an example, each CAP 200 may include first and second access doors 208 that are respectively pivotally secured to the first and second vertical members 258, 260 (or to the first and second horizontal members 262, 264) of the framing assembly 212. For instance, the latching assembly 300 may be appropriately configured to lock the access doors 208 in their closed positions over the opening 116 when the storage container 204 is in its open, second position within the interior portion 120 of the storage library 100 and unlock the access doors 208 to allow the access doors 208 to be moved into an open position away from the opening 116 when the storage container 204 is in its closed, first position against the opening 116.

In a further arrangement, while clockwise rotation of the second lever 308 has been discussed as inducing counterclockwise rotation of the first lever 304 to lock the storage container 204 and clockwise rotation of the first lever 304 has been discussed as inducing counterclockwise rotation of the second lever 308 to lock the access door 208, the reverse arrangement is also encompassed herein whereby counterclockwise rotation of the second lever 308 induces clockwise rotation of the first lever to lock the storage container 204 and counterclockwise rotation of the first lever induces clockwise rotation of the second lever 308 to lock the access door 208. Additionally, the first and second levers 304, 308 could in some arrangements be referred to as the second and first levers, respectively (e.g., in addition to the first door/storage container 204 and second door/access door 208).

In one embodiment, the first mounting apparatuses 428 could be disposed closer to the front portion 422 and the first mounting apparatus 532 could be disposed closer to the front opening 510 than as shown in the figures. In another embodiment, the biasing member of the first mounting apparatus 532 of the port could be disposed on the upper portion 416 of the magazine 400 while the protrusion(s) of the first mounting apparatus 428 of the magazine could be disposed on the upper portion 520 of the port 508. In this arrangement, the biasing member would be connected to the upper portion 416 of the magazine and configured to generally slope away from the upper portion 416 towards the front opening 510 in the relaxed position of the biasing member. Also in this arrangement, the protrusion extending away from the upper portion 520 of the port 508 would have a front, stop surface facing the rear wall 528 of the port 508 (instead of facing away from the rear wall 528 towards the front opening 510 as shown in FIGS. 11a-14c, for instance.

As another example, while the first and second mounting apparatuses 428, 432 and 532, 536 of the magazine 400 and port 508 were illustrated in FIGS. 9a-14c as being respectively disposed adjacent the upper and lower portions of the magazine 400 and port 508, other embodiments envision that the first and second mounting apparatuses 428, 432 and 532, 536 could alternatively be disposed adjacent the first and second side walls or side portions of the magazine 400 and port 508. In this regard, a user could insert either of the first or second side portions 408, 412 of the magazine 400 into the port 508 first followed by the other of the first or second side portions 408, 412 (or could insert the first and second side portions 408, 412 into the port 508 simultaneously). In this arrangement, for instance, the first mounting apparatus 532 of the port 508 would be secured to one of the first or second sidewalls 512, 516 of port 508 and be configured to deflect towards the one of the first or second sidewalls 512, 516 upon contact by the first mounting apparatus 428 of the magazine 400 as discussed herein.

Some embodiments disclosed herein can be implemented as one or more computer program products, i.e., one or more modules of computer program instructions encoded on a computer-readable medium for execution by, or to control the operation of, data processing apparatus. For example, the host computer, library controller, and/or the like may be provided in such computer-readable medium and executed by one or more processors (e.g., processing units, processing cores, or the like). The computer-readable medium can be a machine-readable storage device, a machine-readable storage substrate, a memory device, a non-volatile computer-readable medium, a composition of matter affecting a machine-readable propagated signal, or a combination of one or more of them.

One or more various combinations of the above discussed arrangements and embodiments are also envisioned. While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A method of operating a media element storage library, comprising:
   receiving at least one media element in at least one opening of a storage container through an opening in a wall of the media element storage library;
   swinging the storage container away from the opening in the wall;
   removing, by a robotics assembly, the at least one media element from the at least one opening of the storage container; and
   determining, by the library controller after the at least one media element is received in the at least one opening of the storage container through the opening in the wall of the media element storage library, that the robotics assembly is out of the loading zone, wherein the swinging the storage container away from the opening in the wall occurs in response to the determining that the robotics assembly is out of the loading zone.

2. The method of claim 1, further including:
   moving the robotics assembly to a location in the media element storage library spaced from the storage container; and
   inserting the media element into a slot in the media element storage library.

3. The method of claim 2, wherein the slot is in one of a media element magazine or a media element drive.

4. The method of claim 3, further including:
receiving, at a library controller of the media element storage library, a request to load a media element into the media element storage library; and
swinging, in response to the received request, the storage container through a loading zone of the media element storage library towards the opening in the wall.

5. The method of claim 1, wherein the at least one opening of the storage container faces outwardly through the opening in the wall of the media element storage library.

6. The method of claim 1, further including:
receiving, at a library controller of the media element storage library, a request to load a media element into the media element storage library; and
swinging, in response to the received request, the storage container through a loading zone of the media element storage library towards the opening in the wall.

7. A method of operating a media element storage library, comprising:
receiving at least one media element in at least one opening of a storage container through an opening in a wall of the media element storage library;
swinging the storage container away from the opening in the wall;
removing, by a robotics assembly, the at least one media element from the at least one opening of the storage container;
moving the robotics assembly to a location in the media element storage library spaced from the storage container;
inserting the media element into a slot in the media element storage library, wherein the slot is in one of a media element magazine or a media element drive;
receiving, at a library controller of the media element storage library, a request to load a media element into the media element storage library;
swinging, in response to the received request, the storage container through a loading zone of the media element storage library towards the opening in the wall; and
determining, by the library controller in response to the received request, that the robotics assembly is out of the loading zone, wherein the swinging the storage container through the loading zone of the media element storage library occurs in response to the determining.

8. A method of operating a media element storage library, comprising:
receiving at least one media element in at least one opening of a storage container through an opening in a wall of the media element storage library;
swinging the storage container away from the opening in the wall;
removing, by a robotics assembly, the at least one media element from the at least one opening of the storage container;
moving the robotics assembly to a location in the media element storage library spaced from the storage container;
inserting the media element into a slot in the media element storage library, wherein the slot is in one of a media element magazine or a media element drive;
removing, by the robotics assembly, another media element from another slot in the media element storage library;
moving the robotics assembly into a loading zone of the media element storage library; and
inserting the other media element into an opening of the storage container.

9. A method of operating a media element storage library, comprising:
receiving at least one media element in at least one opening of a storage container through an opening in a wall of the media element storage library;
swinging the storage container away from the opening in the wall;
removing, by a robotics assembly, the at least one media element from the at least one opening of the storage container;
receiving, at a library controller of the media element storage library, a request to load a media element into the media element storage library;
swinging, in response to the received request, the storage container through a loading zone of the media element storage library towards the opening in the wall; and
determining, by the library controller in response to the received request, that the robotics assembly is out of the loading zone, wherein the swinging the storage container through the loading zone towards the opening in the wall occurs in response to the determining that the robotics assembly is out of the loading zone.

10. The method of claim 9, further including:
determining, by the library controller after the at least one media element is received in the at least one opening of the storage container through the opening in the wall of the media element storage library, that the robotics assembly is out of the loading zone, wherein the swinging the storage container away from the opening in the wall occurs in response to the determining that the robotics assembly is out of the loading zone.

11. A method of operating a media element storage library, comprising
receiving, at a library controller of the media element storage library, a request for a file stored in the media element storage library;
identifying, by the library controller, a media element within the media element storage library on which the file is stored;
triggering, in response to the identifying, a robotics assembly within the media element storage library to:
retrieve the media element from a slot in the media element storage library; and
insert the media element into at least one opening in a storage container;
pivoting the storage container into a position adjacent an opening in a wall of the media element storage library so that the media element is accessible through the opening in the wall;
unlocking, in response to the storage container reaching the position, an access door over the opening in the wall; and
locking, in response to the storage container reaching the position, the storage container in the position, wherein the unlocking and locking occur substantially simultaneously.

12. The method of claim 11, further including:
moving the robotics assembly away from the storage container.

13. The method of claim 11, wherein the slot is in one of a media element magazine or a media element drive.

14. The method of claim 11, further including:
moving the robotics assembly through the media element storage library into a loading zone in front of the storage container.

15. The method of claim 14, further including:
moving the robotics assembly out of the loading zone.

\* \* \* \* \*

UNITED STATES PATENT AND TRADEMARK OFFICE
CERTIFICATE OF CORRECTION

PATENT NO. : 9,799,366 B2
APPLICATION NO. : 15/015580
DATED : October 24, 2017
INVENTOR(S) : Manes et al.

It is certified that error appears in the above-identified patent and that said Letters Patent is hereby corrected as shown below:

In the Specification

In Column 10, Line 61, delete "$128_2$." and insert -- $128_2$). --, therefor.

Signed and Sealed this
Third Day of July, 2018

Andrei Iancu
*Director of the United States Patent and Trademark Office*